US012045809B1

(12) United States Patent  
Hecht et al.

(10) Patent No.: US 12,045,809 B1  
(45) Date of Patent: Jul. 23, 2024

(54) BILLER CONSORTIUM ENROLLMENT AND TRANSACTION MANAGEMENT ENGINE

(71) Applicant: Wells Fargo Bank, N.A., San Francisco, CA (US)

(72) Inventors: Alan W. Hecht, San Francisco, CA (US); Sotirios Barkas, San Jose, CA (US); Ann M. Kirk, Deerwood, MN (US); Peter Rozovski, Concord, CA (US); Peter L. Shen, Castro Valley, CA (US); Chate Yap, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/704,155

(22) Filed: Dec. 5, 2019

Related U.S. Application Data

(63) Continuation-in-part of application No. 16/555,934, filed on Aug. 29, 2019.
(Continued)

(51) Int. Cl.
  *G06Q 20/38* (2012.01)
  *G06Q 20/02* (2012.01)
  *G06Q 20/36* (2012.01)

(52) U.S. Cl.
  CPC ..... *G06Q 20/38215* (2013.01); *G06Q 20/023* (2013.01); *G06Q 20/3672* (2013.01); *G06Q 20/385* (2013.01)

(58) Field of Classification Search
  None
  See application file for complete search history.

(56) References Cited

U.S. PATENT DOCUMENTS 5,412,192 A   5/1995   Hoss
5,778,067 A   7/1998   Jones et al.
(Continued)

FOREIGN PATENT DOCUMENTS

JP   2002-312554 A   10/2002
KR   20090014076 A   2/2009
(Continued)

OTHER PUBLICATIONS

Urien, P., et al., "A breakthrough for prepaid payment: End to end token exchange and management using secure SSL channels created by EAP-TLS smart cards", 2011 International Conference on Collaboration Technologies and Systems (CTS), 2011. (Year: 2011).*
(Continued)

*Primary Examiner* — Neha Patel
*Assistant Examiner* — Clay C Lee
(74) *Attorney, Agent, or Firm* — Foley & Lardner LLP

(57) ABSTRACT

A computer-implemented method includes receiving an electronic enrollment request including identification information associated with a receiving financial institution holding a receiving financial account for a biller. The method includes displaying, on a user interface of a user computing device, an interactive control configured to collect user authentication data for the biller. The user holds an account with the biller. In response to receiving authentication data at the user computing device, the method includes transmitting the authentication data to a remote computing system associated with the biller, causing the remote computing system associated with the biller to generate an authentication token after validating the authentication data, generating a biller enrollment record, the biller enrolment record including the authentication token, and saving the authentication token relationally to information regarding a user and relationally to information regarding the biller.

20 Claims, 24 Drawing Sheets

Related U.S. Application Data

(60) Provisional application No. 62/787,073, filed on Dec. 31, 2018, provisional application No. 62/725,235, filed on Aug. 30, 2018.

(56) References Cited

U.S. PATENT DOCUMENTS

| | | | |
|---|---|---|---|
| 5,953,710 | A | 9/1999 | Fleming |
| 6,016,484 | A | 1/2000 | Williams et al. |
| 6,353,811 | B1 | 3/2002 | Weissman |
| 6,615,194 | B1 | 9/2003 | Deutsch et al. |
| 6,865,547 | B1 | 3/2005 | Brake et al. |
| 6,873,974 | B1 | 3/2005 | Schutzer |
| 6,993,510 | B2 | 1/2006 | Guy et al. |
| 7,086,586 | B1 | 8/2006 | Sullivan |
| 7,287,695 | B2 | 10/2007 | Wankmueller |
| 7,395,243 | B1 * | 7/2008 | Zielke ............ G06Q 20/10 705/40 |
| 7,398,919 | B2 | 7/2008 | Cooper |
| 7,400,883 | B2 | 7/2008 | Rivers et al. |
| 7,631,803 | B2 | 12/2009 | Peyret et al. |
| 7,757,944 | B2 | 7/2010 | Cline et al. |
| 7,774,274 | B2 | 8/2010 | Jones et al. |
| 7,822,206 | B2 | 10/2010 | Birk et al. |
| 7,827,057 | B1 | 11/2010 | Walker et al. |
| 7,860,790 | B2 | 12/2010 | Monk |
| 7,909,243 | B2 | 3/2011 | Merkow et al. |
| 7,925,285 | B2 | 4/2011 | Indirabhai |
| 7,930,225 | B2 | 4/2011 | Wahlberg et al. |
| 7,945,776 | B1 | 5/2011 | Atzmony et al. |
| 7,958,049 | B2 | 6/2011 | Jamison et al. |
| 7,970,669 | B1 | 6/2011 | Santos |
| 8,019,365 | B2 | 9/2011 | Fisher |
| 8,078,140 | B2 | 12/2011 | Baker et al. |
| 8,126,806 | B1 | 2/2012 | Dimartino et al. |
| 8,160,959 | B2 | 4/2012 | Rackley et al. |
| 8,215,560 | B2 | 7/2012 | Granucci et al. |
| 8,280,788 | B2 | 10/2012 | Perlman |
| 8,401,904 | B1 | 3/2013 | Simakov et al. |
| 8,433,657 | B2 | 4/2013 | Dinan |
| 8,452,257 | B2 | 5/2013 | Granucci et al. |
| 8,467,766 | B2 | 6/2013 | Rackley et al. |
| 8,468,587 | B2 | 6/2013 | Blinn et al. |
| 8,489,067 | B2 | 7/2013 | Rackley, III et al. |
| 8,504,699 | B2 | 8/2013 | Vaughan et al. |
| 8,533,123 | B2 | 9/2013 | Hart |
| 8,538,845 | B2 | 9/2013 | Liberty |
| 8,548,908 | B2 | 10/2013 | Friedman |
| 8,555,361 | B2 | 10/2013 | Nakhjiri et al. |
| 8,566,237 | B2 | 10/2013 | Forzley |
| 8,566,239 | B2 | 10/2013 | Arthur et al. |
| 8,571,953 | B2 | 10/2013 | Gopalakrishnan et al. |
| 8,589,290 | B2 | 11/2013 | Baskerville |
| 8,615,468 | B2 | 12/2013 | Varadarajan |
| 8,626,632 | B1 | 1/2014 | Dolan et al. |
| 8,627,424 | B1 | 1/2014 | O'Malley et al. |
| 8,635,131 | B1 | 1/2014 | Saunders |
| 8,639,621 | B1 | 1/2014 | Ellis et al. |
| 8,645,971 | B2 | 2/2014 | Carlson et al. |
| 8,676,704 | B2 | 3/2014 | Ledbetter et al. |
| 8,682,802 | B1 | 3/2014 | Kannanari |
| 8,700,729 | B2 | 4/2014 | Dua |
| 8,706,628 | B2 | 4/2014 | Phillips |
| 8,725,576 | B2 | 5/2014 | Fisher |
| 8,725,577 | B2 | 5/2014 | Fisher |
| 8,732,080 | B2 | 5/2014 | Karim |
| 8,744,966 | B1 | 6/2014 | Amacker et al. |
| 8,750,901 | B1 | 6/2014 | Gupta et al. |
| 8,762,265 | B2 | 6/2014 | Kessler et al. |
| 8,762,270 | B1 | 6/2014 | Evans et al. |
| 8,768,830 | B1 | 7/2014 | Jorgensen et al. |
| 8,768,834 | B2 | 7/2014 | Zacarias et al. |
| 8,774,781 | B1 | 7/2014 | Speiser et al. |
| 8,781,955 | B2 | 7/2014 | Schamer et al. |
| 8,831,677 | B2 | 9/2014 | Villa-Real |
| 8,838,501 | B1 | 9/2014 | Priebatsch |
| 8,843,125 | B2 | 9/2014 | Kwon et al. |
| 8,843,417 | B2 | 9/2014 | Hammad |
| 8,880,432 | B2 | 11/2014 | Collins, Jr. |
| 8,924,246 | B1 | 12/2014 | Chen et al. |
| 8,925,805 | B2 | 1/2015 | Grigg et al. |
| 8,972,297 | B2 | 3/2015 | Kay et al. |
| 8,977,251 | B2 | 3/2015 | Grigg et al. |
| 8,989,712 | B2 | 3/2015 | Wentker et al. |
| 9,020,836 | B2 | 4/2015 | Fisher et al. |
| 9,026,460 | B2 | 5/2015 | Grigg et al. |
| 9,027,109 | B2 | 5/2015 | Wolberg-Stok et al. |
| 9,031,880 | B2 | 5/2015 | Bishop et al. |
| 9,037,509 | B1 | 5/2015 | Ellis et al. |
| 9,043,240 | B2 | 5/2015 | Langus et al. |
| 9,043,605 | B1 | 5/2015 | Machani |
| 9,098,190 | B2 | 8/2015 | Zhou et al. |
| 9,111,266 | B2 | 8/2015 | Kessler et al. |
| 9,177,307 | B2 | 11/2015 | Ross et al. |
| 9,208,488 | B2 | 12/2015 | Liberty |
| 9,208,528 | B2 | 12/2015 | Chelst et al. |
| 9,218,624 | B2 | 12/2015 | Moghadam |
| 9,256,876 | B2 | 2/2016 | Vasant Akole et al. |
| 9,286,606 | B2 | 3/2016 | Diamond |
| 9,324,068 | B2 | 4/2016 | Soundararajan |
| 9,361,616 | B2 | 6/2016 | Zhou et al. |
| 9,424,572 | B2 | 8/2016 | Bondesen et al. |
| 9,473,491 | B1 * | 10/2016 | Johansson .......... H04L 63/0838 |
| 9,652,770 | B1 | 5/2017 | Kurani et al. |
| 9,691,058 | B2 | 6/2017 | Epler et al. |
| 9,704,157 | B1 | 7/2017 | Ellis et al. |
| 9,741,051 | B2 | 8/2017 | Carpenter et al. |
| 9,785,934 | B2 | 10/2017 | Davis et al. |
| 9,805,363 | B1 | 10/2017 | Rudnick et al. |
| 9,818,109 | B2 | 11/2017 | Loh |
| 9,928,518 | B1 | 3/2018 | Vippagunta et al. |
| 9,972,047 | B1 | 5/2018 | Elliott et al. |
| 10,019,740 | B2 | 7/2018 | Simantov et al. |
| 10,115,112 | B2 | 10/2018 | Fordyce, III |
| 10,121,129 | B2 | 11/2018 | Kalgi |
| 10,223,710 | B2 | 3/2019 | Purves et al. |
| 10,242,368 | B1 | 3/2019 | Poole |
| 10,380,596 | B1 | 8/2019 | Butler et al. |
| 10,395,247 | B2 | 8/2019 | Gilliam et al. |
| 10,402,897 | B1 | 9/2019 | Czyzewski et al. |
| 10,445,739 | B1 | 10/2019 | Sahni et al. |
| 10,467,615 | B1 | 11/2019 | Omojola et al. |
| 10,515,356 | B2 | 12/2019 | Cronic et al. |
| 10,565,558 | B2 | 2/2020 | Fredericks et al. |
| 10,586,236 | B2 | 3/2020 | Pourfallah et al. |
| 10,600,128 | B2 | 3/2020 | Graham et al. |
| 10,817,950 | B1 | 10/2020 | Iqbal et al. |
| 10,853,787 | B1 | 12/2020 | Mango |
| 10,887,301 | B1 | 1/2021 | Vera et al. |
| 11,042,882 | B2 | 6/2021 | Ledford et al. |
| 11,068,866 | B1 * | 7/2021 | Hecht ............ G06Q 20/385 |
| 11,144,902 | B2 | 10/2021 | Gaddam et al. |
| 11,151,546 | B2 | 10/2021 | Mossoba et al. |
| 11,210,715 | B2 | 12/2021 | Lindsey et al. |
| 11,228,660 | B2 | 1/2022 | Rapaka et al. |
| 11,270,293 | B2 | 3/2022 | Salama et al. |
| 11,334,579 | B1 | 5/2022 | Quade et al. |
| 11,416,766 | B2 | 8/2022 | Chao et al. |
| 11,422,393 | B2 | 8/2022 | Stray et al. |
| 11,436,581 | B1 | 9/2022 | Walker et al. |
| 2002/0032602 | A1 | 3/2002 | Lanzillo et al. |
| 2002/0052852 | A1 | 5/2002 | Bozeman |
| 2002/0062249 | A1 | 5/2002 | Iannacci |
| 2002/0174016 | A1 | 11/2002 | Cuervo |
| 2002/0198829 | A1 | 12/2002 | Ludwig et al. |
| 2003/0028481 | A1 | 2/2003 | Flitcroft et al. |
| 2003/0040964 | A1 | 2/2003 | Lacek |
| 2003/0055785 | A1 | 3/2003 | Lahiri |
| 2003/0056096 | A1 | 3/2003 | Albert et al. |
| 2003/0172039 | A1 | 9/2003 | Guy et al. |
| 2004/0088349 | A1 * | 5/2004 | Beck ............ H04L 63/0407 709/203 |
| 2004/0230535 | A1 | 11/2004 | Binder et al. |
| 2004/0236632 | A1 | 11/2004 | Maritzen et al. |

(56) References Cited

U.S. PATENT DOCUMENTS

| | | |
|---|---|---|
| 2004/0254848 A1 | 12/2004 | Golan et al. |
| 2004/0260646 A1 | 12/2004 | Berardi et al. |
| 2005/0021401 A1 | 1/2005 | Postrel |
| 2005/0021457 A1 | 1/2005 | Johnson et al. |
| 2005/0043997 A1 | 2/2005 | Sahota et al. |
| 2005/0077350 A1 | 4/2005 | Courtion et al. |
| 2005/0086492 A1 | 4/2005 | Nicodemus et al. |
| 2005/0125317 A1 | 6/2005 | Winkelman et al. |
| 2005/0125668 A1 | 6/2005 | Botz |
| 2005/0133590 A1 | 6/2005 | Rettenmyer et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0129502 A1 | 6/2006 | Pastusiak et al. |
| 2006/0229985 A1 | 10/2006 | Lalwani et al. |
| 2006/0253335 A1 | 11/2006 | Keena et al. |
| 2007/0125840 A1 | 6/2007 | Law |
| 2007/0162369 A1 | 7/2007 | Hardison |
| 2007/0168354 A1 | 7/2007 | Ramer et al. |
| 2007/0170243 A1 | 7/2007 | Desany et al. |
| 2007/0174166 A1 | 7/2007 | Jones |
| 2007/0174873 A1 | 7/2007 | Griggs |
| 2007/0198432 A1 | 8/2007 | Pitroda |
| 2007/0244811 A1 | 10/2007 | Tumminaro |
| 2007/0250923 A1* | 10/2007 | M'Raihi .......... H04L 9/3228 726/18 |
| 2007/0262140 A1 | 11/2007 | Long |
| 2008/0006685 A1 | 1/2008 | Rackley, III et al. |
| 2008/0033878 A1 | 2/2008 | Krikorian et al. |
| 2008/0127317 A1 | 5/2008 | Nakhjiri |
| 2008/0203152 A1 | 8/2008 | Hammad et al. |
| 2008/0208742 A1 | 8/2008 | Arthur et al. |
| 2008/0242274 A1 | 10/2008 | Swanburg et al. |
| 2008/0294556 A1 | 11/2008 | Anderson |
| 2008/0319887 A1 | 12/2008 | Pizzi et al. |
| 2009/0027191 A1 | 1/2009 | Farah et al. |
| 2009/0043695 A1 | 2/2009 | Hickey |
| 2009/0048971 A1 | 2/2009 | Hathaway et al. |
| 2009/0063178 A1 | 3/2009 | Pousti et al. |
| 2009/0076950 A1 | 3/2009 | Chang et al. |
| 2009/0106558 A1 | 4/2009 | Delgrosso et al. |
| 2009/0157531 A1 | 6/2009 | Bui |
| 2009/0177563 A1 | 7/2009 | Bernstein et al. |
| 2009/0192873 A1 | 7/2009 | Marble |
| 2009/0271287 A1 | 10/2009 | Halpern |
| 2009/0281941 A1 | 11/2009 | Worth |
| 2009/0281951 A1 | 11/2009 | Shakkarwar |
| 2009/0319409 A1 | 12/2009 | Omidyar |
| 2009/0319427 A1 | 12/2009 | Gardner et al. |
| 2009/0327010 A1 | 12/2009 | Vadhri |
| 2009/0327151 A1 | 12/2009 | Carlson et al. |
| 2010/0057553 A1 | 3/2010 | Ameiss et al. |
| 2010/0063906 A1 | 3/2010 | Nelsen et al. |
| 2010/0076833 A1 | 3/2010 | Nelsen |
| 2010/0088188 A1 | 4/2010 | Kumar et al. |
| 2010/0114724 A1 | 5/2010 | Ghosh et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0125510 A1 | 5/2010 | Smith et al. |
| 2010/0131415 A1 | 5/2010 | Sartipi |
| 2010/0191602 A1 | 7/2010 | Mikkelsen et al. |
| 2010/0205077 A1 | 8/2010 | Hammad |
| 2010/0274655 A1 | 10/2010 | Postrel |
| 2010/0280896 A1 | 11/2010 | Postrel |
| 2010/0325048 A1 | 12/2010 | Carlson et al. |
| 2010/0332386 A1 | 12/2010 | Vancini et al. |
| 2011/0055080 A1 | 3/2011 | Ahlers et al. |
| 2011/0071914 A1 | 3/2011 | Beasley et al. |
| 2011/0106601 A1 | 5/2011 | Perlman et al. |
| 2011/0106674 A1 | 5/2011 | Perlman |
| 2011/0137797 A1 | 6/2011 | Stals et al. |
| 2011/0153397 A1 | 6/2011 | Wagenheim |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270665 A1 | 11/2011 | Kim et al. |
| 2011/0270748 A1 | 11/2011 | Graham et al. |
| 2011/0270749 A1 | 11/2011 | Bennett et al. |
| 2011/0276489 A1 | 11/2011 | Larkin |
| 2011/0289004 A1 | 11/2011 | Prakash et al. |
| 2011/0295748 A1 | 12/2011 | Woodriffe |
| 2011/0295749 A1 | 12/2011 | Scalisi |
| 2011/0313918 A1 | 12/2011 | Lawson et al. |
| 2012/0011063 A1 | 1/2012 | Killian et al. |
| 2012/0018511 A1 | 1/2012 | Hammad |
| 2012/0078735 A1 | 3/2012 | Bauer et al. |
| 2012/0078751 A1 | 3/2012 | MacPhail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0130887 A1 | 5/2012 | Meckling |
| 2012/0143705 A1 | 6/2012 | Bhattacharya et al. |
| 2012/0150687 A1 | 6/2012 | Hart |
| 2012/0158589 A1 | 6/2012 | Katzin et al. |
| 2012/0185317 A1 | 7/2012 | Wong |
| 2012/0185387 A1 | 7/2012 | Doyle |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |
| 2012/0233005 A1 | 9/2012 | White |
| 2012/0239417 A1 | 9/2012 | Pourfallah et al. |
| 2012/0253852 A1 | 10/2012 | Pourfallah et al. |
| 2012/0253913 A1 | 10/2012 | Richard |
| 2012/0254021 A1 | 10/2012 | Wohied et al. |
| 2012/0271712 A1 | 10/2012 | Katzin et al. |
| 2012/0284130 A1 | 11/2012 | Lewis et al. |
| 2012/0284195 A1 | 11/2012 | McMillen et al. |
| 2012/0290376 A1 | 11/2012 | Dryer et al. |
| 2012/0296720 A1 | 11/2012 | Pirillo |
| 2012/0301774 A1 | 11/2012 | Jiang et al. |
| 2012/0303425 A1 | 11/2012 | Katzin et al. |
| 2012/0310774 A1 | 12/2012 | Chassin |
| 2012/0323717 A1 | 12/2012 | Kirsch |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0013509 A1 | 1/2013 | Perlman et al. |
| 2013/0018777 A1 | 1/2013 | Klein |
| 2013/0018786 A1 | 1/2013 | Sher |
| 2013/0018791 A1 | 1/2013 | Mendicino et al. |
| 2013/0018792 A1 | 1/2013 | Casey et al. |
| 2013/0024364 A1 | 1/2013 | Shrivastava et al. |
| 2013/0030941 A1 | 1/2013 | Meredith et al. |
| 2013/0042261 A1 | 2/2013 | Tavormina et al. |
| 2013/0054336 A1 | 2/2013 | Graylin |
| 2013/0054454 A1 | 2/2013 | Purves et al. |
| 2013/0054469 A1 | 2/2013 | Agashe et al. |
| 2013/0060679 A1 | 3/2013 | Oskolkov et al. |
| 2013/0060689 A1* | 3/2013 | Oskolkov .......... G06Q 20/10 705/42 |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1 | 3/2013 | McCarthy |
| 2013/0073459 A1 | 3/2013 | Zacarias et al. |
| 2013/0074168 A1 | 3/2013 | Hao et al. |
| 2013/0080241 A1 | 3/2013 | Fisher |
| 2013/0080323 A1 | 3/2013 | Scipioni |
| 2013/0110628 A1 | 5/2013 | Yeo et al. |
| 2013/0110658 A1 | 5/2013 | Lyman et al. |
| 2013/0132275 A1 | 5/2013 | Enzaldo et al. |
| 2013/0132854 A1 | 5/2013 | Raleigh et al. |
| 2013/0144663 A1 | 6/2013 | Qawami et al. |
| 2013/0144702 A1 | 6/2013 | Tabor et al. |
| 2013/0151400 A1 | 6/2013 | Makhotin et al. |
| 2013/0166332 A1 | 6/2013 | Hammad |
| 2013/0168450 A1 | 7/2013 | Von Mueller et al. |
| 2013/0173456 A1 | 7/2013 | Grigg et al. |
| 2013/0173474 A1 | 7/2013 | Ranganathan et al. |
| 2013/0179336 A1 | 7/2013 | Lyons et al. |
| 2013/0179352 A1 | 7/2013 | Dwyre et al. |
| 2013/0185167 A1 | 7/2013 | Mestre et al. |

(56) References Cited

U.S. PATENT DOCUMENTS

| | | |
|---|---|---|
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226720 A1 | 8/2013 | Ahluwalia et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246258 A1 | 9/2013 | Dessert |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0254028 A1 | 9/2013 | Salci |
| 2013/0254102 A1 | 9/2013 | Royyuru |
| 2013/0254114 A1 | 9/2013 | Smith |
| 2013/0254115 A1 | 9/2013 | Pasa et al. |
| 2013/0260734 A1 | 10/2013 | Jain et al. |
| 2013/0262309 A1 | 10/2013 | Gadotti |
| 2013/0262316 A1 | 10/2013 | Hruska |
| 2013/0262317 A1 | 10/2013 | Collinge et al. |
| 2013/0275250 A1 | 10/2013 | Rodell et al. |
| 2013/0290121 A1 | 10/2013 | Simakov et al. |
| 2013/0290169 A1 | 10/2013 | Bathula et al. |
| 2013/0290176 A1 | 10/2013 | Tirumalashetty |
| 2013/0297425 A1 | 11/2013 | Wallaja |
| 2013/0297486 A1 | 11/2013 | Colborn |
| 2013/0297513 A1 | 11/2013 | Kirillin et al. |
| 2013/0304559 A1 | 11/2013 | Stone et al. |
| 2013/0304642 A1 | 11/2013 | Campos |
| 2013/0317928 A1 | 11/2013 | Laracey |
| 2013/0332344 A1 | 12/2013 | Weber |
| 2013/0346302 A1* | 12/2013 | Purves ............... G06Q 20/108 705/40 |
| 2014/0006129 A1 | 1/2014 | Heath |
| 2014/0006194 A1 | 1/2014 | Xie et al. |
| 2014/0006276 A1 | 1/2014 | Grigg et al. |
| 2014/0006277 A1 | 1/2014 | Rao |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0040139 A1 | 2/2014 | Brudnicki et al. |
| 2014/0052617 A1 | 2/2014 | Chawla et al. |
| 2014/0058855 A1 | 2/2014 | Hussein et al. |
| 2014/0058936 A1 | 2/2014 | Ren et al. |
| 2014/0058938 A1 | 2/2014 | McClung, III |
| 2014/0067677 A1 | 3/2014 | Ali et al. |
| 2014/0074581 A1 | 3/2014 | Johnson et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0089195 A1 | 3/2014 | Ward et al. |
| 2014/0096215 A1 | 4/2014 | Hessler |
| 2014/0100975 A1 | 4/2014 | Van |
| 2014/0101034 A1 | 4/2014 | Tanner et al. |
| 2014/0101048 A1 | 4/2014 | Gardiner et al. |
| 2014/0108254 A1 | 4/2014 | Lee |
| 2014/0109200 A1 | 4/2014 | Tootill et al. |
| 2014/0114856 A1 | 4/2014 | Jung et al. |
| 2014/0118704 A1 | 5/2014 | Duelli et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0129433 A1 | 5/2014 | Rosenberger |
| 2014/0136352 A1 | 5/2014 | Ramakrishna et al. |
| 2014/0143089 A1 | 5/2014 | Campos et al. |
| 2014/0188586 A1 | 7/2014 | Carpenter et al. |
| 2014/0188704 A1 | 7/2014 | Grossman et al. |
| 2014/0188718 A1 | 7/2014 | Grossman et al. |
| 2014/0188719 A1 | 7/2014 | Poornachandran et al. |
| 2014/0201086 A1 | 7/2014 | Gadotti et al. |
| 2014/0207680 A1 | 7/2014 | Rephlo |
| 2014/0210321 A1 | 7/2014 | Dixon |
| 2014/0214640 A1 | 7/2014 | Mallikarjunan et al. |
| 2014/0222670 A1 | 8/2014 | Concannon |
| 2014/0236792 A1 | 8/2014 | Pant et al. |
| 2014/0244506 A1 | 8/2014 | Gramling |
| 2014/0250003 A1 | 9/2014 | Levchin et al. |
| 2014/0258135 A1 | 9/2014 | Park et al. |
| 2014/0279097 A1 | 9/2014 | Alshobaki et al. |
| 2014/0279459 A1 | 9/2014 | Weiss et al. |
| 2014/0279469 A1 | 9/2014 | Mendes |
| 2014/0279559 A1 | 9/2014 | Smith et al. |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0304187 A1 | 10/2014 | Menn |
| 2014/0310173 A1 | 10/2014 | Caldwell |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0344153 A1 | 11/2014 | Raj et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365322 A1 | 12/2014 | Phillips |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0026049 A1 | 1/2015 | Theurer et al. |
| 2015/0032626 A1 | 1/2015 | Dill et al. |
| 2015/0032627 A1 | 1/2015 | Dill et al. |
| 2015/0046339 A1 | 2/2015 | Wong et al. |
| 2015/0066790 A1 | 3/2015 | Desanti |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0100442 A1 | 4/2015 | Van Heerden et al. |
| 2015/0100495 A1 | 4/2015 | Salama et al. |
| 2015/0112781 A1 | 4/2015 | Clark et al. |
| 2015/0120472 A1 | 4/2015 | Aabye et al. |
| 2015/0121063 A1 | 4/2015 | Maller et al. |
| 2015/0134514 A1 | 5/2015 | Chan et al. |
| 2015/0134540 A1 | 5/2015 | Law et al. |
| 2015/0137938 A1 | 5/2015 | Slaby et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0186855 A1 | 7/2015 | Bennett et al. |
| 2015/0186872 A1 | 7/2015 | Sobol et al. |
| 2015/0186875 A1 | 7/2015 | Zhang et al. |
| 2015/0186886 A1 | 7/2015 | Schwalb et al. |
| 2015/0186952 A1 | 7/2015 | Brown et al. |
| 2015/0187021 A1 | 7/2015 | Moring et al. |
| 2015/0193131 A1 | 7/2015 | Bayer et al. |
| 2015/0193745 A1 | 7/2015 | Handwerger et al. |
| 2015/0193869 A1 | 7/2015 | Del Vecchio et al. |
| 2015/0213435 A1 | 7/2015 | Douglas et al. |
| 2015/0220914 A1 | 8/2015 | Purves et al. |
| 2015/0229622 A1 | 8/2015 | Grigg et al. |
| 2015/0237026 A1 | 8/2015 | Kumar |
| 2015/0242987 A1 | 8/2015 | Lee et al. |
| 2015/0254660 A1 | 9/2015 | Allison et al. |
| 2015/0254698 A1 | 9/2015 | Bondesen et al. |
| 2015/0254699 A1 | 9/2015 | Bondesen et al. |
| 2015/0278799 A1 | 10/2015 | Palanisamy |
| 2015/0278816 A1 | 10/2015 | Fleishman et al. |
| 2015/0287015 A1 | 10/2015 | Kaplinger et al. |
| 2015/0287037 A1 | 10/2015 | Salmon et al. |
| 2015/0324768 A1 | 11/2015 | Filter et al. |
| 2015/0332252 A1 | 11/2015 | Shahrokhi et al. |
| 2015/0333964 A1 | 11/2015 | Wang et al. |
| 2015/0339662 A1 | 11/2015 | Huang et al. |
| 2015/0339663 A1 | 11/2015 | Lopreiato et al. |
| 2015/0339671 A1 | 11/2015 | Krietzman et al. |

(56) References Cited

U.S. PATENT DOCUMENTS

| | | |
|---|---|---|
| 2015/0348029 A1 | 12/2015 | Van Os et al. |
| 2015/0363810 A1 | 12/2015 | Kim et al. |
| 2015/0371212 A1 | 12/2015 | Giordano et al. |
| 2015/0371234 A1 | 12/2015 | Huang et al. |
| 2015/0371326 A1 | 12/2015 | Montesano et al. |
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0048828 A1 | 2/2016 | Lee |
| 2016/0048929 A1 | 2/2016 | Parento et al. |
| 2016/0054336 A1 | 2/2016 | Anderberg et al. |
| 2016/0063496 A1 | 3/2016 | Royyuru et al. |
| 2016/0065370 A1 | 3/2016 | Le Saint et al. |
| 2016/0071071 A1 | 3/2016 | Lazay |
| 2016/0071074 A1 | 3/2016 | Baird |
| 2016/0071096 A1 | 3/2016 | Rosca |
| 2016/0071097 A1 | 3/2016 | Lazay |
| 2016/0071099 A1 | 3/2016 | Lazay |
| 2016/0071109 A1 | 3/2016 | Lazay |
| 2016/0071110 A1 | 3/2016 | Lazay |
| 2016/0086170 A1 | 3/2016 | Hurt et al. |
| 2016/0086179 A1 | 3/2016 | Barbier |
| 2016/0092696 A1* | 3/2016 | Guglani ............... G06F 21/335 726/26 |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0132884 A1 | 5/2016 | Fridman et al. |
| 2016/0140555 A1 | 5/2016 | Scipioni |
| 2016/0140561 A1 | 5/2016 | Cowan |
| 2016/0162882 A1 | 6/2016 | McClung, III |
| 2016/0162889 A1 | 6/2016 | Badenhorst |
| 2016/0180305 A1 | 6/2016 | Dresser et al. |
| 2016/0269416 A1 | 9/2016 | Camenisch et al. |
| 2016/0283925 A1 | 9/2016 | Lavu et al. |
| 2016/0342962 A1 | 11/2016 | Brown et al. |
| 2016/0342992 A1 | 11/2016 | Lee |
| 2016/0343043 A1 | 11/2016 | Hicks et al. |
| 2016/0379215 A1 | 12/2016 | Clerkin |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0061438 A1 | 3/2017 | Patel |
| 2017/0164139 A1 | 6/2017 | Deselaers et al. |
| 2017/0178110 A1 | 6/2017 | Swanson et al. |
| 2017/0185989 A1 | 6/2017 | Bozovich, Jr. |
| 2017/0193468 A1 | 7/2017 | Chougule et al. |
| 2017/0228715 A1 | 8/2017 | Gurunathan |
| 2017/0236118 A1 | 8/2017 | Laracey |
| 2017/0337542 A1* | 11/2017 | Kim ....................... G06F 3/048 |
| 2017/0357969 A1 | 12/2017 | Huang et al. |
| 2017/0357977 A1 | 12/2017 | Pitz et al. |
| 2017/0364914 A1 | 12/2017 | Howard |
| 2018/0007052 A1 | 1/2018 | Quentin |
| 2018/0012203 A1 | 1/2018 | Hall |
| 2018/0032981 A1 | 2/2018 | Shanmugam et al. |
| 2018/0068308 A1 | 3/2018 | Gupta et al. |
| 2018/0082283 A1 | 3/2018 | Sharma |
| 2018/0096428 A1 | 4/2018 | Gorenstein |
| 2018/0157336 A1 | 6/2018 | Harris et al. |
| 2018/0219863 A1 | 8/2018 | Tran |
| 2018/0285836 A1 | 10/2018 | Enobakhare |
| 2018/0322488 A1 | 11/2018 | Arana et al. |
| 2018/0324204 A1 | 11/2018 | McClory et al. |
| 2018/0365675 A1 | 12/2018 | Sivaraman |
| 2018/0374076 A1 | 12/2018 | Wheeler |
| 2019/0108505 A1 | 4/2019 | Perlman |
| 2019/0122222 A1 | 4/2019 | Uechi |
| 2019/0165942 A1 | 5/2019 | Subramaniam |
| 2019/0220908 A1 | 7/2019 | Wilkes |
| 2019/0236577 A1 | 8/2019 | Schmid et al. |
| 2019/0280863 A1 | 9/2019 | Meyer et al. |
| 2019/0303803 A1 | 10/2019 | Buc et al. |
| 2019/0304029 A1 | 10/2019 | Murray et al. |
| 2019/0385250 A1 | 12/2019 | Bhattacharjee et al. |
| 2020/0005277 A1 | 1/2020 | Prabhu et al. |
| 2020/0028753 A1 | 1/2020 | Powar et al. |
| 2020/0034813 A1 | 1/2020 | Calinog et al. |
| 2020/0051117 A1 | 2/2020 | Mitchell |
| 2020/0097957 A1 | 3/2020 | Driggs et al. |
| 2020/0151706 A1 | 5/2020 | Mossoba et al. |
| 2020/0175496 A1 | 6/2020 | Finke et al. |
| 2020/0219060 A1 | 7/2020 | Fredericks et al. |
| 2020/0279305 A1 | 9/2020 | Mossoba et al. |
| 2020/0372536 A1 | 11/2020 | Scislowski et al. |
| 2021/0027291 A1 | 1/2021 | Ranganathan |
| 2021/0056552 A1 | 2/2021 | Murray |
| 2021/0110392 A1 | 4/2021 | Lacoss-Arnold et al. |
| 2021/0158333 A1 | 5/2021 | Cohen et al. |
| 2021/0166260 A1 | 6/2021 | Ho et al. |
| 2021/0358754 A1 | 11/2021 | Masuoka et al. |
| 2021/0398179 A1 | 12/2021 | Kolaja et al. |
| 2022/0027873 A1 | 1/2022 | Pathuri et al. |
| 2022/0101609 A1 | 3/2022 | Hu et al. |
| 2022/0147967 A1 | 5/2022 | Clark |
| 2022/0210209 A1 | 6/2022 | Vanbuskirk et al. |
| 2022/0215356 A1 | 7/2022 | Dakshinyam et al. |

FOREIGN PATENT DOCUMENTS

| | | | |
|---|---|---|---|
| WO | WO-2011/100529 A1 | 8/2011 | |
| WO | WO-2011/113121 A1 | 9/2011 | |
| WO | WO-2011/159842 A2 | 12/2011 | |
| WO | WO-2012/139003 A2 | 10/2012 | |
| WO | WO-2013/044175 A1 | 3/2013 | |
| WO | WO-2013/079793 A1 | 6/2013 | |
| WO | WO-2014/111888 A1 | 7/2014 | |
| WO | WO-2014/134180 A2 | 9/2014 | |
| WO | WO-2014/207615 A1 | 12/2014 | |
| WO | WO-2014/210321 A2 | 12/2014 | |
| WO | WO-2015/023172 A2 | 2/2015 | |
| WO | WO-2015054697 A1 * | 4/2015 | ......... G06Q 20/4016 |
| WO | WO-2016/009198 A1 | 1/2016 | |
| WO | WO-2016/053975 A1 | 4/2016 | |
| WO | WO-2016/097879 A1 | 6/2016 | |
| WO | WO-2016153977 A1 * | 9/2016 | ......... H04L 63/0838 |
| WO | WO-2016/172107 A1 | 10/2016 | |
| WO | WO-2016/196054 A1 | 12/2016 | |
| WO | WO-2017/106309 A1 | 6/2017 | |
| WO | WO-2018/005798 A1 | 1/2018 | |

OTHER PUBLICATIONS

"Messages in the SCT interbank space—pacs.008 and pacs.002", Nov. 1, 2017, Paiementor, pp. 1-3 (Year: 2017).

Authors et al.: Disclosed anonymously, Notifying a User When a Bill is Due Using a Notification on the User's Mobile Device, Oct. 18, 2013 IP.com PAD, entire document (Year: 2013).

Message in the SCT interbank space—pacs.008 and pacs.002, Nov. 1, 2017, Paiementor, pp. 1-3 (Year: 2017).

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

Alipay, Alipay Documentation Red Packet QR Code Introduction, printed on Sep. 30, 2019 at Internet address https://intl.alipay.com/doc/redpacket/scrzsv, 2 pages.

Alipay, Trust Makes It Simple, printed on Sep. 30, 2019 from Internet address https://intl.alipay.com/, 3 pages.

Bravo, Bravo Pay, CrunchBase, printed on Sep. 30, 2019 from Internet address https://www.crunchbase.com/organization/bravo#section-overview, 9 pages.

(56) References Cited

OTHER PUBLICATIONS

Bravo, Tip or Pay Your Tour Guide Without Sharing Personal Info, printed on Sep. 30, 2019 from Internet address https://trybravo.com, 4 pages.

Bravo, Trybravo's Competitors, Revenue, Number of Employees, Funding and Acquisitions, printed from Internet address https://www.owler.com/company/trybravo on Sep. 30, 2019, 2 pages.

Dipjar, printed on Sep. 30, 2019 from Internet address https://www.dipjar.com/, 10 pages.

EMV, "Payment Tokenisation Specification Technical Framework", 2014 EMVCO, LLC. 84 pages.

Final Office Action for U.S. Appl. No. 15/401,664 dated Aug. 15, 2019.

How to Control Children's Spending on Debit Cards | Money | by Jill Paperworth, May 10, 2009, https:www.theguardian.com/money/2009/mar/.../children-debit-cards-online-spend . . . (Year: 2009).

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.

LevelUp, Restaurant Customers Expect Seamless Digital Experiences, printed on Sep. 30, 2019 from Internet address https://www.thelevelup.com/, 4 pages.

N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013,6726503. (Year: 2013).

Non-Final Office Action for U.S. Appl. No. 15/401,664 dated Mar. 4, 2019.

P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 1109/CEWIT.2013.6713767. (Year: 2013).

Smart Card Alliance, "The Mobile Payments and NFC Landscape: A U.S. Perspective," Sep. 2011. 53 pages.

Square, Inc., Grow Your Business Your Way With Square Tools, printed on Sep. 30, 2019 from Internet address https://squareup.com/us/en, 8 pages.

TSIP, Introducing Helping Heart—A Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.

Uber, How Uber Works, printed on Sep. 30, 2019 from Internet address https://www.uber.com/us/en/about/how-does-uber-work/, 6 pages.

W. Adi, A. Al-Qayedi, A. A. Zarooni and A. Mabrouk, "Secured multi-identity mobile infrastructure and offline mobile-assisted micropayment application," 2004 IEEE Wireless Communications and Networking Conference (IEEE Cat. No. 04TH8733), 2004, pp. 879-882 vol. 2, doi: 10.1109/WCNC.2004.1311302. (Year: 2004).

Wazeopedia, Main Page, printed on Sep. 30, 2019 from Internet address https://wazeopedia.waze.com/wiki/USA/Main_Page, 3 pages.

White, Ron, "How Computers Work", Que Publishing, 7th Ed, Oct. 15, 2003, p. 4. 23 pages.

Yang, Ming-Hour. "Security enhanced EMV-based mobile payment protocol." TheScientificWorldJournal vol. 2014 (2014): 864571. Doi: 10.115/2014/864571 (Year: 2014).

"Wang et al. Mobile payment security, threats, and challenges, Mar. 24, 2016, IEEE Xplore, Entire document" (Year: 2016).

Authors et al: Tianliang Lei ; Title: Investigation of Cross-Social Network User Identification; Date of Conference: Apr. 21-22, 2022. (Year: 2022).

Authors: Saygin Baksi et al; Title: Optimal primary-secondary user pairing and power allocation in cognitive cooperative multiple access channels; Date Added to IEEE Xplore: Apr. 10, 2014 (Year: 2014).

Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).

Latterell, Kayla, "How Do Gift Cards Work?," https://www.cardsource.com/news/how-do-gift-cards-work, pp. 1-6.

P2P-Paid: A Peer-to-Peer Wireless Payment System by Gao et al.(Year: 2005).

"Authors et al., Secure Authorization Token, Sep. 18, 2013, IP.com PAD, entire document" (Year: 2013).

1. Authors: Saygin Baksi et al.; Title: Optimal primary-secondary user pairing and power allocation in cognitive cooperative multiple access channels; Date Added to IEEE Xplore: Apr. 10, 2014 (Year: 2014).

2. Authors et al.: Tianliang Lei ; Title: Investigation of Cross-Social Network User Identification; Date of Conference: Apr. 21-22, 2022. (Year: 2022).

Kyrillidis; Mayes; Markantonakis, Card-present Transactions on the Internet Using the Smart CardWeb Server, 2013, IEEE, 12th, P616 (Year: 2013).

Polito et al., Inter-provider AAA and Billing of VoIP Users with Token-based Method, Dec. 26, 2007, IEEE Xplore, entire document (Year: 2007).

* cited by examiner

BILLER CONSORTIUM ENROLLMENT AND TRANSACTION MANAGEMENT ENGINE

CROSS-REFERENCE TO RELATED APPLICATIONS

This application is a continuation-in-part of U.S. application Ser. No. 16/555,934, entitled "BILLER DIRECTORY AND PAYMENTS ENGINE ARCHITECTURE", filed on Aug. 29, 2019, which claims the benefit of and priority to U.S. Provisional Patent Application No. 62/725,235 entitled "BILLER DIRECTORY AND PAYMENT CONSORTIUM SYSTEMS AND METHODS," filed Aug. 30, 2018, which also claims the benefit of and priority to U.S. Provisional Patent Application No. 62/787,073 entitled "BILLER DIRECTORY AND PAYMENT SYSTEMS AND METHODS," filed Dec. 31, 2018, which are incorporated herein by reference in their entireties.

FIELD

The present application relates generally to multiparty bill presentment and payment processing systems. In particular, the present application relates to systems, methods, and application programming interfaces (APIs) that support biller enrollment and payments engine architectures. The present application further relates to systems, methods, and media for a biller consortium enrollment and transaction management engine.

BACKGROUND

A bill payment infrastructure generally includes financial institutions, billers and customers. When ACH (Automated Clearing House) is used to make the bill payments, financial institutions can be classified as originating deposit financial institutions (ODFI) and receiving deposit financial institutions (RDFI). ODFIs hold customer accounts from which funds are withdrawn to make a bill payment. Correspondingly, RDFIs hold customer accounts where funds are deposited when a bill payment is made to a biller. While ACH is sometimes used herein as an example, the terms "originating financial institution" and "receiving financial institution" are also used herein in the context of other situations where payments may be made via other (non-ACH) payment rails (networks or platforms).

A bill payment infrastructure allows a customer of a financial institution to use online/mobile banking to make payments to the financial institution or to third-party billers. From the perspective of a particular financial institution, billers (payees) can be classified as "on-us" billers," "off-us banking" billers, and "off-us non-banking" billers. When the particular financial institution itself is the biller, the biller is an "on-us" biller. For example, a bank offering both a checking account and a credit card account to a customer is an "on-us" biller when the bank sends a credit card bill for the credit card account to the customer.

An "off-us" billing relationship exists when the biller and the financial institution are different. Depending on whether the biller is a customer of the financial institution, the "off-us" billing relationship subdivides into "banking" billers and "non-banking" billers. In an "off-us banking biller" relationship, both the biller and the payer have a banking relationship with the same financial institution. (Thus, both the biller and the billed customer are referred to as "customers" of the financial institution.) For example, a utility company may have an account in a particular bank to receive utility bill payments from a billed customer. The billed customer may also have an account with the same bank which the customer uses for making the payments to the utility company. Thus, the utility company is an "off-us banking biller."

In an "off-us non-banking biller" relationship, the biller is a customer of a different bank than the bank having the billed customer's account. For example, the biller may be a utility company that uses a different bank than the payer, and only the payer (i.e., the billed customer) that is paying the utility bill is a customer of the financial institution. As a result, two different financial institutions are involved when an "off-us non-banking biller" bills a customer. Conventionally, each financial institution has a set of its own "on-us" biller products as well as relationships with multiple "off-us" billers.

In a conventional bill payment infrastructure, many payment processes are performed off-line or in an uncoordinated fashion or both. These example processes include off-line clearing of electronic payments, third party check processing and printing, third party e-payment processor activities (such as biller directory maintenance, payee validation, and e-payment provisioning), and fraud prevention activities. In conventional arrangements, different financial institutions often do not connect, verify information, and process payments among the different financial institutions themselves. Even with third-party processors, each financial institution typically still has to set up communication infrastructures to accommodate the requirements of multiple, different third-party processors.

SUMMARY

Various embodiments may relate to systems, methods, and computer-readable media.

One example embodiment relates to a method for coordinating billing requests and payments across different financial institutions and performed by a computing system. The method comprises receiving an electronic enrollment request including identification information associated with a receiving financial institution holding a receiving financial account for a biller. The method comprises displaying, on a user interface of a user computing device, an interactive control configured to collect user authentication data for the biller. The method comprises, in response to receiving authentication data at the user computing device, transmitting the authentication data to a remote computing system associated with the biller. The method comprises causing the remote computing system associated with the biller to generate an authentication token after validating the authentication data. The method comprises generating a biller enrollment record, the biller enrolment record including the authentication token, and saving the authentication token relationally to information regarding a user and relationally to information regarding the biller. The user holds an account with the biller. According to various embodiments, the token may be an OAuth token or another type of authentication token. According to various embodiments, the token may be a full-access or a limited-scope authentication token.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

Like reference numerals indicate like elements.

DETAILED DESCRIPTION

Figure 1:
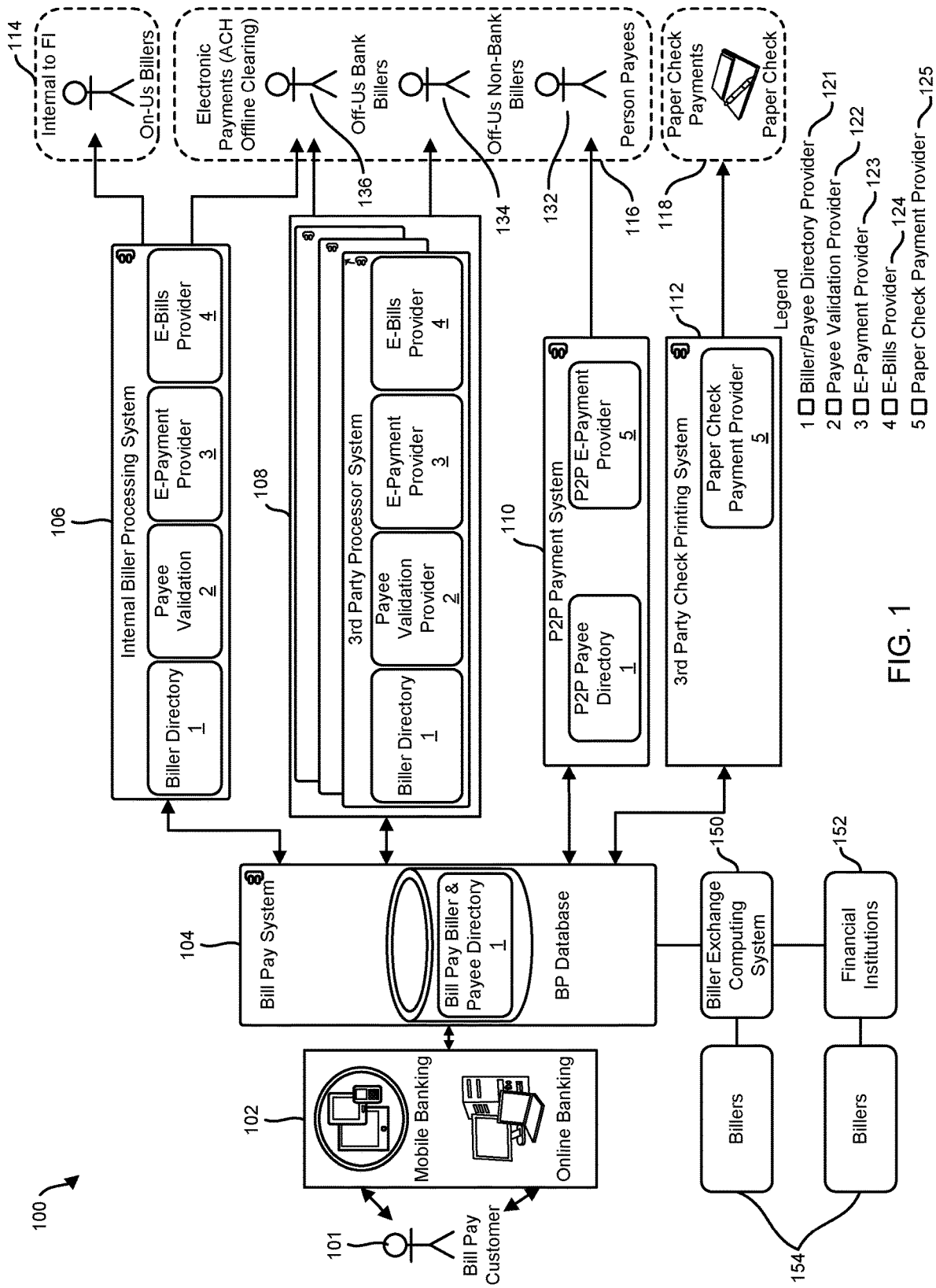
FIG. 1 is a block diagram of an example bill payment infrastructure including third-party processor entities, wherein the bill payment infrastructure includes the biller exchange computing systems and methods disclosed herein

This disclosure presents biller exchange computing systems and methods. One or more example embodiments, and/or implementation examples of the disclosed biller exchange computing systems are generally illustrated in the figures. The biller exchange computing systems include two or more members (e.g., consortium members), which may include financial institutions and third party payment processors. Financial institutions may perform "on-us" and/or "off-us" payment transactions. The biller exchange computing systems enable the member financial institutions to conduct transactions by interacting directly with each other rather than via intermediaries, thus increasing transaction efficiency. In other embodiments, intermediaries such as third party payment processors may be used, for example, in situations where third party billers are already registered with such intermediaries. Members may provide secure and real-time or instant payment transactions with minimal time delay, which is achieved through specific technical configurations. Furthermore, the biller exchange computing systems allow consumers, billers, financial institutions, and payment processors to fluidly interact with each other to reduce resistance in information flow.

At a high level, the disclosed biller exchange computing systems and methods may include a distributed application programming interface (API) system and one or more synchronized biller directories, collectively referred to as a payments engine. In some embodiments, the distributed API system is coordinated by a biller exchange computing system (e.g., providing central management). The distributed API system may be deployed on the computing systems of various financial institutions, billers, and on the biller exchange computing system. In some embodiments, financial institutions may create a separate operating entity that implements the centralized biller exchange computing system to enable secure payments. The distributed API system may also enable tokenization of access credentials to validate the payee/payer relationships between financial institutions (e.g., originating and receiving financial institutions), electronic bill inquiries, payment transactions, and so on.

Advantageously, the disclosed biller exchange computing systems and methods allow various financial institutions and billers to achieve improved customer experience, reduce costs, and achieve cross-financial institution integration. Customer experience for retail customers and billers is improved through real-time or instant display and exchange of detailed biller and payment data, expedited payment delivery and receipts, an increase in direct electronic payments, accurate payee creation and linkage, and reduced return and misapplied payment items for billers.

The disclosed biller exchange computing systems enable financial institutions to collaborate and reduce costs by streamlining electronic processing of financial transactions. This improves data security, decreases biller processing exceptions and risks, minimizes the number of parties involved in a transaction by reducing the need to use third-party processors, improves operational efficiency through standardization and reusability of components, and minimizes paper check issuance to payees. As such, the disclosed biller exchange computing systems can minimize data-related reasons for issuing paper checks, which include biller account validation rule failure, invalid actual biller accounts, or incorrect customer-entered payee names or addresses.

Furthermore, the biller exchange computing systems and methods disclosed herein allow financial institutions to reduce transaction costs and to achieve cross financial institution integration in payment processing.

For example, in some embodiments, example biller exchange computing systems and methods may use an API arrangement in which each participating entity (financial institutions, billers, and a centralized biller exchange computer system) exposes a set of APIs that are accessible to other participating entities. For example, each entity may offer an enroll customer to biller API, an inquire biller or bill API, a pay biller API, and a deliver bill API. For example, if a customer has a demand deposit account at bank A and has a mortgage with bank B, then bank B may offer an enroll customer to biller API that enables setting up bank B as a biller of the customer in the bill pay system of bank A. Thereafter, the customer may then go to online bill pay at bank A and perform other operations that are supported by the other afore-mentioned APIs (in this example, provided by bank B), such as inquire about bills, pay bills, or receive bills, without needing to visit the website of bank B. Similar functionality may be provided with respect to other billers (i.e., billers that are not financial institutions) that provide the aforementioned APIs. Hence, for example, a biller may offer an enroll customer to biller API that enables setting up the biller as a biller of the customer in the bill pay system of bank A. Thereafter, the customer may then go to online bill pay at bank A and perform other operations that are supported by the other afore-mentioned APIs (in this example, provided by the biller), such as inquiring about bills and paying bills. For example, the customer may be able to review historical transactions with the biller from the online banking website of the financial institution, retrieve copies (e.g., portable document format (PDF) copies) of recent statements, pay bills, and so on, all in real time and without needing to visit the website of the biller.

The embodiments of the biller exchange computing systems and methods described herein improve computer-related technology and includes performing, using specifically configured processors, computing devices, and computing systems, steps that cannot be done by conventional computing systems or human actors. For example, the biller exchange computing systems may be configured to execute specific data flow sequences, using one or more processors of an example biller exchange computing system, to process data relevant to payment processing transactions. Such data includes counterparty validation and historical payment transactions. This data may be used to generate programmatically codified counterparty relationships and/or to enable the generation of bills by making predictions based on historical data (e.g., payment amount predictions, due date predictions, etc.).

Advantageously, the embodiments of the biller exchange computing systems and methods described herein allow consortium members (e.g., financial institutions) to minimize fraud through advance counterparty verification and by securely exchanging sensitive customer and payment data, through an API of the biller exchange computing system, in a tokenized form.

As another advantage, the API infrastructure of the present disclosure allows for streamlining financial transactions by providing a reduced set of user interfaces delivered to the users via user computing devices (for example, as part of a mobile application, a web-based interface, etc.) and communicatively coupled to the biller exchange computing system through an API. For instance, in an example embodiment described in reference to FIGS. 7-9, the biller exchange computing system allows at least six computing devices (a customer computing device, an ODFI application/web server, an ODFI back-end computing system, the biller exchange computing system, an RDFI computing system, and a biller computing device) to seamlessly, in real-time or instant, complete an end-to-end, secure payment transaction, inclusive of processing a customer payment request, counterparty verification using tokenized information, and a funds transfer, using fewer function calls made by each of the above parties at relevant times using a single distributed API. From the perspective of the consumer, the consumer is provided with the ability to do more at a single online/mobile banking website, which reduces or eliminates the need for the consumer to visit various biller websites, and reduces the need of the various biller websites to authenticate the consumer and serve up web pages detailing the current account status and payment history of the consumer.

Figure 2A:
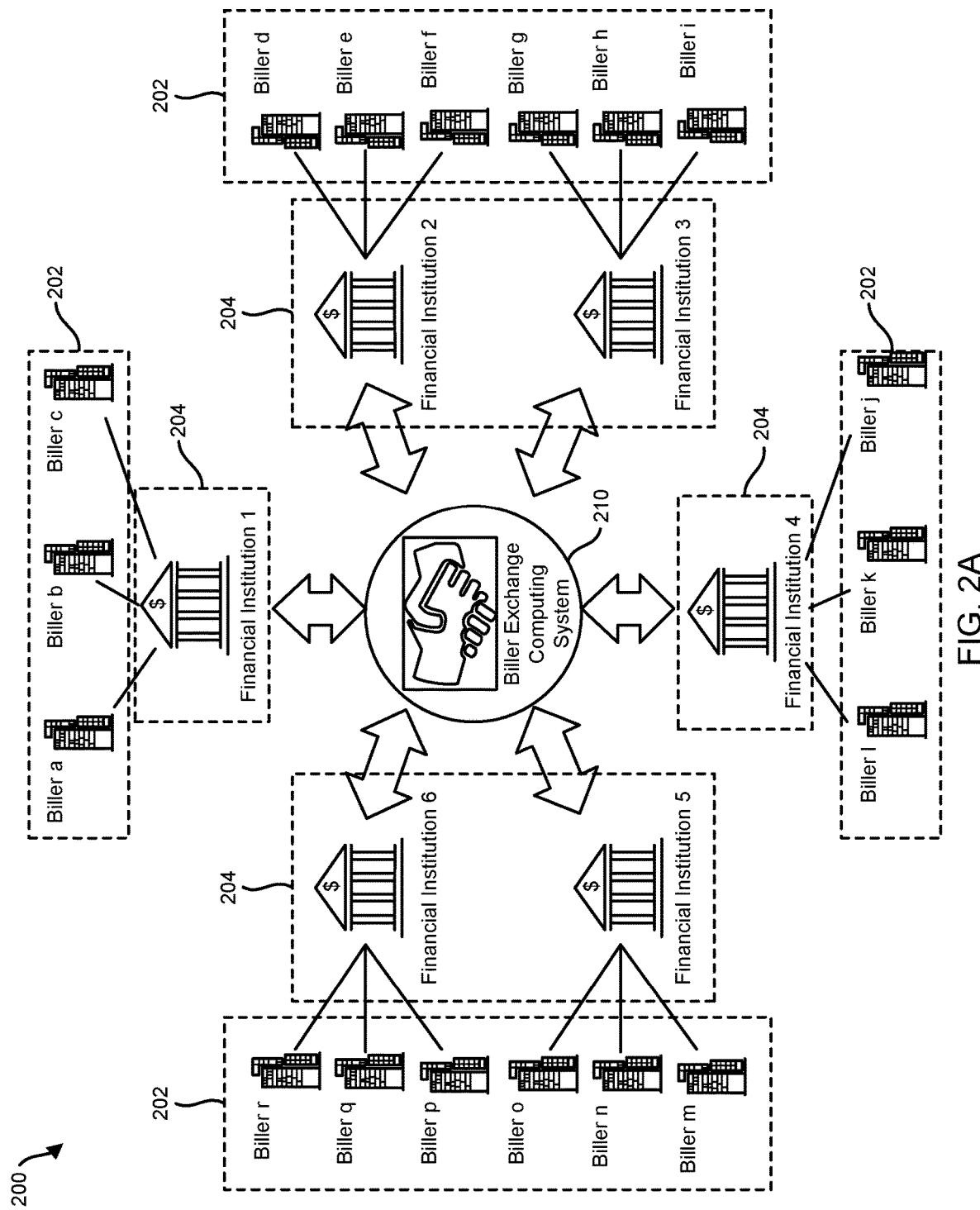
FIG. 2A is a diagram of another example bill payment infrastructure using biller exchange computing systems and methods.
Figure 2B:
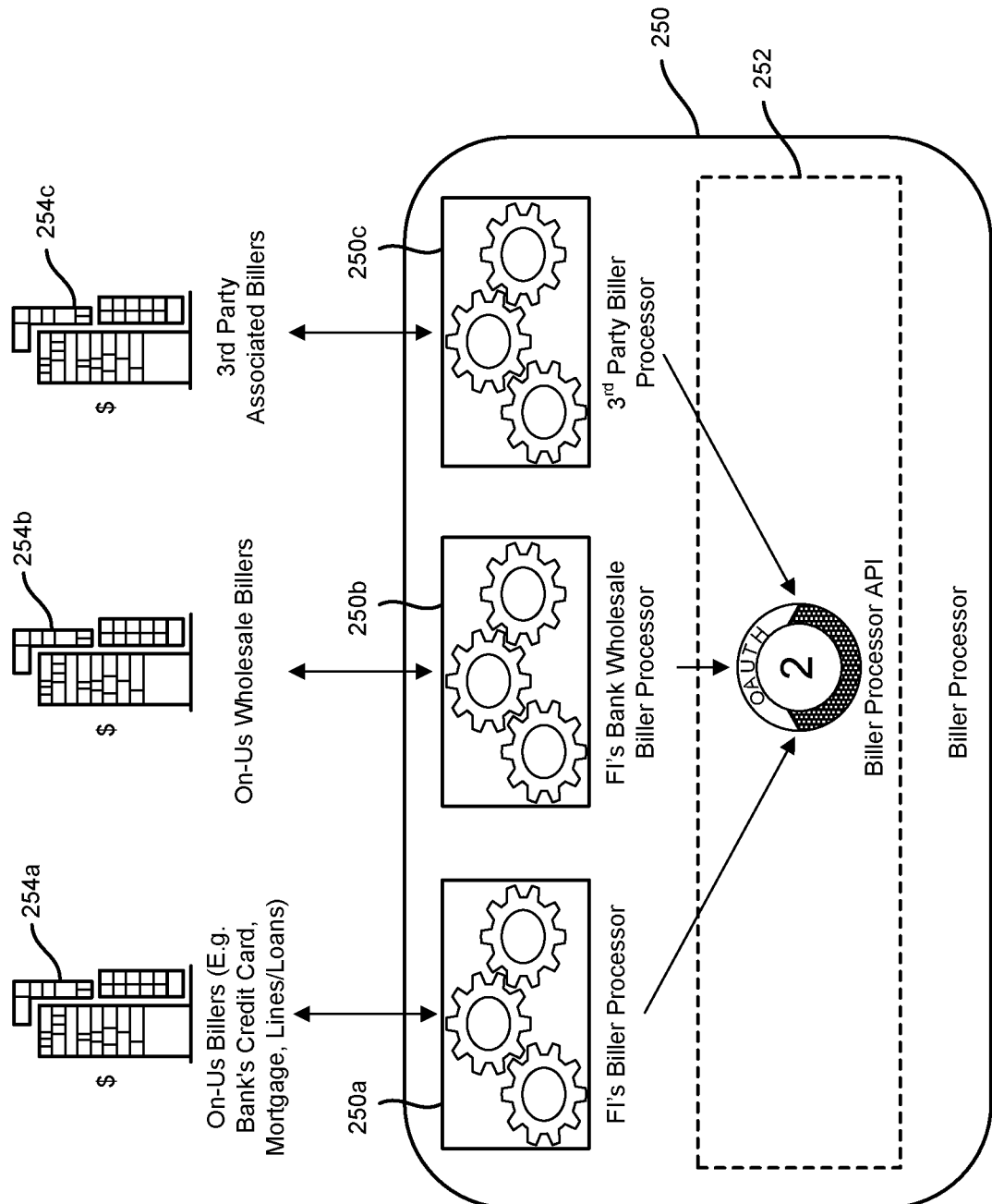
FIG. 2B is a diagram of yet another example bill payment infrastructure using biller exchange computing systems and methods, the infrastructure further including one or more biller processors.

Referring now to FIGS. 1-2B, FIGS. 1-2B are diagrams of example bill payment infrastructures that use biller exchange computing systems and methods. Each of FIGS. 1-2B provide details about different aspects of the bill payment infrastructure. Generally, FIGS. 1-2B describe, according to various embodiments, the mechanics by which a financial institution makes a payment to a biller at the request of a bill pay customer. The payment infrastructures shown in these Figures include the biller exchange computing systems and methods disclosed herein. At a high level, the biller exchange computing systems and methods disclosed herein standardize the APIs to enable system interoperability and centralize bill presentment and payment processing capabilities. One of skill will appreciate that various features of the Figures may be combined according to various embodiments.

Referring now to FIG. 1, FIG. 1 is a block diagram of an example bill payment infrastructure including third-party processor entities, where the bill payment infrastructure includes the biller exchange computing systems and methods. The systems of FIG. 1 are shown from the perspective of a financial institution making a payment to a biller. The illustrated various systems may provide a data management and communication platform for entities associated with these individual providers to perform transactions. The configuration and arrangement of these systems, and the corresponding methods for procuring, storing, securing, managing, and communicating the data can substantially affect the efficiency and capabilities of transactions, such as payment transactions, among parties associated with these different providers. The features implemented by the financial institution may include a mobile/online banking website 102, a bill pay system 104, and a biller processing system 106.

In FIG. 1, a bill pay customer 101 is shown on the far left, and various types of billers are shown on the far right. The various types of billers include an on-us biller 114, off-us banking billers 136, and off-us non-banking billers 132, 134. The biller 132 is an individual/person payee, to whom the bill pay customer 101 may also wish to make a payment. Also shown located between the bill pay customer 101 on the left and the billers 114, 132, 134 and 136 on the right are various payment systems 106, 108, 110, and 112 which may be used to make payments to the billers 114, 132, 134 and 136. The payment systems 106, 108, 110, and 112 provide various types of resources that enable making payments. The resources that each provides are indicated with legends numbered 1 through 5. The resources provided include bill/payee directories (1), payee validation (2), electronic payments (3), electronic bills (4), and paper check payments (5). Different payment systems and different resources may be used to make a given payment, depending on the type of biller, as described in greater detail below.

The bill pay customer 101 can be an individual or an institution. For example, an individual bill pay customer 101 may want to use the bill payment infrastructure 100 to pay a credit card bill, mortgage bill, utility bill, internet bill, etc. The bill pay customer 101 may use a computing device to interact with an online/mobile banking website 102 of the financial institution of the bill pay customer 101. While in the online/mobile banking website 102, the bill pay customer may interact with a bill pay system 104 of the financial institution. The interaction may include data input, responding to requests and verifications, and obtaining secure information for making transaction decisions. The computing device of the customer 101 may be configured to connect to a bill pay system 104 using various communication methods, such as via the internet, a local endpoint, etc.

The bill pay system 104 may include a directory of biller-payees. For example, if the individual bill pay customer 101 has an account with a utility company, the utility company may be included in the directory as a payee. To add the utility company as a biller, the customer 101 may access the biller directory and locate the utility company within the biller directory. Generally, a biller directory is a data store that contains payee information, such as routing information, account information, payee financial institution name and/or identifier, etc. The information in the biller directory may, for example, be provided by the biller itself during a biller registration (enrollment) process. The biller directory provides an easy way for the customer 101 to set up a new payee in the bill pay system 100, and ensures that the correct account information, routing information, etc., will be used for the newly set up biller when the customer 101 makes payments to the biller.

The bill pay system 104 is communicatively coupled (e.g., via a network) to several systems, including the internal "on-us" payment processing system 106, the third-party processor system 108, the P2P payment computer system 110 (e.g., such as Zelle®), and a third-party check printing system 112.

Generally, each of these respective systems is suitable for processing payments under specific scenarios. For example, the internal on-us payment processing system 106 may be configured to process payments made in the context of an "on us" billing relationship, such as when the same financial institution holds a deposit account and a credit card account (i.e., the "on-us" biller) of the bill pay customer 101. The internal on-us biller processing system 106 may also process "off-us" banking billers 136, such as a utility company that uses the same bank as the bill pay customer 101.

The third-party processor system 108 may be configured to process payments made to "off-us" billers, including both banking and non-banking billers. The third-party processor system 108 may further be configured to process electronic bills from off-us billers. For example, some billers may have registered with the third party processor system 108 and not with the financial institution. In such scenarios, the account information, routing information, etc., may be stored in the biller directory of the third party processor system 108, and made accessible to the bill pay system 104 via, for example, an API connection, such that the bill pay system 104 can make a payment to the biller through the third-party processor system 108.

The P2P payment computer system 110 may be configured to process peer-to-peer payments, such as when the bill pay customer 101 pays another individual. The third-party check printing system 112 may process paper checks 118 for any of the above scenarios. In some embodiments, the biller exchange computing systems disclosed herein uses the third-party printing system 112 to process, issue, or receive check payments 118, for example, via check printer or mail delivery, as a compatibility mechanism to handle paper checks. The P2P payment computer system 110 may further be coupled with or connected to the biller exchange computing systems and methods disclosed herein, and thus be modified, changed, upgraded, or otherwise improved to process transactions.

Also shown in FIG. 1 are a biller exchange computing system 150 (sometimes referred to as an on-we exchange computing system), one or more additional financial institutions 152, and additional billers 154 connected to the one or more additional financial institutions and the biller exchange computing system. These features are described in greater detail below in connection with the Figures that follow.

Referring now to FIG. 2A, FIG. 2A describes at a high level a centralized biller exchange computing system 210 that enables communication between multiple financial institutions and billers. The infrastructure of FIG. 2A is shown from the perspective of the biller exchange computing system 210, which provides the API features that connects multiple billers and financial institutions. The biller exchange computing system 210 may perform or enable both on-us and off-us billing transactions, among other various types of transactions. The biller exchange computing system 210 may be communicatively coupled to various financial institutions 204, such as banks or similar entities receiving, lending, collecting, investing, borrowing, or otherwise transferring funds as an agent or a principal in association with one or more separate entities. Each of these financial institutions 204 can have its own set of "on-us" billing products, such as mortgage loans, credit cards, etc.

As shown, each of these financial institutions 204 can also have its own relationships with one or more "off-us" billers 202, which can be banking or non-banking billers. Through the biller exchange computing system 210, customers may have enhanced access to billing information associated with the various billers. These relationships are managed by the biller exchange computing system 210 through a secure enrollment process (for example, using the OAuth authorization protocol as described further herein). The secure enrollment process may be a one-time process or may include periodic information intake. The secure enrollment process may require multi-factor authorization or other identification/verification process.

According to various implementations, the biller exchange computing system 210 can utilize a distributed API system, which can include callable functions accessible to the computing systems of the various financial institutions 204 and/or "off-us" billers 202. The distributed API can be deployed on the biller exchange computing system 210, on the computing systems of the various financial institutions 204, and/or on the computing systems of the various "off-us" billers 202.

The biller exchange computing system 210 enables real-time executions, including for example, customer-biller enrollment, biller information inquiry, payment transactions, and delivery of bills. In addition, the biller exchange computing system 210 may provide expedited access to biller data and payment transactions across multiple different financial institutions 204. The distributed API is configured to enable bill presentment requests, payment requests, enrollment, data synchronization, and/or clearance and settlement activities.

Referring now to FIG. 2B, FIG. 2B describes at a high level a bill payment infrastructure that includes one or more biller processors and a biller exchange computing system, such as the biller exchange computing systems of FIG. 1 and FIG. 2A. The infrastructure of FIG. 2B is shown from the perspective of a biller processor.

Generally, a biller processor is an intermediary entity between a biller and a biller's financial institution. A biller processor may be a financial institution's biller processor 250a, the biller financial institution's wholesale biller processor 250b, or a third-party biller processor 250c. A financial institution's biller processor 250a may be internal to or associated with a financial institution, such as an on-us biller 254a. For example, a bank may offer a credit card product, a mortgage product, and various lines of credit and loan products. For these on-us billers (e.g., the bank's own billers or products), the bank may use the financial institution's biller processor 250a to route the payments to and from recipient banks, where each product may have different accounts to which the funds are routed such that each product is associated with an individual biller. A biller financial institution's wholesale biller processor 250b may be associated with wholesale biller products 254b offered by a financial institution. For example, a bank may have a commercial banking product offered to large retailers, such that the bank is a wholesale biller for the payments processed on behalf of the retailer, where the bank is the custodian of the retailer's account to which the payments are posted. A third-party biller processor 250c may be associated with a third-party biller 254c, such that payments may be routed to the third-party biller processor 250c. In some embodiments, each of the financial institution's biller processor 250a, the biller financial institution's wholesale biller processor 250b, or a third-party biller processor 250c has its own biller directory, which may be synchronized via the biller processor API 252 as described further herein.

Each biller processor is associated with a biller processor computing system 250 (e.g., each biller processor may have its own computing system 250). The biller processor computing system 250 includes a biller processor API 250. The biller processor API 250 is managed and/or deployed using the biller exchange computing system and is structured to connect multiple billers with financial institutions via biller processors, as described further herein. The biller processor API 250 enables biller processors to participate in payment ecosystems and processes described further herein.

In some embodiments, some or all biller and/or RDFI functions are performed on behalf of the biller by the biller processor. For example, the biller processor computing system 250 may be structured to generate bills (e.g., statements, invoices, electronic payment requests, etc.), look up authorization information, cause the generation of OAuth authentication tokens, retrieve and/or manage the OAuth authentication tokens, etc.

In some embodiments, the biller processor computing system 250 may be structured to transmit payment requests from a plurality of billers in an aggregated fashion. For example, the biller processor computing system 250 may be associated with a plurality of billers and may be structured to transmit multiple payment requests, bills, etc. to a customer or each of a plurality of customers in a single batch and/or API message. In some embodiments, the biller processor computing system 250 may be structured to manage a plurality of products (e.g., payer accounts of different types, such as a credit card, a mortgage, a home equity line, etc.) for one or more billers and may be structured to transmit payment requests for multiple products or accounts to a payee in a single batch and/or API message.

In some embodiments, the biller processor computing system 250 may be structured to receive data from a biller in an aggregated fashion (e.g., in a single data file that includes bills for a plurality of payers). In some embodiments, the biller processor computing system 250 may be structured to parse the data file and generate a plurality of API messages, each comprising one or more payment request records grouped by payer, by product, etc. In some embodiments, this information is further enriched with ODFI information such that the bills are grouped by ODFI (e.g., where multiple payers have auto-pay set up using source accounts at the same ODFI). In one example, Sam and Joe may have accounts at the same ODFI and both may have auto-pay set up for the same biller. The biller processor computing system 250 may be structured to group the bills received for Sam and Joe into a single data stream or electronic message such that their payments are processed together (e.g., such that the ODFI sends a total amount for both bills and the biller processor computing system 250 parses the remittance record associated with the ODFI and identifies the bills for Sam and Joe and the corresponding bills and target account(s) to post the payment to.) In such embodiments, the biller processor computing system 250 may store data (e.g., authentication tokens, such as OAuth tokens) related to the payees' source accounts (e.g., ODFI accounts) in addition to storing data related to the payees' biller accounts (e.g., credit card accounts) or other biller products. The biller processor computing system 250 may store a cross-reference table linking a customer's OAuth token for a biller account to the customer's OAuth token for the source account. In some embodiments, instead of or in addition to maintaining OAuth tokens for source accounts, the biller processor computing system 250 may store a cross-reference table linking a customer's OAuth token for a biller account to identifying information for an auto-pay source account (e.g., routing number, account number, auto-pay amount, auto-pay date, etc.) In some embodiments, this information is encoded in the customer's OAuth token for the biller account. In some embodiments, this information is stored relationally to the customer's OAuth token for the biller account and is linked by an identifier other than an OAuth token for the source account such that no OAuth token for the source account needs to be created.

FIGS. 3-6 show various aspects of biller exchange computing systems and methods, according to example embodiments. Generally, biller exchange computing systems and methods disclosed herein provide a set of standardized APIs (e.g. distributed APIs) and processing capabilities (collectively, also sometimes referred to as a payments engine) that enable financial institutions to make payments to billers at the request of bill pay customers or in response to receiving a bill from a biller. The payments engine disclosed herein is structured to enable interoperability among various actors in payments ecosystems described above. For example, the payments engine disclosed herein can be used to enable bill presentment requests, payment requests, enrollment, data synchronization, and/or clearance and settlement activities.

System interoperability, enabled by the systems and methods of the present disclosure, provides the technical benefit of efficiency in incorporating new member systems into the exchange via ready-to-deploy APIs and related electronic data interchange (EDI) functionality. This benefit is particularly evident in hybrid environments, where participant systems may each operate according to different specifications but are nevertheless enabled to exchange transaction data in a consistent format via the APIs disclosed herein. A secondary technical benefit of a standardized API is its improved interface and transaction status monitoring.

To enable system interoperability, transactions are implemented through a distributed set of APIs. Some aspects thereof may be structured according to standardized formats such that various parties may send and receive data according to a predetermined protocol (e.g., EDI format and messaging schema.) Further, in some embodiments, as described herein, the systems and methods of the present disclosure may make use of existing EDI specifications but further enhance EDI messages developed according to these specifications to accommodate exchange participant requirements. Enhancing already existing EDI specifications and/or authorization infrastructures, such as OAuth, provides the technical benefit of streamlined participant on-boarding, API deployment, and system integration. At the same time, the ability to further augment already existing specifications and authorization infrastructures ensures that system security is not compromised as a result of standardization. This is achieved, in some embodiments, by supporting institution-specific security requirements through extensible tokenization, as discussed further herein.

Figure 3:
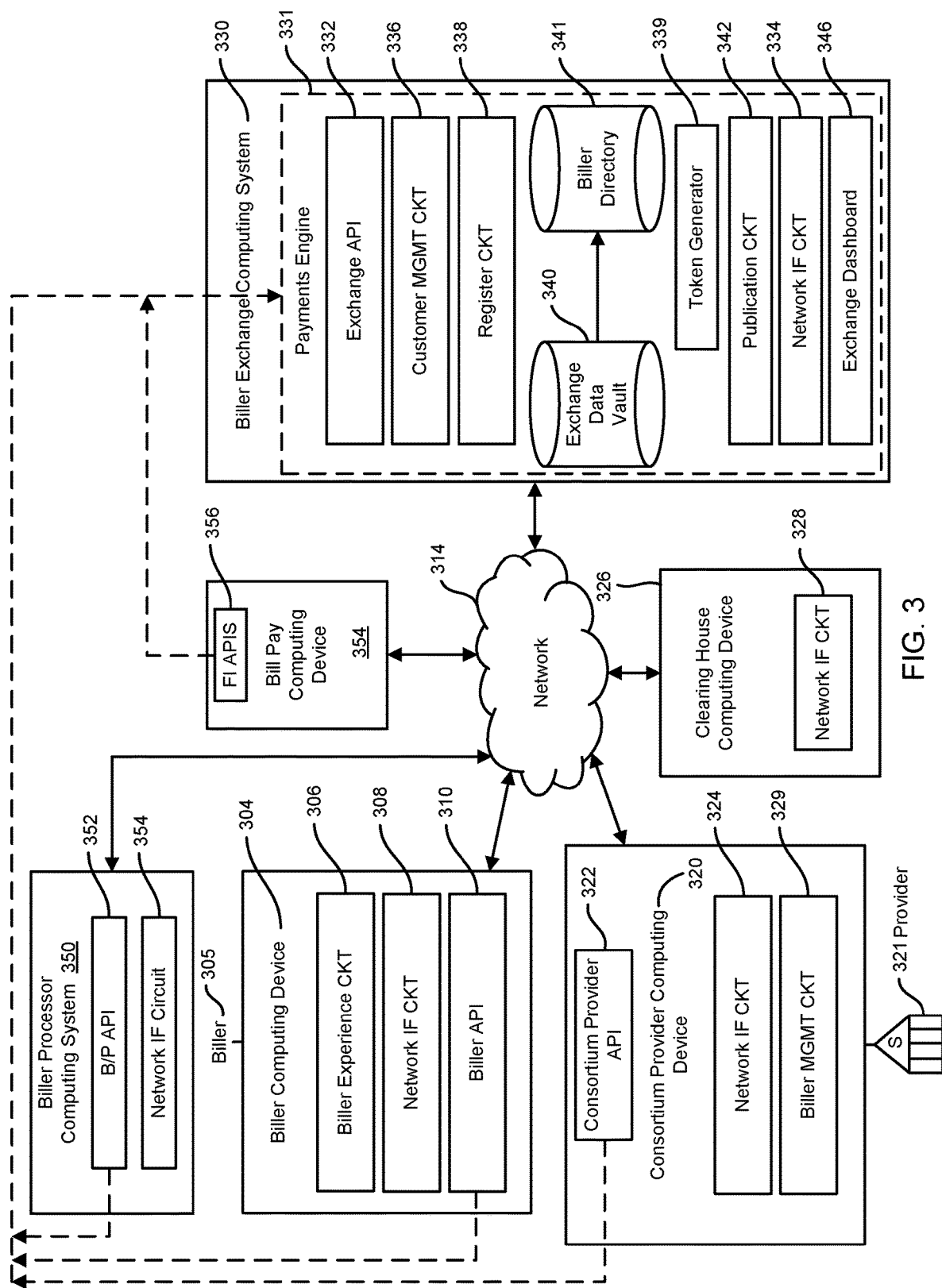
FIG. 3 is a block diagram of an example bill payment computing environment using biller exchange computing systems and methods applicable to the example bill payment infrastructures disclosed herein.
Figure 4:
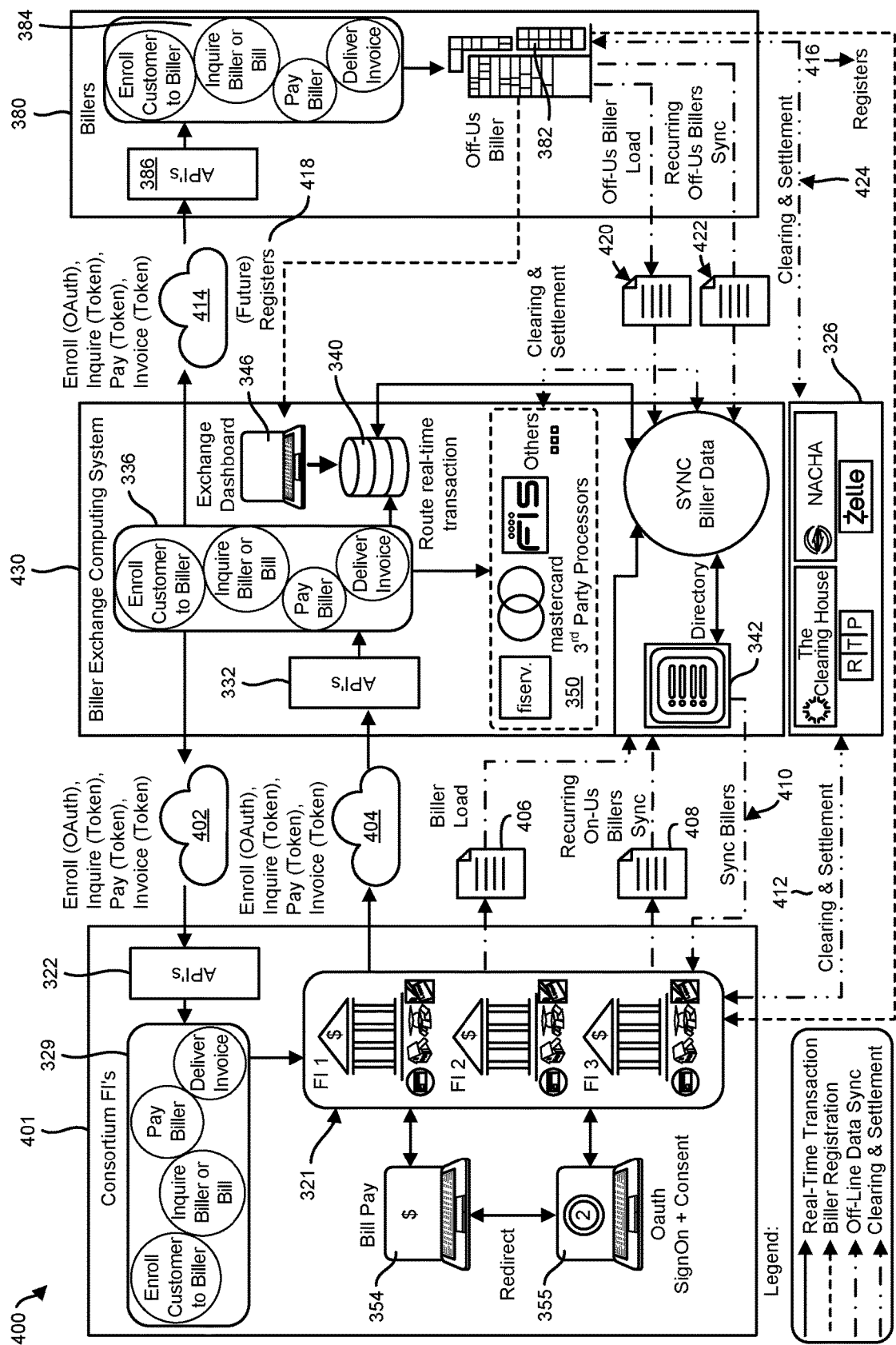
FIG. 4 is a data flow diagram of a detailed example bill payment computing environment using biller exchange computing systems and methods.
Figure 5:
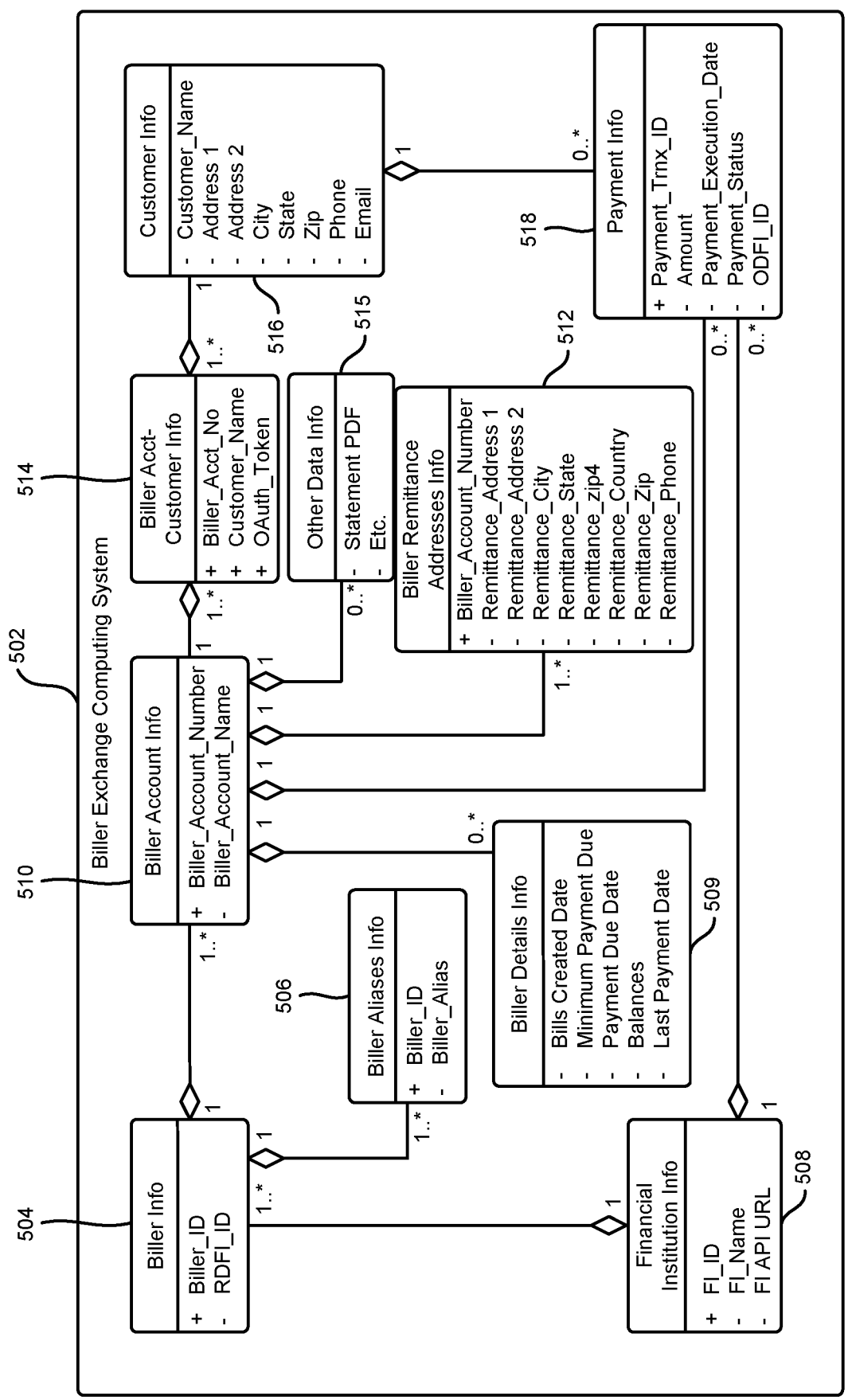
FIG. 5 is a data model diagram of one example data store used in the example biller exchange computing system.
Figure 6:
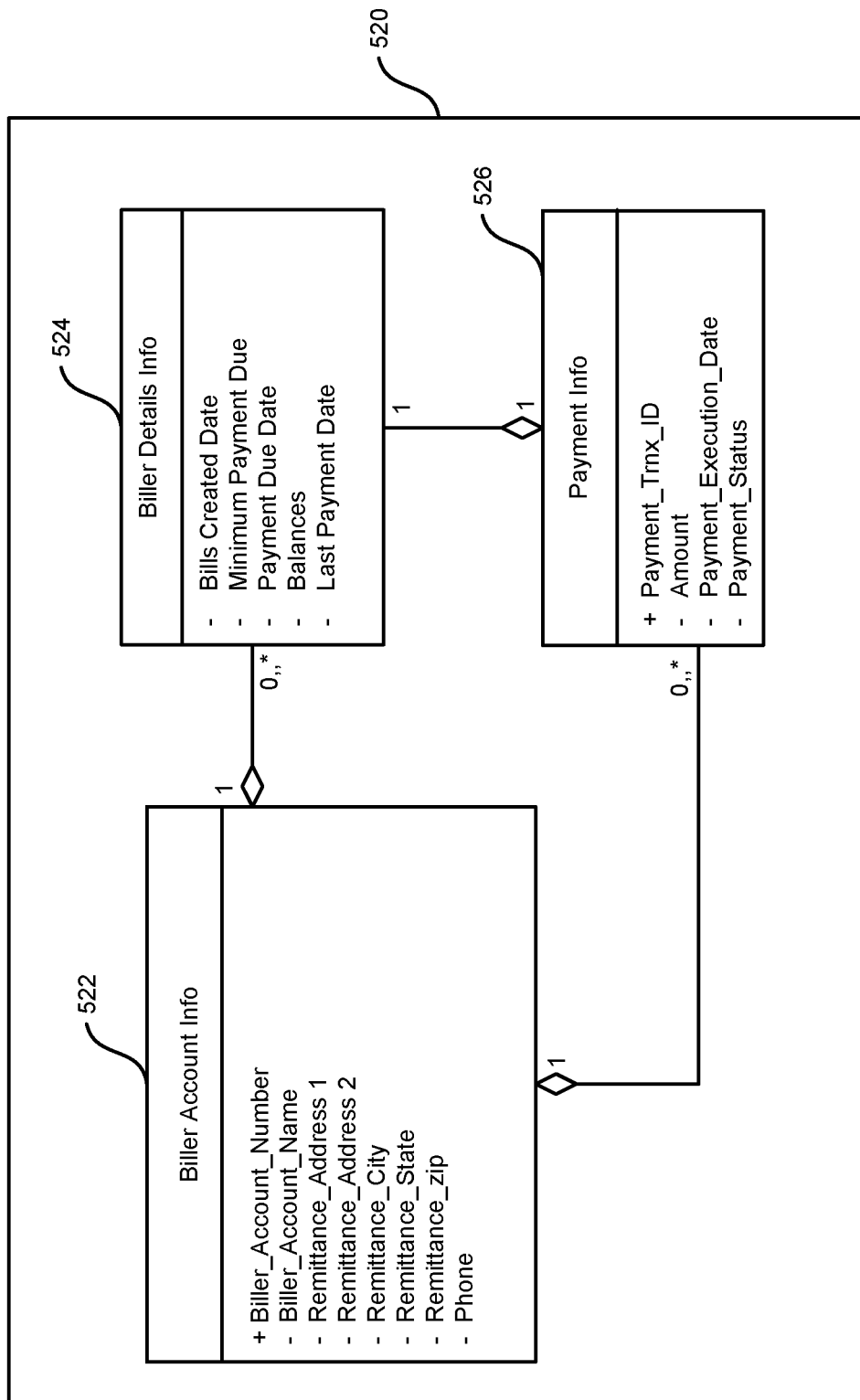
FIG. 6 is a data model diagram of another example data store associated with a biller computing device for use in the example biller exchange computing system.

FIG. 3 shows details of network interconnection and logic contained at various computer systems of financial institutions, billers, bill pay customers, and the biller exchange computing system. FIG. 4 shows details of data flows between financial institutions, billers, and the biller exchange computing system. In some embodiments, the biller exchange computing system is implemented by a consortium of financial institutions, and therefore is sometimes referred to as an "on-we" exchange computing system. In some embodiments, one or more financial institutions may perform one or more of the functions of the biller exchange computing system such that, in some implementations, the biller exchange computing system is not implemented by a stand-alone entity. FIGS. 5 and 6 show example data models for the payments engine embodied in the systems of FIGS. 3 and 4.

Referring now to FIG. 3, FIG. 3 is a block diagram of an example bill payment computing environment using biller exchange computing systems and methods applicable to the example bill payment infrastructures disclosed herein. The bill payment computing environment may include a biller computing device 304, a financial institution computing device 320, a clearinghouse computing device 326, a user computing device 354, a biller exchange computing system 330, and/or a biller processor computing system 350. According to various embodiments, all or some of these components can be standalone or combined. For example, any of the biller computing system 304, financial institution computing system 320, clearinghouse computing system 326, and/or biller processor computing system 350 can be individual devices or combined/integrated with the biller exchange computing system 330. In one example embodiment, the biller exchange computing system 330 may be structured to manage and deploy aspects of its payments engine via the APIs. The API libraries may be installed on the respective computing systems and/or made accessible to the respective computing system(s) without being installed on the respective computing systems.

In the embodiment of FIG. 3, the biller exchange computing system 330 is managed and/or operated a consortium of financial institutions, such as banks. The biller computing system 304 is managed and/or operated by a biller. Generally, the biller holds a deposit account at a financial institution that receives payment transactions where payment funds are deposited into the deposit account of the biller. The biller processor computing system 350 is managed by a biller processor.

As shown, each of the user computing device 354 (e.g., used by the bill pay customer), the biller computing system 304, the financial institution computing system 320, the clearinghouse computing system 326, the biller exchange computing system 330, and the biller processor computing system 350 are communicatively coupled via the network 314. The network 314 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments or combinations, the network 314 includes a local area network or a wide area network. In some embodiments, the network 314 includes the internet. The network 314 is enabled by short- and/or long-range communication technologies, such as Bluetooth® transceivers, Bluetooth® beacons, RFID transceivers, NFC transceivers, Wi-Fi transceivers, cellular transceivers, wired network connections (e.g., Ethernet), etc.

Each of the biller computing system 304, the financial institution computing system 320, the clearinghouse computing system 326, the biller exchange computing system 330, and the biller processor computing system 350 have respective network interface circuits, such as the network interface circuits 310, 324, 328, 334 and 354. The network interface circuits 310, 324, 328, 334 and 354 may include components described herein and/or additional similar components that allow and/or enable connectivity to the network 314. In some embodiments, data that passes through the respective network interface circuits 310, 324, 328, 334 and 354 is cryptographically protected (e.g., encrypted) such that each of the network interface circuits 310, 324, 328, 334 and 354 is a secure communication module.

In some embodiments, data passing through the respective network interface circuits 310, 324, 328, 334 and 354 is tokenized such that sensitive data (for example, account number(s), user location, personally identifiable information, and the like) is obscured for transmission within or outside the computing environment. Various communication protocols can be used, including, for example, any of the Internet protocol (IP), transmission control protocol (TCP), hypertext transfer protocol (http), simple object access protocol (SOAP), file transfer protocol (FTP), etc. In some embodiments, secure versions of internet protocols may be used to exchange data via the network interface circuits 310, 324, 328, 334 and 354, such as IPsec, https://, etc.

Data, messages, packages, etc. may be transferred over the network 314, through network interface circuits 310, 324, 328, 334 and 354, using application programming interfaces (APIs) 310, 322, 332, 354 and 356. For example, each entity may offer an enroll customer to biller API, an inquire biller or bill API, a pay biller API, and a deliver bill API. In some embodiments, some or all functions of the API can be stored in a storage media that is communicatively coupled but not local to the respective system, such as cloud-based storage. Thus, the functions of the API can be executed by or on each respective computing environment.

The distributed API is used by computing systems to exchange data and make function calls in a structured format. The distributed API (e.g., biller APIs 308, financial institution APIs 322, exchange APIs 332, biller processor API 352, bill pay user financial institution API 356, etc.) may be configured to specify an appropriate communication protocol using a suitable EDI standard or technology. The EDI standard (e.g., messaging standard and/or supporting technology) may include any of a SQL data set, a protocol buffer message stream, an instantiated class implemented in a suitable object-oriented programming language (e.g., Java, Ruby, C #, etc.), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC), etc.). As such, EDI messages may be implemented in any of the above or using another suitable technology.

Further, in some embodiments, data is exchanged by components of the payments engine using web services. Where data is exchanged using an API configured to exchange web service messages, some or all components of the computing environment may include or may be associated with (e.g., as a client computing device) one or more web service node(s). The web service may be identifiable using a unique network address, such as an IP address, a uniform resource locator (URL), etc. Some or all components of the computing environment may include circuits structured to access and exchange data using one or more remote procedure call protocols, such as Java remote method invocation (RMI), Windows distributed component object model (DCOM), etc. The web service node(s) may include a web service library comprising callable code functions. The callable code functions may be structured according to a predefined format, which may include a service name (interface name), an operation name (e.g., read, write, initialize a class, etc.), operation input parameters and data type, operation return values and data type, service message format, etc. Examples of callable code functions are provided further herein as embodied in various components of the payments engine, such as an example API for biller enrollment, example API for bill inquiry and presentment, example API for payments, and example API for biller directory synchronization.

According to various embodiments, each of the biller computing system 304, financial institution computing system 320, clearinghouse computing system 326, biller exchange computing system 330, and biller processor computing system 350 may include a processor, a memory, at least one electronic circuit and at least one data storage entity for implementing the methods as disclosed. The processor may be a stand-alone or dedicated processor and/or a shared (virtualized) processing resource. The memory may be a stand-alone or dedicated memory device and/or a shared (virtualized) memory resource. The processing resource and/or memory resource may be dynamically allocated as needed to perform the functionality described herein. As used herein, the terms "processor" and "processing resource" are used interchangeably, as are the terms "memory" and "memory resource". The circuits may include instructions stored in the memory (whether the memory associated with a particular computing system or with another system, such as the biller exchange computing system) and executed by the processor. The circuits may include various code, functions and resources (e.g., files, compiled objects, reference libraries, etc.) that comprise, in whole or in part, various APIs.

More specifically, one or more electronic circuit(s) of the biller computing system 304, financial institution computing system 320, clearinghouse computing system 326, biller exchange computing system 330, or biller processor computing system 350 may be implemented as software code suitable for compilation, object code, executable file(s) and/or code, a set of machine language instructions, and/or in another suitable form for carrying out the computer-implemented method(s) described herein. In some embodiments, the one or more electronic circuit(s) may be implemented in a distributed fashion such that at least some of the code is executed and/or compiled on a system that is different from the system hosting the code, executable files, etc. These circuits may be structured to interact (exchange data, instructions, electronic signals, etc.) with one another, for example, through the API of the respective system.

According to various embodiments, these electronic circuits may be deployed to client systems (e.g. biller computing system 304, financial institution computing system 320, etc.) in a "light" fashion such that no installation is required, which provides the technical benefit of streamlined application deployment. For example, functionality provided by the circuits can be made accessible to the bill pay user computing device 354, financial institution 321, etc. through a web browser, a browser plug-in with navigable controls, an applet, a virtual application hosted externally to the respective computing system and deployed, by the payments engine of the biller exchange computing system 330, in a software-as-a-service mode, etc. Alternatively or additionally, the functionality provided by the circuits can be deployed and made accessible as an application including executable code packages and the like, which provides the technical benefit of API extensibility by exchange participants.

One or more data storage entities of the biller computing system 304, financial institution computing system 320, clearinghouse computing system 326, biller exchange computing system 330, and the biller processor computing system 350 may be implemented as an electronic structure(s) suitable for storing information, including, for example, one or more persistent electronic structures, such as one or more database(s), electronic file(s), data mart(s), distributed ledger(s) and the like. The data stored in the one or more data storage entities may be stored in a multidimensional form such that the structure of the data storage entity has two dimensions (e.g., a look-up table having indexed data) or more (e.g., a relational database, a multi-dimensional database, an online analytical processing (OLAP) cube, etc.).

The circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the computing environment. For example, the exchange data vault 340 and/or biller directory 341 of the payments engine of the biller exchange computing system 330 may be coupled to a code library (e.g., API functions that call stored procedures implemented by a DBMS engine that underlies the vault or directory, etc.), which may be structured to support various system interoperability features described further herein, such as biller directory replication, biller directory synchronization, publishing of updates from auxiliary systems to the biller directory 341 and vice versa, etc.

As shown, the biller computing system 304 includes a biller experience circuit 306 and biller APIs 310. The biller experience circuit 306 is structured to authorize the biller exchange computing system 330 to enroll/create billing relationships for customers, respond to bill presentment requests, and receive and post payment transactions. In some embodiments, the biller experience circuit 306 is structured to generate biller registration requests for the biller exchange computing system 330, initiate biller data propagation or synchronization activities to synchronize data with the biller exchange computing system 330, etc. Additionally, the biller computing system 304 can include various data storage entities configured to store information, such as the tokens generated by token generator 339. The biller APIs 310 are structured to allow external systems to access these example functions.

As shown, the financial institution computing system 320 includes a biller management circuit 329 and financial institution APIs 322. The biller management circuit 329 is structured to manage requests for the biller exchange computing system 330 to enroll/create billing relationships for customers, generate bill presentment requests, and initiate payment transactions. In some embodiments, the biller management circuit 329 is structured to generate financial institution registration requests for the biller exchange computing system 330, initiate financial institution data propagation or synchronization activities to synchronize data with the biller exchange computing system 330, etc. The financial institution APIs 322 are structured to allow external systems to access these example functions. Additionally, the financial institution computing system 320 can include various data storage entities configured to store information, such as the tokens generated by the token generator 339.

As shown, the biller exchange computing system 330 includes exchange APIs 332, a customer management circuit 336, a registration circuit 338, a token generator 339, an exchange data vault 340, an exchange dashboard 346, and a publication circuit 342. In some embodiments, the biller exchange computing system 330 may interact with one or more third-party payment processors 350 communicably connected to the customer management circuit 336.

The customer management circuit 336 is structured to enable billing relationships and enrollment for the banking billers 305 and financial institutions 321. For example, the customer management circuit 336 may participate in the various data acquisition sequences illustrated further herein.

The registration circuit 338 is structured to register billers 305 in response to biller registration requests received from the biller computing system 304. In some embodiments, the registration circuit 338 is structured to register financial institutions 321 in response to requests received from the financial institution computing systems 320. According to various embodiments, these processes can include creation and updating of registry information in the exchange data vault 340.

The token generator 339 is structured to route tokens and authorization requests between the biller computing system 304 and the financial institution computing system 320.

Advantageously, in some embodiments security of sensitive information is increased such that the biller computing system 304 is structured to generate and manage authorization tokens and the biller exchange computing system 330 passes along requests and information without storing the tokens.

The publication circuit 342 is structured to enable synchronization of data, such as registry information, among the various systems, as described further herein.

The exchange APIs 332 are structured to enable the above functions of the biller exchange computing system 330. For example, the exchange API 332 may be structured to receive messages from various systems via their respective APIs (e.g., from the biller APIs 310, financial institution APIs 322, biller processor APIs 352, bill pay user financial institution API 356, etc.) and to send messages thereto, as shown in various sequence diagrams illustrative of example embodiments and accompanying the present disclosure.

Referring now to FIG. 4, FIG. 4 is a data flow diagram of a detailed example bill payment computing environment 400 using biller exchange computing systems 330 and methods applicable to the example bill payment infrastructures. At a high level, block 401 represents multiple financial institutions that are members of the exchange and that provide online bill pay services to customers. Block 380 on the right represents multiple off-us biller entities that may send one or more bills to the customer. The biller exchange computing system 330 at the center enables various interactions (as illustrated by solid and dashed line connections according to the legend), including real-time interactions, between the customer side and the off-us biller side, including, for example, allowing the customer to make inquiries of the off-us biller or bill data and pay the bill. The real time interactions may also include allowing the off-us biller to deliver bills and receive payments from the customer. In some implementations, the customer may request a previous bill issued by the off-us biller, besides inquiring about existing bill(s).

Turning first to the customer side included in the block 401, a customer may access a bill pay mobile/online banking its account with a biller via a user computing device 354. The customer's account may be held by one of the financial institutions 321, each having an associated computer system 320 (FIG. 3).

The customer may use the user computing device 354 to access user interfaces and features related to the operations of the payments engine of the present disclosure. For example, the customer may use the user interface to access a consolidated view of billers and products associated with the customer as well as account status for accounts of the customer that correspond to the products (e.g., credit cart, mortgage, consumer credit account at a retailer, etc.) The features may include real time inquiry of account status, statements, etc.; a timeline of scheduled payments (e.g., for a selectable time period, for selectable multiple billers, etc.); a timeline showing scheduled payments relative to source account balance(s), etc.

In another example, the customer may use the interface to retrieve biller information from a centralized directory and/or to provide instructions to add a new biller, product, etc. The customer may use the interface to invoke a customer to biller enrollment request, to perform biller lookup and selection from centralized directory, to terminate enrollment, and/or to request a new token to be generated if a customer's account (e.g., source account or target account) is compromised. When the customer invokes a biller enrollment process, the access process may redirect (at 355) the access request to the computing system 320 of another financial institution 321 for OAuth enrollments, as described further herein. Further, in some circumstances, the customer and the financial institutions 321 may complete some or all on-us billings within the computer system 320 of one financial institution 321. In some circumstances, OAuth may be used to obtain account information from off-us billers. For example, if the customer holds a checking account at a Bank 1 and has a mortgage with Bank 2, OAuth may be used to obtain mortgage account information from Bank 2. For on-us banking billers, biller registration information may be provided to the on-we biller directory 342 at operation 408. Hence, in the above example, Bank 2 may provide information about its on-us billers to the on-we biller directory 342, such that the information is available to Bank 1 when the customer wishes to make a payment, for example.

In yet another example, the customer may use the interface to perform bill inquiry (e.g., to request a bill or balance information from a particular biller, to request bills due in a particular time period, etc.). Advantageously, bill inquiry is performed in an interoperable fashion using the biller exchange computing system 330. More generally, the interfaces rendered to the customer may be structured to present information delivered from one or more billers to the consumer (e.g., account status, account information, login information, balances, bills, transaction history, etc.).

In yet another example, the customer may use the interface to perform and/or schedule payments for one or more billers. Advantageously, payment transactions are initiated in an interoperable fashion using the biller exchange computing system 330. In one example embodiment, the customer may use the interface to complete a payment. The payment transaction may be generated by the one or more APIs (e.g., the APIs 332, etc.) based on payment data pre-populated via a bill inquiry API message received from a biller computing device via biller API 386.

The bill payment computing environment 400 enables real-time interactions between an off-us biller 382 and the customer using the user computing device 354. To achieve such functionality, electronic interconnection between the off-us biller 382 and the financial institutions 321, and between the off-us biller 382 and the exchange dashboard 390 of the biller exchange computing system 330 need be established. The relationship establishment may be achieved at the register operations 416 and 418, which show two example biller registration processes. In the registration operation 414, the biller registers with the financial institution computing system 320 of one of the financial institutions. As previously indicated, financial institutions typically have an array of off-us banking billers (e.g., a utility company that has an account at the financial institution) to whom they make payments on behalf of other customers (e.g., a residential customer of both the utility and the financial institution). Such billers may already be in the biller directory of the respective financial institution computer system 320. At operation 406, the biller registration information stored in the biller directory of the financial institution computing system 320 may be synchronized with the biller registration information stored in the biller exchange computing system 330.

At registration operation 418, the biller registers directly with the biller exchange computing system 330. For example, if a biller does not have an account with any of the financial institutions that are members of the consortium (off-us non-banking biller), then the biller may register directly with the biller exchange computing system 330. The registration circuit 338 (FIG. 3) is structured to register billers 305, in response to biller registration requests received from the biller computing system 304. In some embodiments, the off-us biller 382 may have real-time interactions with the biller exchange computing system 330 via the exchange dashboard 346, after completion of registration for example.

According to various embodiments, these processes can include creation and updating of registry information in the exchange data vault 340. For example, the registry information regarding financial institutions (e.g., financial institutions 321 and billers 305) can include financial institution names, identifiers, routing numbers (e.g., routing transit numbers (RTN), Swift network identifiers, etc.), account information, etc. In some embodiments, the exchange data vault 340 also includes information about the API functions exposed by the biller computing system 304 or the financial institution computing system 320 to the biller exchange computing system 330. For example, the biller exchange computing system 330 may store version information, function definition libraries, parameter data types, etc. This information can be accessed by the biller exchange computing system 330 when calling the public functions of the respective system's API to route requests, data, signals, etc.

In some embodiments, the off-us billers may enable various processes 336 via its APIs 332. These processes 336 may include operations to enroll customer to biller, to inquire biller or bill, to pay the biller, and/or to deliver a bill. Correspondingly, the biller exchange computing system 330 may receive requests of these processes 336 via the exchange dashboard 390 and return responses to such requests to biller management circuit 329 associated with the financial institutions 321.

Generally, as with the financial institutions 321, when the billers 380 become members of the consortium and register with the biller exchange computing system 330, these entities provide a one-time initial data load to populate the exchange data vault 340 with registry information, at operation 420. Subsequently, these entities can provide incremental data updates. These processes are managed by the publication circuit 342 of the biller exchange computing system 330, at operation 422.

For example, for a one-time data load, the publication circuit 342 can be configured to receive data in a suitable format, such as a SQL record set, a text file, an Excel file, etc. and execute a series of SQL commands to populate the exchange data vault 340 with this data. To manage incremental data loads, publication circuit 342 can be configured to receive registry data updates from the biller computing system 304 or the financial institution computing system 320 in a suitable format, such as SQL record set, a text file, an Excel file, etc.

In some embodiments, rather than receiving flat files or record sets, the publication circuit 342 can be coupled to a web server and/or can be otherwise configured to receive and decode registry updates as interface messages, such as web service messages in a suitable format (e.g., JSON, REST, etc.). The respective APIs of the source systems can be configured to "push" this data or to respond to the "pull" requests from the exchange APIs 332 of the biller exchange computing system 330. For example, in some embodiments, the publication circuit 342 can be configured to call a public function of the biller APIs 308 and/or the financial institution APIs 322 to request updated data. In some embodiments, the biller computing system 304 or the financial institution computing system 320 can be configured to call a public function of the exchange APIs 332 to "push" the data to the biller exchange computing system 300.

In some embodiments, the publication circuit 342 is structured to interpret (decode, parse, extract, etc.) the data received in a web service message according to a predetermined format, which may include pre-defined field separators, field definitions and labels, field lengths, data types, etc. The decoded data can be saved, as a registry update, in the exchange data vault 340.

Referring further to FIGS. 4, at 402, 404, and 414, further details of an API connection between the computing systems 304 of the billers 381, the computer systems 320 of the financial institutions 321, and the biller exchange computing system 330 are shown. The API connection includes APIs 310, 322, 332 the computing systems 304 of the billers 381, the computer systems 320 of the financial institutions 321, and the biller exchange computing system 330, respectively. Each of the APIs 310, 322, 332 provides access to a set of services/processes that may be accessed by appropriate function calls, including enroll customer to biller process, inquire biller or bill process, pay biller process, and deliver bill process.

Referring first to the enrollment process, this process is shown in further detail relative to FIG. 7A-7E, which show detailed example sequences of API function calls. More generally, however, in order to enable a biller/financial institution relationship, where the biller holds an account at a financial institution for receiving payment and the payer holds an account at another financial institution for initiating payment, the biller exchange computing system 330 is configured to manage requests for the biller exchange computing system 330 to enroll/create billing relationships for customers. In some embodiments, enrollment is a real-time transaction.

In an example embodiment, the customer management circuit 336 of the biller exchange computing system 330 can be structured to receive, from a first computing system (e.g., the financial institution computing system 320) associated with an originating deposit financial institution (e.g., the financial institution 321), an electronic enrollment request (e.g., a bill). The request comprises identification information associated with a receiving deposit financial institution (e.g., biller 305).

For each of the financial institution 321 and biller 305, the biller exchange computing system 330 can be structured to generate a secure enrollment record. In an example embodiment, the relationship between the financial institution 321 and the biller 305 is created using an OAuth protocol, although another suitable credential tokenization/authorization protocol can be used. OAuth (Open Authorization) is a standard for token-based authentication and authorization on the Internet. OAuth is used for access delegation and may be used as a way for internet users to grant websites or applications access to their information on other websites without giving them the passwords. In the context of the present arrangement, OAuth is used as a way for customers to grant online banking websites access to their information on biller websites without giving the financial institution or biller processor their passwords to the biller websites.

In some embodiments, the access given via OAuth is limited access in the sense that the functions the customer may be able to perform via online banking may be made more limited than if the customer accessed the biller website directly. In one example embodiment, financial institution 321 may want to receive access to information managed by the biller computing system 304—for example, to see a bill, to see when a payment is due, or to access other services supported by biller APIs 332. However, the customer may need to access the biller website directly if the customer wishes to perform other functions, such as making changes to services that the customer receives from the biller. The scope of access may be represented by one or more scope variables that may be associated (e.g., stored relationally to) each OAuth token (for example, in the exchange data vault 340 of the biller exchange computing system 330). Advantageously, this approach protects data-at-rest (e.g., sensitive information accessible via biller computing systems) from being intercepted and compromised (e.g., accounts being hacked.) In some embodiments, separate token data vaults (e.g., exchange data vaults 340) are maintained to segregate tokens and/or biller cross-reference data by particular biller, by biller processor, etc.

In some embodiments, the OAuth token is extended (customized) to include further information, such as a customer identifier, source system URL, a biller's product identifier or other account information, target system (biller or biller processor computing system) URL, payment information (e.g., source account information, a monthly payment amount, an auto-pay amount, a pre-set additional monthly principal payment for installment loans, etc.), custom security policy information required by the biller (e.g., customer challenge questions and answers, customer PIN code, etc.), a token expiration data field such that the token is a time-limited token, etc. Thus, the augmented OAuth token may be used for customer account recovery, to identify the biller account and schedule payments, and to support additional biller-specific authentication requirements. In some embodiments, the augmented OAuth token is a self-encoded OAuth token. In some embodiments, the augmented OAuth token is a self-contained way of transmitting data between the source (e.g., customer financial institution) and target (e.g., biller processor or biller financial institution) systems such that the number of copies of sensitive information saved in memory can be minimized.

In some embodiments, instead of or in addition to augmenting the OAuth token, a cross-reference data repository is provided linking particular OAuth tokens to customer-specific information, biller-specific information, security policy information, etc. For instance, instead of including an account number (or another sensitive information item) directly in the OAuth token, a random numerical or alphanumeric character string generator circuit of the biller exchange computing system and/or of the biller processor computing system may be structured to generate a de-identified reference string. The de-identified reference string may be included in the OAuth token, and a cross-reference table may be maintained in storage media of the computing system that manages OAuth tokens. The cross-reference table may link the de-identified reference string to actual data (e.g., in this case, the account number). The cross-reference table may be accessible, after the de-identified reference string is parsed from the OAuth token, to determine the corresponding account number. Advantageously, this approach protects data-in-transit (e.g., OAuth tokens being transferred between systems) from being intercepted and compromised (e.g., accounts being hacked based on information included in OAuth tokens.)

Further, access privileges given via OAuth may be revoked in response to receiving customer instructions to terminate a customer-biller relationship. For example, the customer may use a user interface of an online banking website to revoke access by the biller exchange computing system 330 to one or more biller websites. In some embodiments, the customer uses a user interface provided by the biller exchange computing system 330, and the biller exchange computing system 330 is structured to terminate the customer-biller association (e.g., by marking an electronic mapping relationship as terminated, expiring the token, etc.) and generate an electronic notification for transmission to the biller. In some embodiments, the customer uses a user interface provided by the biller's online platform to terminate the customer-biller association, and the biller exchange computing system 330 is structured to receive an electronic access revocation message from the biller's computing system and, based on the message, terminate the customer-biller association.

The customer management circuit 336 can be structured to collect authentication data for the biller 305. The authentication data can include identification information of the biller 305, such as IP address, MAC address, entity name, entity identifier, etc. In some embodiments, this information can be provided by the exchange data vault 340 and is browsable using the interface of the first computing device. The authentication data can further include information specific to the relationship between the financial institution 321 and biller 305, such as account number, a proxy/alias for an account, etc.

In response to receiving the authentication data, the customer management circuit 336 can be structured to transmit the authentication data to the biller computing system 304. The biller computing system 304 can verify the authentication data (for example, by querying its internal systems). In some embodiments, the biller computing system 304 can generate a one-time authorization code and send it to the financial institution computing system 320 via the biller exchange computing system 330. The financial institution 321 may be presented with a user interface control requiring the financial institution 321 to enter the one-time authorization code to confirm the identity of the financial institution 321 before verification is completed.

Once verification is completed, the customer management circuit 336 can be structured to transmit a request for a token to the biller computing system 304 and to cause the biller computing system 304 to generate a token using the token generator 339. The token can include de-identified (obscured) sensitive information, such as account number, login credentials, financial institution identifier, instructions biller identifier, and other authorization information. The token is subsequently used during bill inquires and payment transactions to verify that a valid relationship exists between the biller 305 and the financial institution 321 indicating that the financial institution 321 is willing to send payments and biller 305 is willing to receive payments.

The customer management circuit 336 can be structured to generate or cause another computing system to generate a financial institution enrollment record to supplement the tokenized information. The financial institution enrolment record may include the token and may be transmitted from the biller computing system 304 to the biller exchange computing system 300 by calling a public function of the exchange API 332. In some embodiments, enrollment records are product-(account-) level records rather than financial institution-level records, as shown at 514 of FIG. 5.

The customer management circuit 336 can be structured to transmit a first copy of the token to the financial institution computing system 320 and/or direct the biller computing system 304 to retain a second copy of the token. Each respective entity can save its copy of the token in a data store associated with the entity, such as non-volatile memory, a token vault, etc. According to various embodiments, the data store of each respective entity may include a mapping data structure (such as a table) that correlates a reference to a specific system (such as a URL, an IP address, a MAC address, a network path, etc.) with biller financial institution relationship information (such as an account handle, user name, identification number, account number in combination with a reference to a specific system, email address, social media handle, name, telephone number, email address, business address, etc.) In some embodiments, the data store comprises a data structure for storing a timestamp for each token(s). The token(s) may expire and be replaced with new token(s) at periodic intervals, such as, for example, every week, every month, every quarter, every time a token has been used, after a set number of times a token has been used (for example, between one and ten times), etc. In some embodiments, these parameters are encoded in the token instead or in addition to being stored relationally to the token. In some embodiments, the token(s) may be expired (e.g., marked as expired, deactivated, or deleted) at the request of a user received via a customer-facing application. In some embodiments, the token(s) may be expired (e.g., marked as expired, deactivated, or deleted) at the request of a biller received from a biller computing system. The biller request may comprise a data set cross-referencing tokens to particular customers and/or accounts, and only the tokens that meet these criteria may be expired. In some embodiments, the token(s) are automatically expired (e.g., marked as expired, deactivated, or deleted) when a biller de-registers from the exchange and/or when a particular customer deletes an association with a particular biller.

Further with respect to 402, 404, and 414, the customer management circuit 336 can be structured to enable bill inquiries and to transfer payments. In some embodiments, the customer management circuit 336 can be structured to allow a customer to specify how the customer would like to configure the payments experience after a customer enrolls with a biller. The customer management circuit 336 may cause the biller exchange computing system 330 to generate a user interface and render the user interface to the computing device 354 of the customer. The user interface may be structured to enable the customer to specify whether the customer would like to initiate payments (e.g., on demand, on a particular day of the month, etc.) or if the customer would like payments to be initiated in response to requests for payments received via the financial institution API 322. In some embodiments, the customer management circuit 336 is structured to store an indicator of customer preference in memory. Based on the indicator and/or the information received via the financial institution API 322 (e.g., bill information, such as amount due, payoff amount, due date, etc.), the biller exchange computing system 330 may be structured to generate a payment transaction for the customer's review and transmit the payment transaction to computing device 354 of the customer for approval. In some embodiments, multiple transactions may be presented to the customer for approval. In one example implementation, the transactions may be presented as a sequence of screens, one per transaction, on a mobile device of the customer. The biller exchange computing system 330 may comprise functionality to determine, based on the customer's interaction with each screen item, whether a transaction is approved. For example, in one embodiment, swiping in a first particular manner (e.g., swiping up, swiping to the right) may be indicative of approval, swiping in a second particular manner (e.g., swiping left) may be indicative of a instructions to delete the pending transaction, and swiping in a third particular manner (e.g., swiping down) may indicate instructions to flag the transaction for further review by the customer.

In response to an electronic message or an interface interaction indicating approval of the transaction, the biller exchange computing system 330 may initiate a payment transaction. In some embodiments, the payment transaction includes electronic instructions to transfer funds from a source account associated with the customer to a target account associated with a biller (e.g., the financial institution 321). In some embodiments, the payment transaction includes electronic instructions that may be transmitted to a clearance and settlement computing system. In some embodiments, the biller exchange computing system 330 further includes functionality to allow a customer to revoke a pending payment transaction and/or reverse a completed payment transaction. For example, a list of recent transactions may be presented as a sequence of screens, one per transaction, on a mobile device of the customer. The biller exchange computing system 330 may comprise functionality to determine, based on the customer's interaction with each screen item, whether a transaction should be revoked or reversed. In one example embodiment, swiping left may be indicative of instructions to revoke or reverse the transactions. The biller exchange computing system 330 may comprise functionality to display to the customer, via the user interface, a confirmation screen confirming customer instructions to revoke or reverse the transaction. In some embodiments, revocation or reversal functionality is available only within a predetermined amount of time from performing the payment transaction (e.g., 2 hours, close of business, 24 hours, etc.).

Referring further to FIGS. 4, at 420 and 424, a clearing process is shown. After a payment transaction is initiated, in some embodiments, the biller exchange computing system 330 is structured to transmit transaction data to a clearinghouse computing system 326 for clearance and settlement. According to various embodiments, the clearinghouse computing system 326 can use various clearance and settlement platforms, such as Zelle®, ACH, TCH RTP®, etc.

Referring now to FIGS. 5 and 6, example data model diagrams are shown for various aspects of the biller exchange computing systems and methods. A biller exchange computing system 330 of FIG. 3 includes a centralized biller directory 341. The biller directory, represented, for example, in FIG. 5 by data storage entity 504 and its related entities, may include, in a standardized format identification data for all billers and/or their associated biller processors, receiving financial institutions (e.g., RDFI) and other payment routing information needed by the payments engine to route payments appropriately. Various other systems of the payment infrastructure may maintain their own copies of the biller directory, which may be maintained via replication and/or synchronization processes described further herein. To that end, FIG. 5 is a data model diagram of one aspect of an example data store used in the example biller exchange computing environment shown in FIG. 4. FIG. 6 is a data model diagram of another aspect of an example data store associated with a biller computing system for use in the example biller exchange computing environment shown in FIG. 4.

As shown, FIG. 5 shows a relational data model diagram for a data store associated with the biller exchange computing system 330, such as the exchange data vault 340 and/or a biller directory 341. The data of the example embodiment is stored and available for inquiry by calling public functions of the exchange API 332 of the biller exchange computing system 330. For example, the data can include data dictionary/registry information for the biller 305 (at 504, 506, 510, 512) and/or financial institution 321 (at 508), customer information (at 514 and 516) and payment transaction information (at 518).

In some embodiments, the data further includes API library information for the respective entity (at 508). More specifically a biller may hold an account at a receiving financial institution, which may be enrolled in the exchange. The financial institution may operate a computing device that may have a financial institution API (e.g., 322 of FIG. 3) deployed to or accessible by that computing device. The API library may be identified by a unique address, such as an API URL stored relationally to the financial institution and biller information as shown at 508. When a customer requests a bill, schedules a payment, requests enrollment, or otherwise invokes functionality that requires communication with the biller's financial institution, the payments engine (e.g., of the biller exchange computing system 330 of FIG. 3) may query the data store to determine the API URL based on customer identity and the token (at 514), based on enrollment data (at 510), and/or based on biller information (at 504). In some embodiments, these items are determined by decoding the token, which may contain this information. The payments engine may then use the API URL to send payment transactions, enrollment messages, etc. to the financial institution on behalf of the customer.

In some embodiments, the payment transaction information 518 is exposed, via the API, for mining historical trends, predicting future payments, etc. The information can be exposed in a de-identified form and/or may require a token to be accessible. For example, in some embodiments, the biller computing system 304 and/or the financial institution computing system 320 may be required to provide the token generated when the biller/FI relationship was registered via the biller exchange computing system 330 in order to access historical payment information for data mining.

In some embodiments, payment transaction information 518 is aggregated for the purposes of initiating transactions, posting transactions, clearance and settlement, etc. For example, pending transactions can be sent, through the biller exchange computing system 330, in batches to the systems responsible for performing the respective activities (e.g., the biller computing system 304, the clearinghouse computing system 326, etc.).

As shown, FIG. 6 shows a relational data model diagram for a data store associated with a biller computing system 304, according to an example embodiment. In some embodiments, the data is stored in a data storage entity associated with the biller computing system 304. In some embodiments, the data is part of the exchange data vault 340 of FIG. 5. For example, in some embodiments, biller account information stored in the exchange data vault 340 includes the items shown at 502 of FIG. 5 and 522 of FIG. 6.

While the embodiments of FIG. 5 and FIG. 6 are shown as relational databases, other embodiments are contemplated, such as a multi-dimensional database, an online analytical processing (OLAP) cube, a distributed ledger, a collection of cross-referenced flat files, etc.

Referring now to FIGS. 7A-10B, computing systems sand sequence flow diagrams that illustrate various aspects of the payments engine are shown. FIGS. 7A-7E show the computing systems involved in the biller enrollment process, according to an example embodiment, and APIs therefor. During the biller enrollment process, a biller and/or the biller's financial institution sign up to the exchange and are mapped to a particular customer and/or account (product).

Figure 8A:
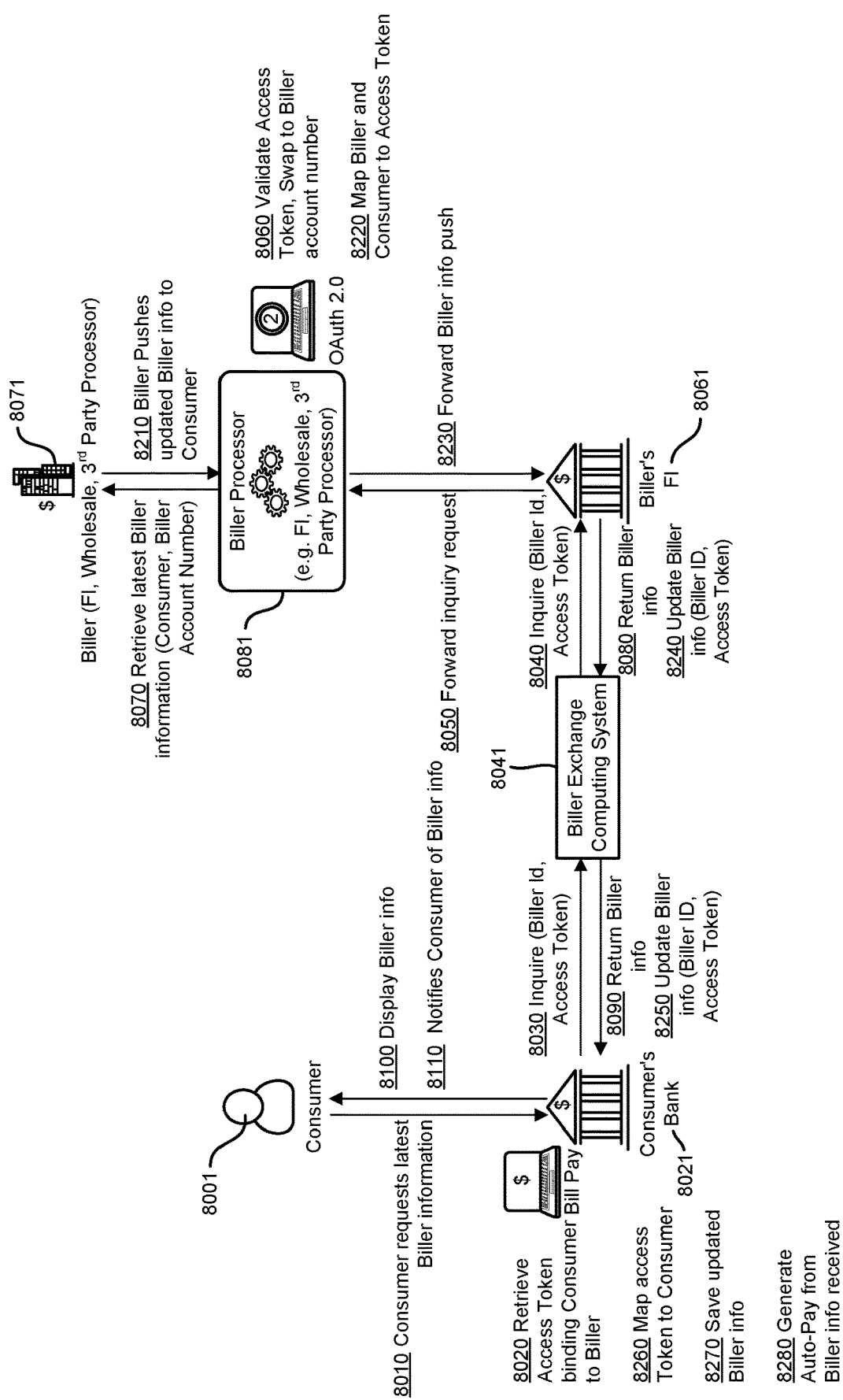
FIG. 8A shows the computing systems involved in the bill inquiry and/or bill presentment process enabled by the biller exchange computing system.
Figure 8B:
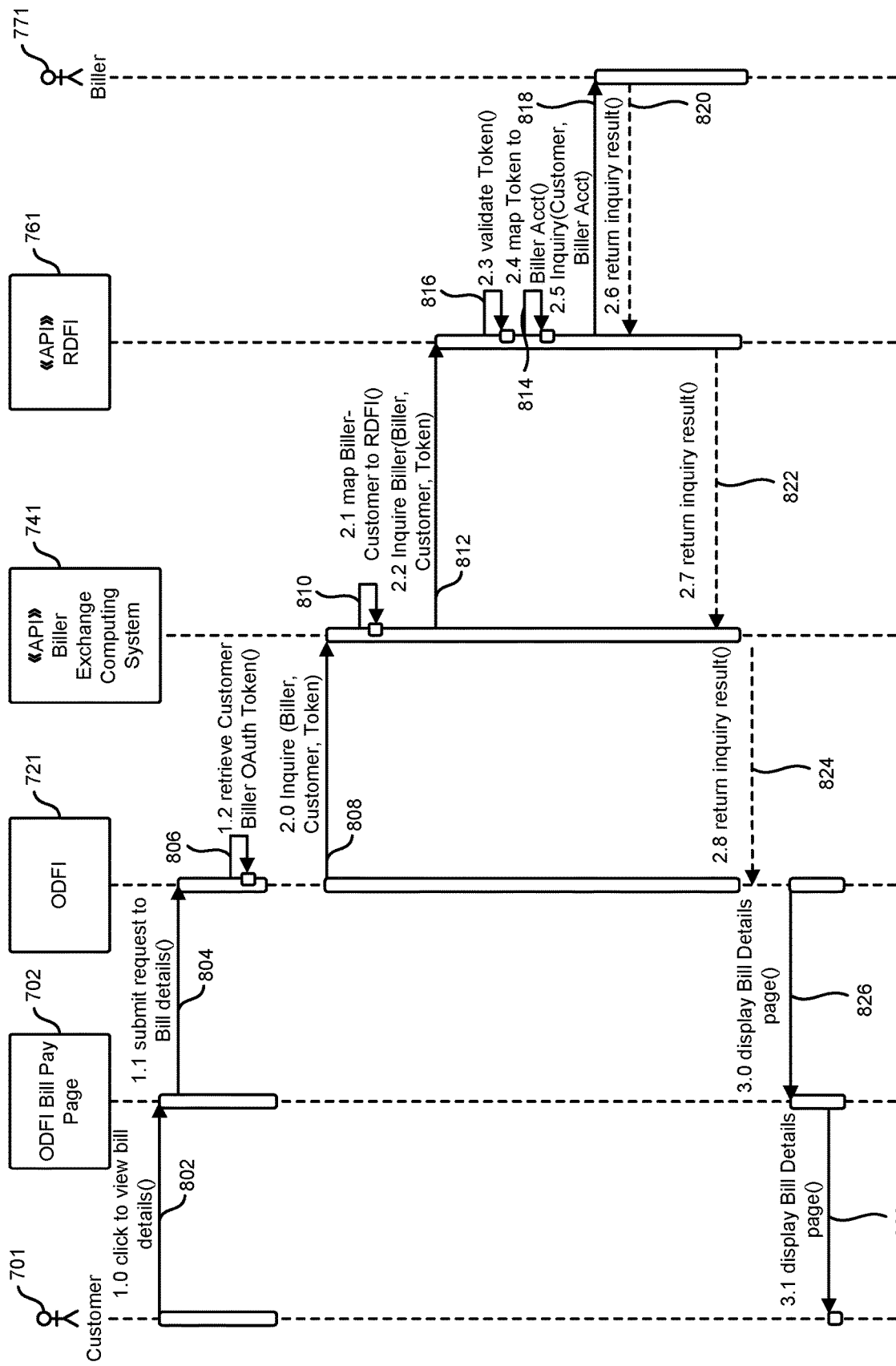
FIG. 8B is a sequence flow diagram for bill inquiry and/or bill presentment using an example API, according to an example embodiment.
Figure 8C:
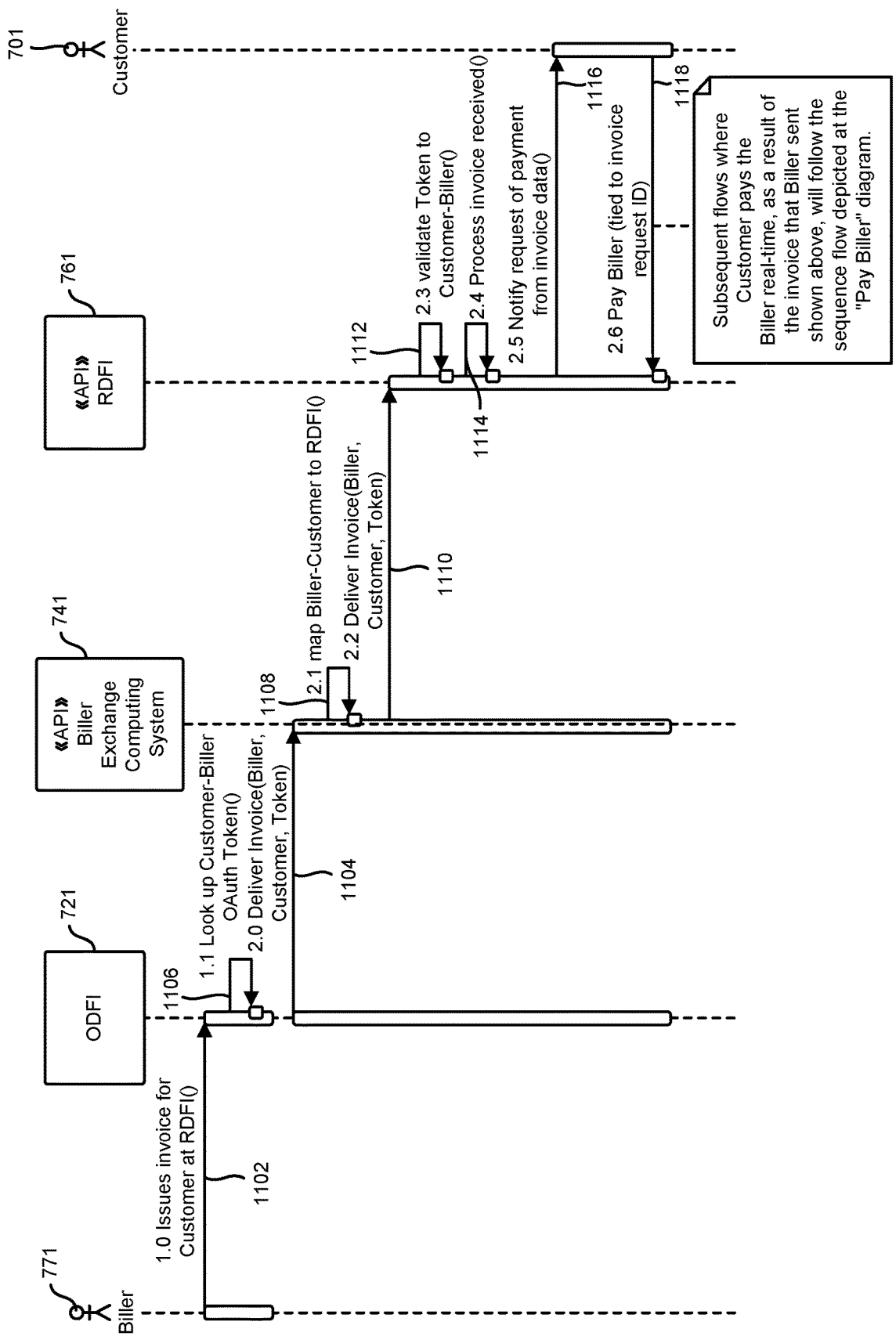
FIG. 8C is a sequence flow diagram for a bill presentment process using an example API, according to an example embodiment.
Figure 9A:
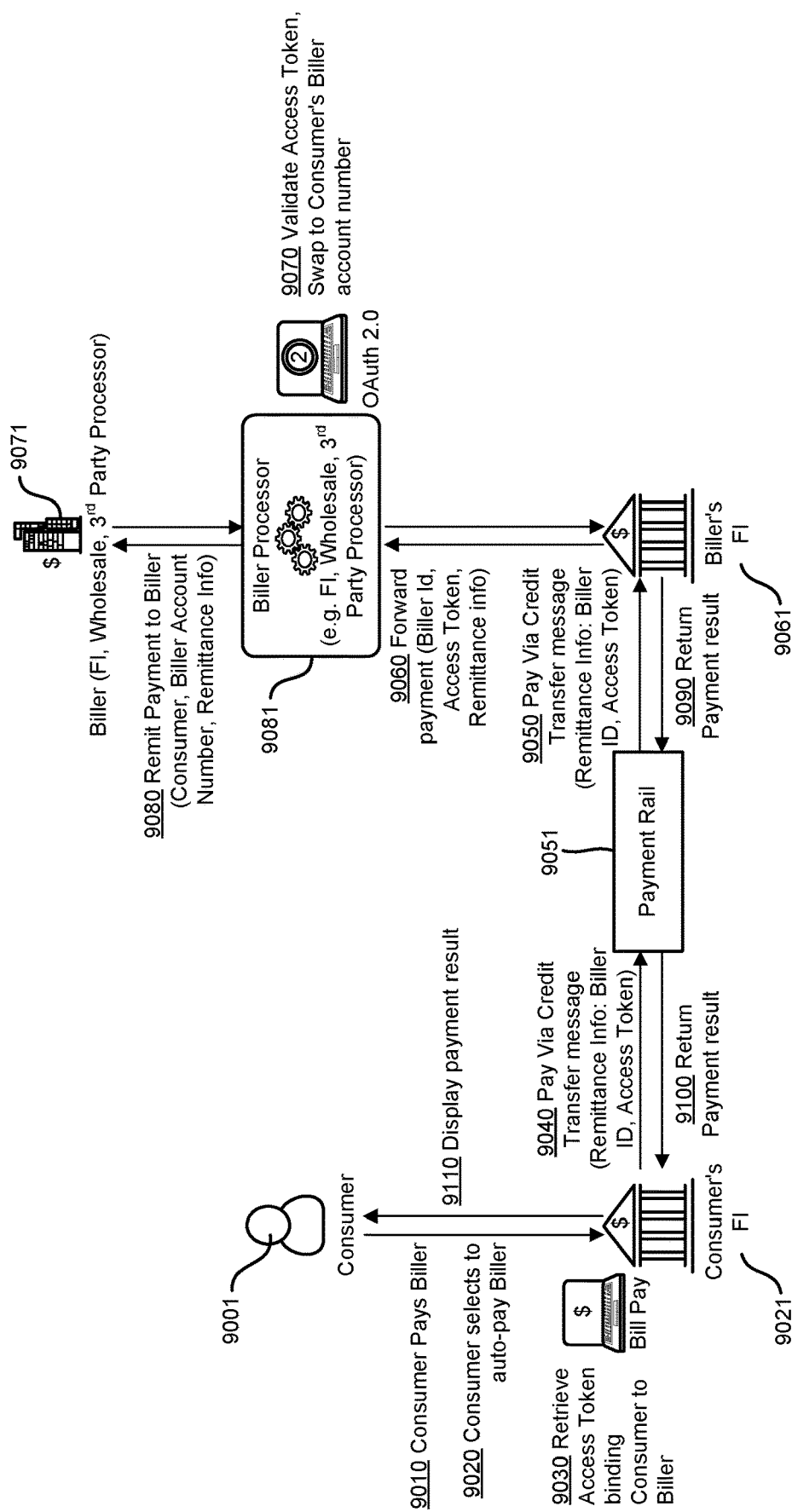
FIG. 9A shows the computing systems involved in an example payment process enabled by the biller exchange computing system.
Figure 9B:
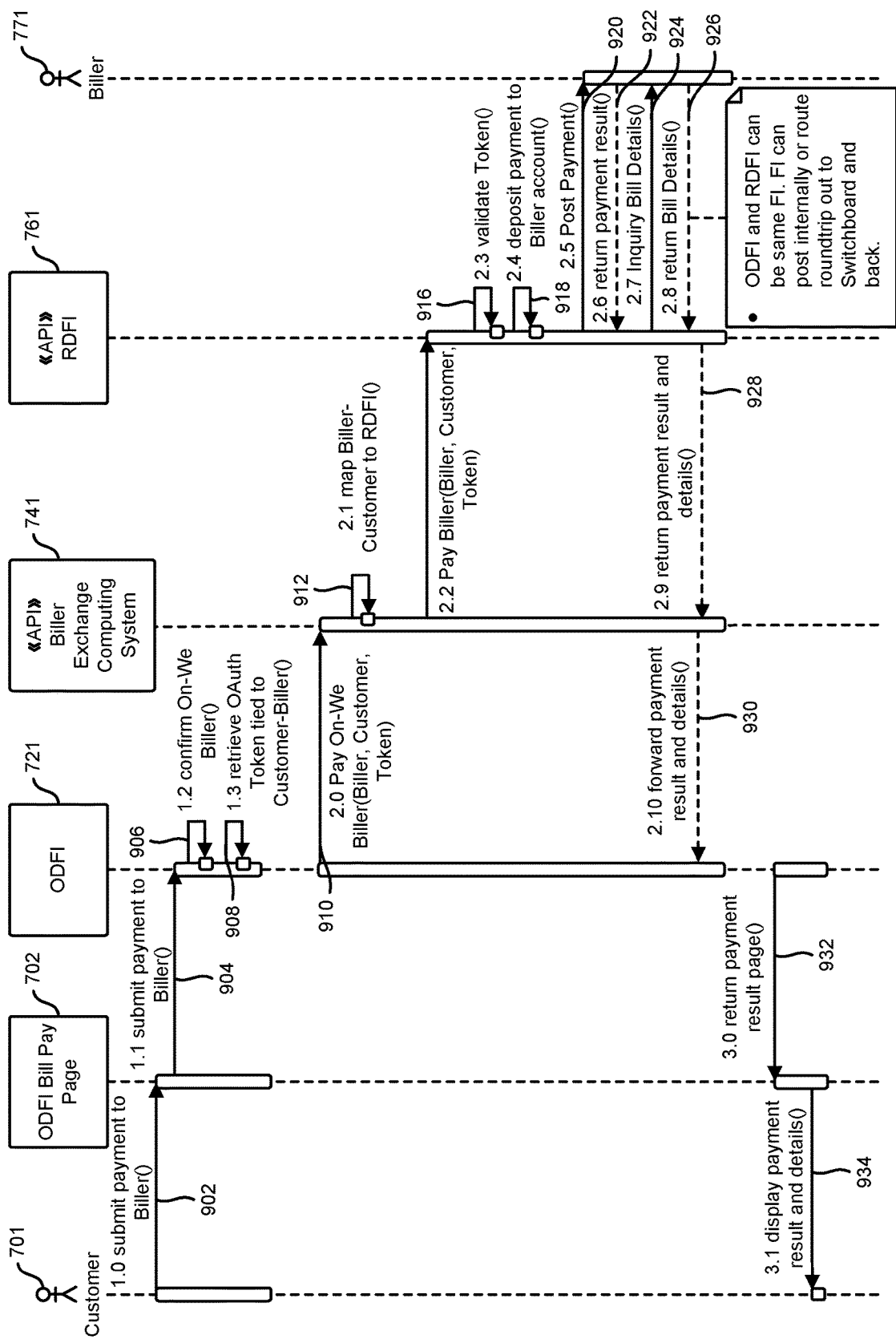
FIG. 9B is a sequence flow diagram for payment processing using an example API, according to an example embodiment.
Figure 10A:
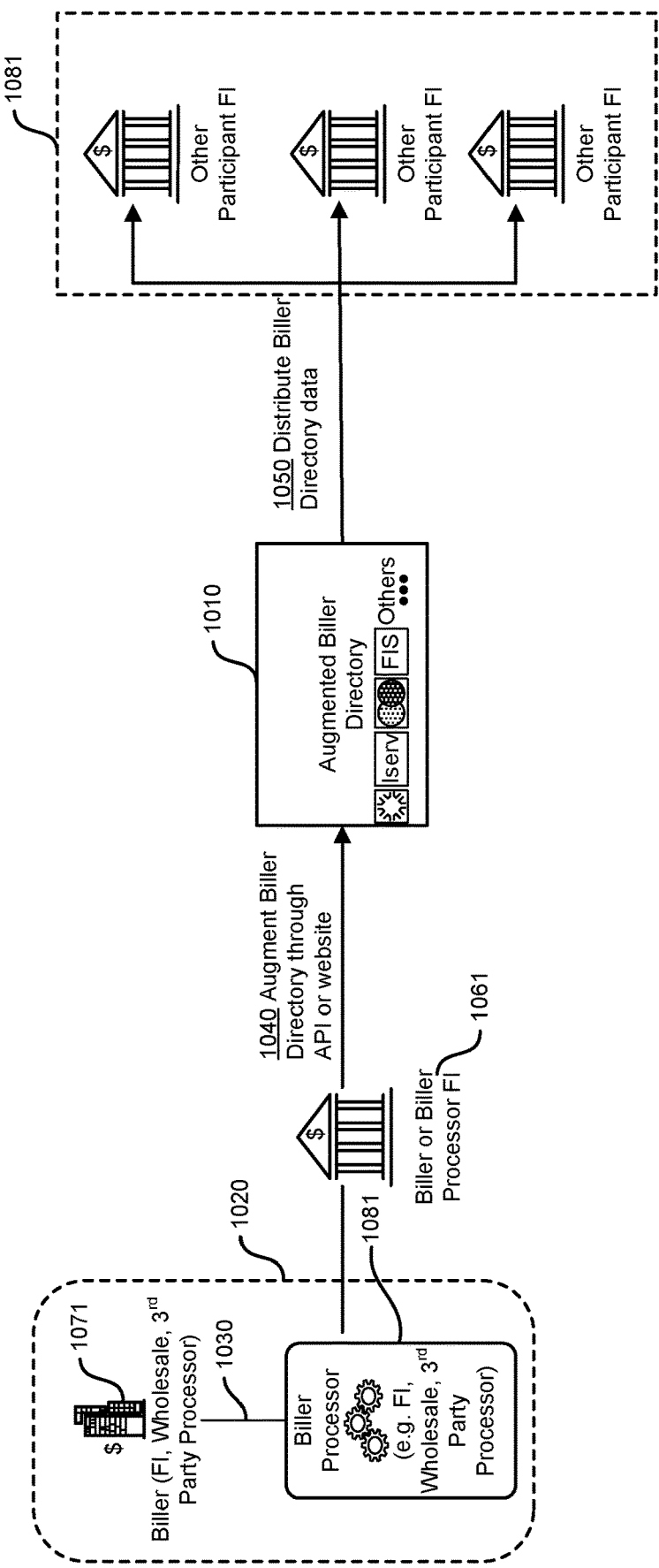
FIG. 10A shows the computing systems involved in the biller registration process enabled by the biller exchange computing system.
Figure 10B:
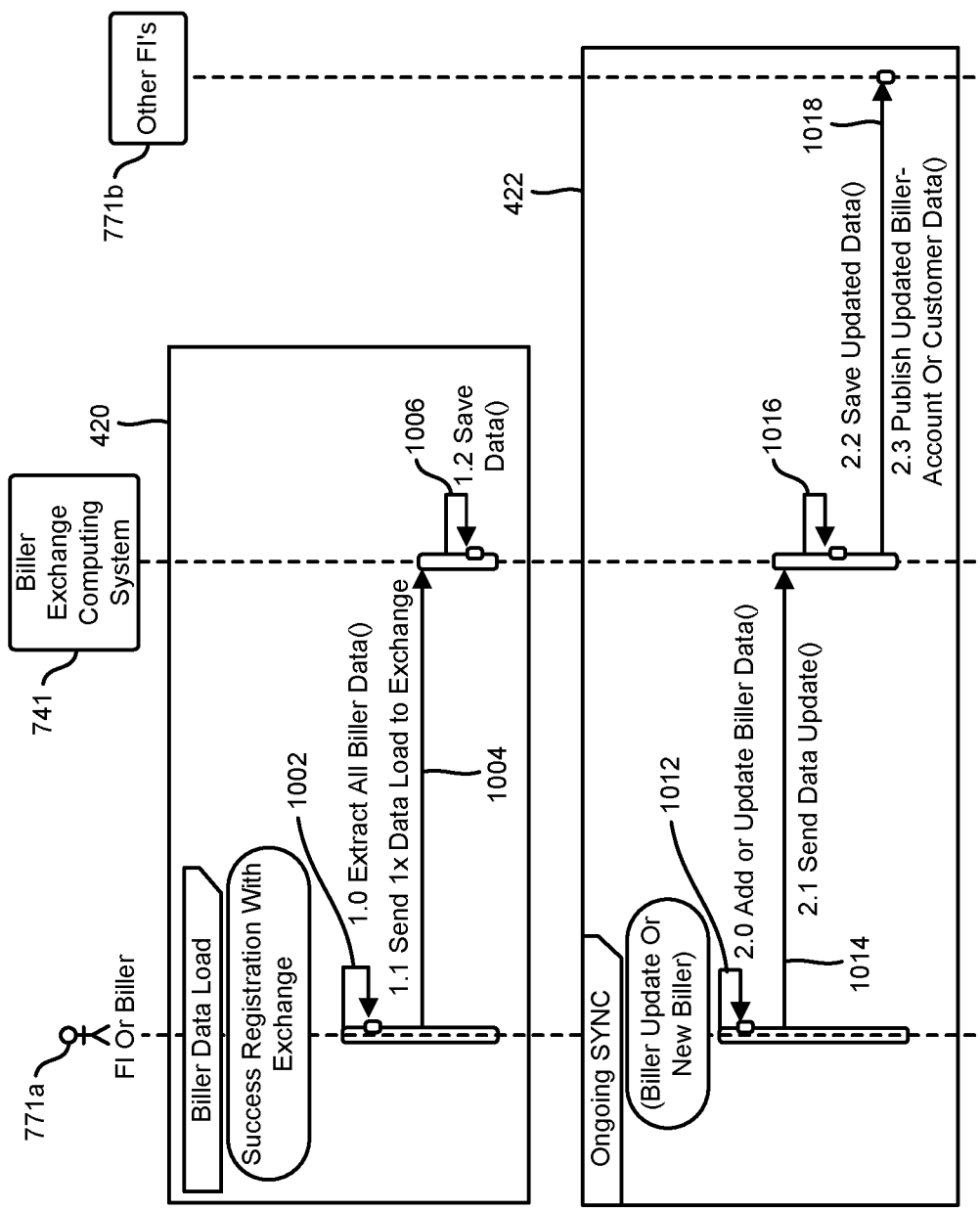
FIG. 10B is a sequence flow diagram for a biller directory synchronization process using an example API, according to an example embodiment.

FIGS. 8A-8C show the computing systems involved in the bill inquiry and presentment process, according to an example embodiment, and APIs therefor. During the bill inquiry and presentment process, a customer receives (either in a push or pull fashion) a bill from a biller that is signed up to the exchange. FIGS. 9A and 9B show the computing systems involved in a payment process, according to an example embodiment, and APIs therefor. During the payment process, a payment is originated from an originating financial institution to the receiving financial institution, where the receiving financial institution is determined by the payments engine based on information contained in the biller directory and where the payment transaction may be based on data from a bill routed through the exchange. FIGS. 10A and 10B show the computing systems involved in a biller directory replication and/or synchronization, and the APIs therefor. During the biller directory replication and/or synchronization, payment routing information (such as biller information, financial institution information, biller processor information, etc.) is standardized across computing systems of the participants in the payments ecosystem.

In the example embodiments of FIGS. 7A-10B, data is exchanged between various computer-implemented entities shown in FIGS. 1-6. For example, the customer 701 of the sequence diagrams refers to the computing device 354 of the customer 101 of the originating financial institution (herein, although the acronym "ODFI" is used, it will be understood that payments may also be made via payment rails other than ACH—for example, via TCH RTP®). The ODFI bill page 702 refers to a bill page web interface provided by the computing system 320 of the ODFI. The ODFI computing system 721 refers to other, predominantly backend, operations performed by the computing system 320 of the ODFI. The biller exchange computing system 741 refers to the biller exchange computing system 330, including APIs provided by the computing system 330. The RDFI computing system 761 refers to the computing system 320 of the receiving financial institution, including APIs provided by the computing system 320. The biller 771 refers to the biller computing system 304 used by the biller, including APIs provided by the computing system 304. In some embodiments, the computing systems further include biller processor computing systems. In embodiments where biller processor computing systems are not shown, one of skill will appreciate that biller processor computing system functions may be performed by the exchange computing systems, biller computing systems, and/or the biller's financial institution computing systems.

As shown, data is exchanged between the entities of FIGS. 7A-10B using function calls according to an API of each respective computing system. For example, function calls made to the ODFI computing system 721 are made by calling the public functions exposed by the financial institution API 322 to external systems with which the ODFI computing system 721 is communicatively coupled. Function calls made to the biller exchange computing system 741 (e.g., 712, 744, etc.) are made by calling the public functions exposed by the exchange API 332 to external systems with which the biller exchange computing system 741 is communicatively coupled. Function calls made to the RDFI computing system 761 (e.g., 726, etc.) are made by calling the public functions exposed by the biller API 310 to external systems with which the RDFI computing system 761 is communicatively coupled.

Figure 7A:
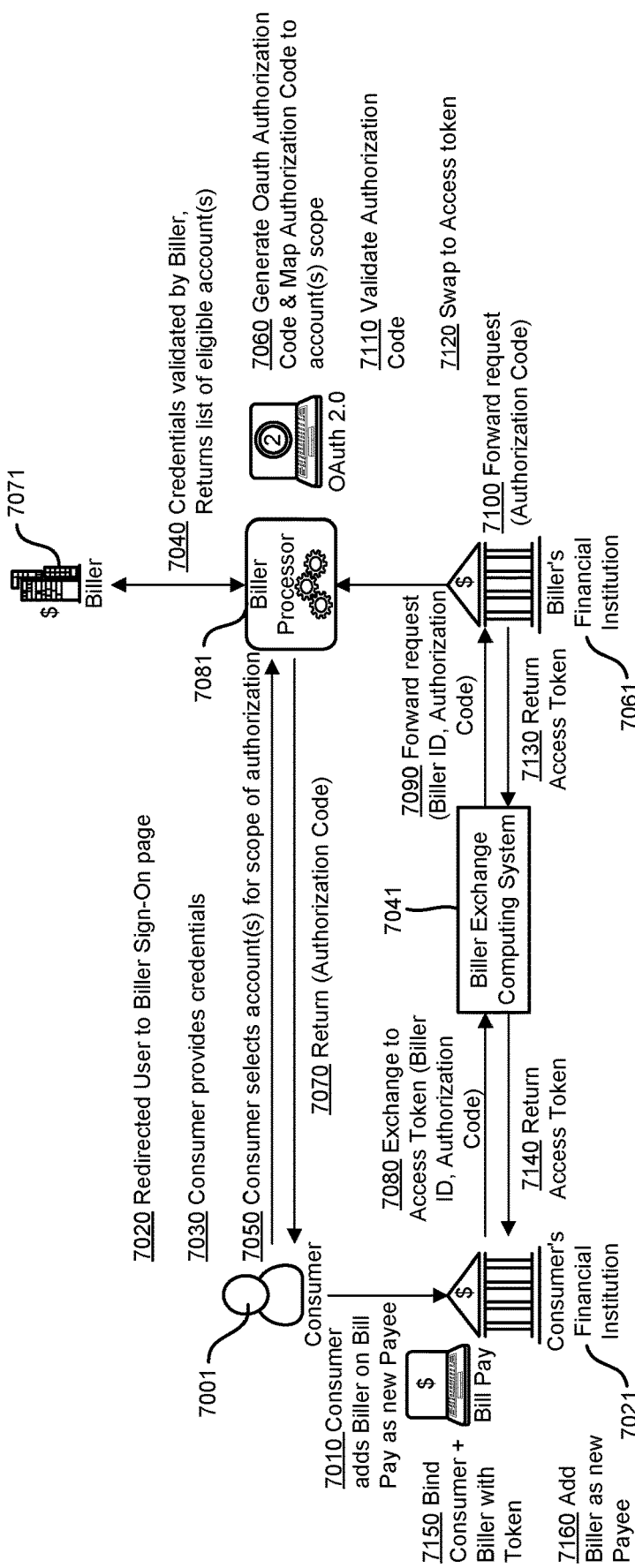
FIG. 7A shows the computing systems involved in the biller enrollment process enabled by the biller exchange computing system.
Figure 7B:
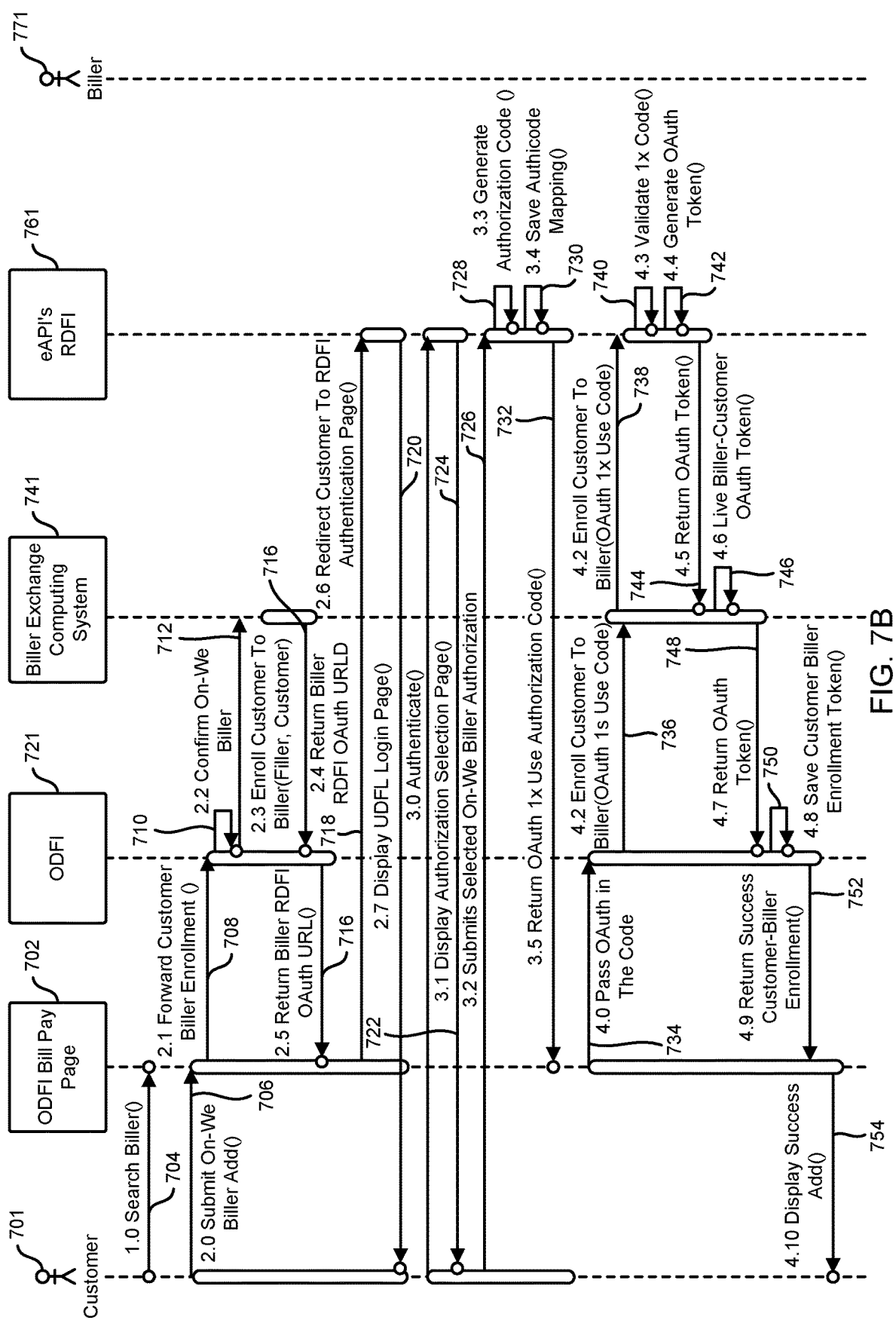
FIG. 7B is a sequence flow diagram for biller enrollment using an example API, according to an example embodiment.
Figure 7C:
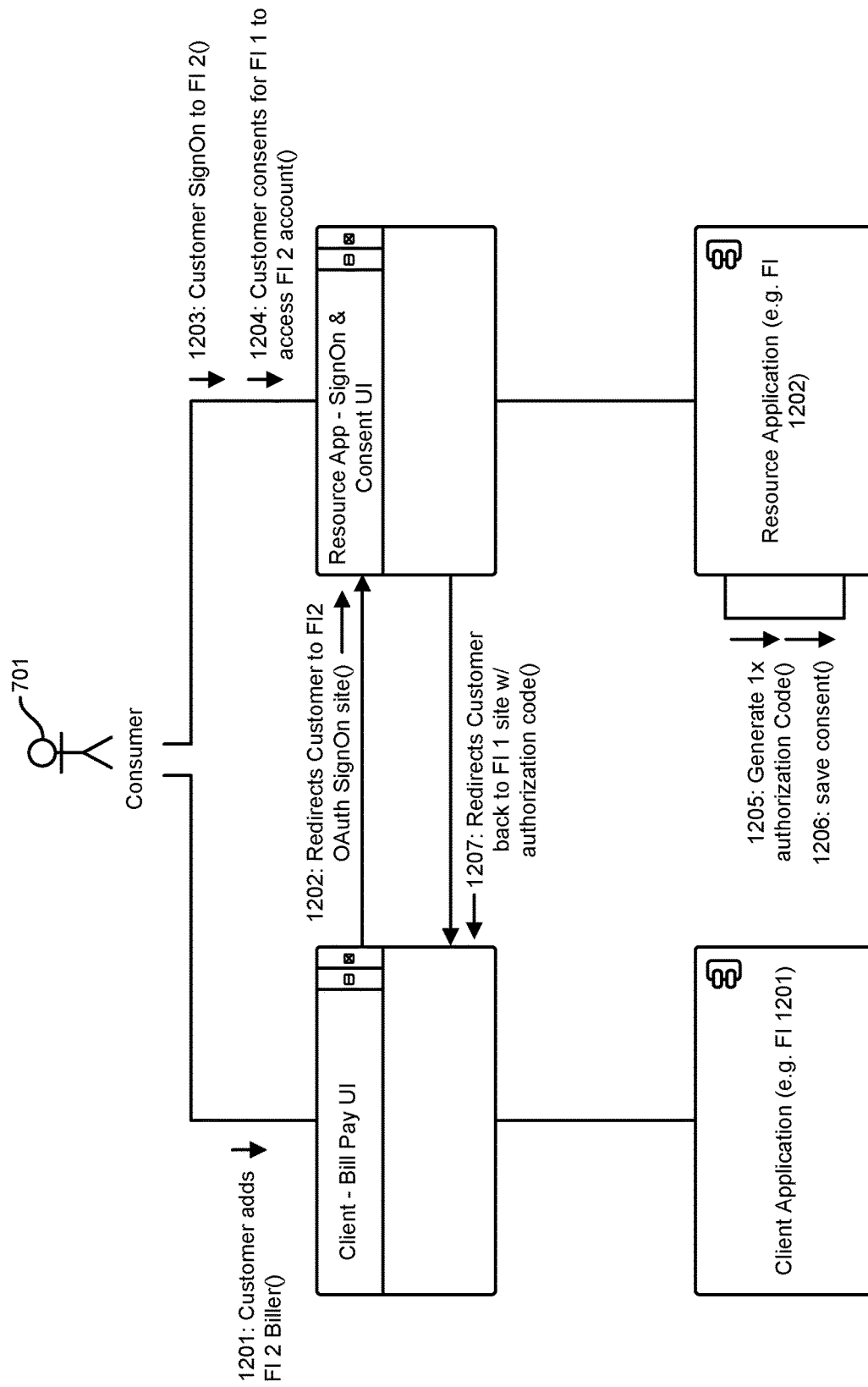
FIG. 7C is a sequence flow diagram illustrating an enrollment operation with browser to browser customer consent.
Figure 7D:
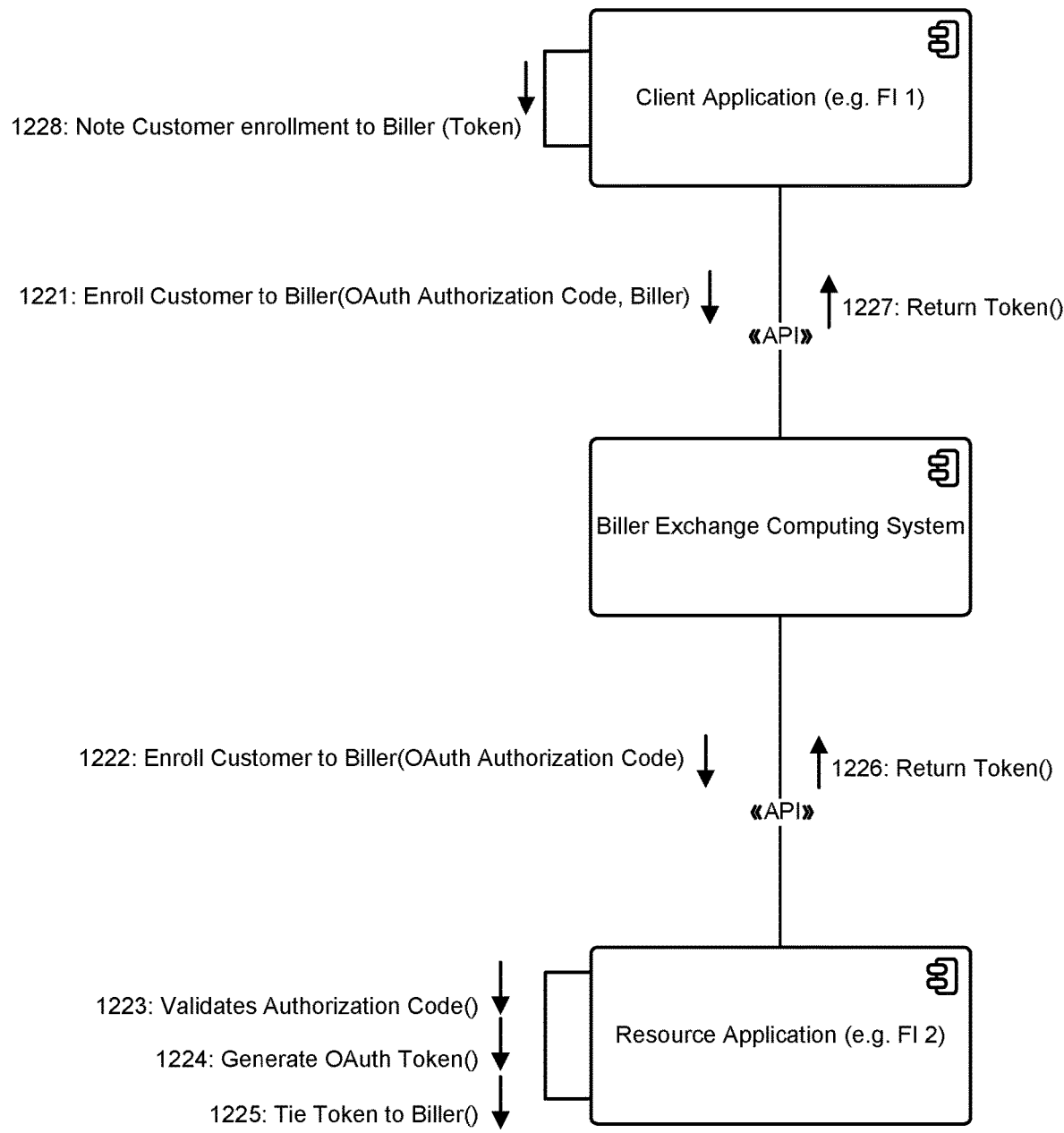
FIG. 7D is a block diagram illustrating an enrollment operation with server to server token retrieval for preparing the example data store of FIG. 5.
Figure 7E:
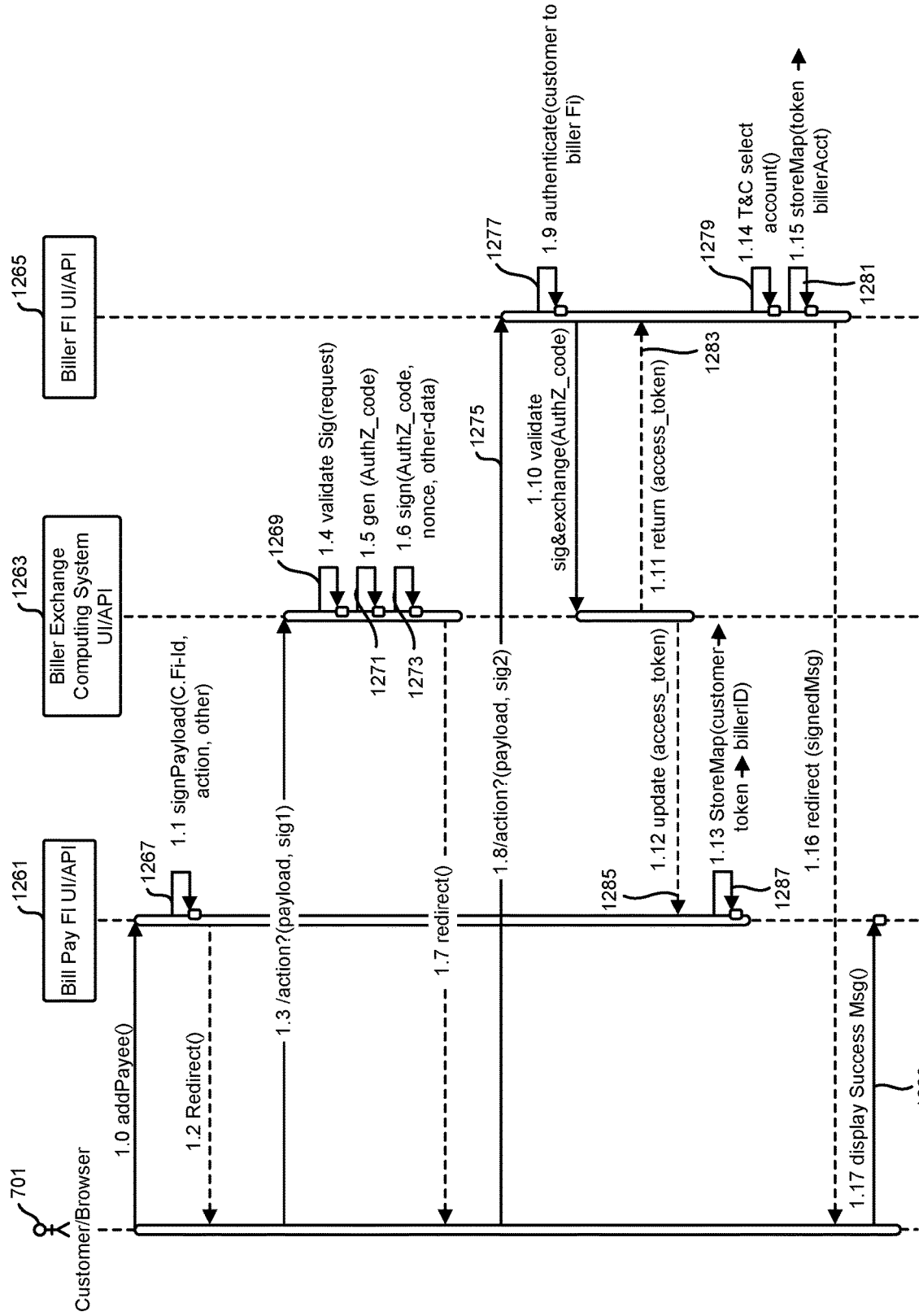
FIG. 7E is a block diagram illustrating an enrollment operation integrating small financial institutions or biller or both for preparing the example data store of FIG. 5.

FIGS. 7A-7E show the computing systems involved in the biller enrollment process, according to an example embodiment, and APIs therefor. FIG. 7A shows the computing systems involved in the biller enrollment process facilitated by the biller exchange computing system. FIG. 7B is a sequence flow diagram for biller enrollment using an example API, according to an example embodiment. FIG. 7C is a sequence flow diagram illustrating an enrollment operation with browser to browser customer consent. FIG. 7D is a block diagram illustrating an enrollment operation with server to server token retrieval for preparing the example data store of FIG. 5. FIG. 7E is a block diagram illustrating an enrollment operation integrating small financial institutions or billers or both for preparing the example data store of FIG. 5.

In FIG. 7A, the infrastructure includes consumer 7001 operating a consumer computing device, consumer's financial institution 7021 operating a financial institution computing device, biller 7071 operating a biller computing device, biller processor 7081 operating a biller processor computing device, and biller financial institution 7061 operating a biller financial institution computing device. One of skill will appreciate that computing devices may be server devices, client devices, mobile devices, etc. as appropriate. The participants in the payments ecosystem share information and perform transactions enabled by the biller exchange computing system 7130. In an example embodiment, the biller exchange computing system 7130 may be operated by a consortium of financial institutions, and the consumer's financial institution 7021, biller's financial institution 7061, biller processor 7081, etc. may be members thereof.

The participants in the payments ecosystem exchange data and perform transactions via a set of APIs that support interoperability among the participant systems. More particularly, in an example embodiment, the consumer 7001 may use the consumer computing device to initiate the process of adding a consumer's biller 7071 via the exchange, thereby creating a new mapping between the consumer 7001 and one or more consumer accounts with the biller 7071. For example, a user with a new mortgage and credit card account at Bank A may hold a checking account at Bank B. The user may use Bank B's Bill Pay user interface to set up automatic bill inquiry, bill presentment, and payment features to Bank A using the exchange. The new mapping is secured using tokenization—for example, via an OAuth token, which may include or be stored relationally to customer information, biller identifier, biller account identifier, biller processor identifier, OAuth authorization scope information, pre-scheduled payment information, etc. Once a mapping is established, the biller 7017 is considered enrolled (relative to the consumer and the consumer's particular product with the biller). Some aspects of an example API library and EDI messages related thereto are discussed in the table below:

TABLE 1

Example EDI Messages and API Functionality (Enrollment)

| API Identifier | Descriptor |
| --- | --- |
| 7010 | Consumer adds a Biller as a Payee on their FI's computing system's Bill Pay UI |
| 7020 | Consumer's FI computing system checks its Biller Directory received from On-We Exchange computing system to retrieve the OAuth Authorization URL and redirects Consumer there |
| 7030 | Consumer provides username/password credentials on Sign-On page hosted by Biller Processor computing system |
| 7040 | Credentials are forwarded and validated by Biller computing system, which returns the eligible account(s) that Consumer can authorize consent on |
| 7050 | Consumer selects the account(s) for the scope of OAuth authorization consent (e.g., read, write, selectively enabled read/write by functionality, selectively enabled read/write by data element access level/confidentiality, etc.) |
| 7060 | Biller Processor computing system generates Authorization Code and maps it to Consumer's selected account(s) scope of consent |
| 7070 | Biller Processor computing system navigates User back to Bill Pay return URL, along with Authorization Code |
| 7080 | Consumer's FI computing system exchanges Authorization Code to Access Token with Biller's FI computing system by invoking On-We Exchange's "Enroll" API, passing Biller ID and the Authorization Code received from Biller Processor computing system |
| 7090 | On-We Exchange computing system processes the "Enroll" request, internally maps the Biller ID received to the Biller's FI, and invokes Biller's FI comping system's "Enroll" API (forwarding the Biller ID and Authorization Code received) |
| 7100 | Biller's FI computing system forwards the Authorization Code to Biller Processor computing system for validation |
| 7110 | Biller Processor computing system validates the Authorization Code received |
| 7120 | If validation is successful, Biller Processor computing system generates OAuth Access Token to swap with the Authorization Code |
| 7130 | Biller's FI computing system returns the Access Token in its "Enroll" API response back to On-We Exchange |
| 7140 | On-We Exchange computing system forwards the same result back on its "Enroll" response to Consumer's Bank computing system |
| 7150 | Consumer's FI computing system Bill Pay saves and binds the Access Token to the Biller and Consumer |
| 7160 | Consumer's FI computing system Bill Pay displays a successful Biller enroll to Consumer message via UI |

In FIG. 7B, the customer 701 sets up bill pay for an off-us non-banking biller. In other words, the customer uses a first (ODFI) bank, and the biller uses a second (RDFI) bank. As shown, a biller processor is not used, but one of skill will appreciate that some of the functions performed by the computing systems shown may be performed by a biller processor computing system and/or a biller processor's financial institution computing system. The customer 701 may search for a known biller on the ODFI bill pay page 702 at step 704. At step 706, the customer 701 may submit a request to add an on-we biller to the customer's list of payees on the ODFI bill pay page 702. The ODFI bill pay page 702 forwards the biller enrollment request from the customer 701 to the ODFI computer system 721 at step 708. The ODFI computing system 721 confirms the on-we biller at step 710 and enrolls the customer 701 to the biller profile in the biller exchange computing system 741 at step 712. At step 716, the biller exchange computing system 741 returns the biller RDFI OAuth URL to the ODFI 721, which further returns the biller RDFI OAuth URL to the ODFI Bill pay page 702. Afterwards, on the ODFI Bill pay page 702, the customer 701 may redirect the customer 701 to RDFI authentication page at 718 and access RDFI 761. The RDFI 761 may display the RDFI login page to the customer 701 at step 720.

After authentication, the customer 701 may then interact with RDFI 761 through the biller exchange computing system 741. For example, the customer 701 may request authentication at step 722. The RDFI 761 may then display authorization selection page to the customer 701 at step 724. The customer 701 may submit selected on-we biller authorization at step 726. The RDFI 761 may then generate authorization code at step 728. At step 730, the RDFI 761 may save the mapping of the authorization codes. At step 732, a one-time OAuth authorization code is returned to the ODFI bill pay page 702.

At step 734, the ODFI bill pay page 702 passes the OAuth authorization code to the ODFI 721. The ODFI 721 may enroll the customer 701 to the biller 771 in the biller exchange computing system 741 at step 736. In some embodiments, the biller exchange computing system 741 may forward the customer enrollment to the RDFI 761 at step 738, for example, without saving or otherwise interacting with the one-time authorization code. After validation, the RDFI 761 may validate the authorization at step 740 and generate an OAuth token at step 742. The RDFI 761 returns the OAuth token to the biller exchange computing system 741 at step 744. The biller exchange computing system 741 provides a live biller-customer OAuth token at step 746 and forwards or returns the OAuth token to the ODFI 721 at step 748. The ODFI 721 saves the customer biller enrollment token at step 750 and sends a confirmation of success of customer-biller enrollment notification to the ODFI bill pay page 702 at step 752. At step 754, the ODFI bill pay page 702 displays an enrollment success notification to the customer 701.

FIG. 7C is a block diagram illustrating an enrollment operation with browser to browser customer consent for preparing the example data store of FIG. 5. As shown, a biller processor is not used, but one of skill will appreciate that some of the functions performed by the computing systems shown may be performed by a biller processor computing system and/or a biller processor's financial institution computing system. At step 1201, the customer may add a biller associated with a different financial institution using a client end bill pay user interface. At step 1202, the bill pay user interface redirects the customer to an OAuth sign-on web-site of the biller's financial institution. For example, the user interface provides a biller's OAuth resource application sign-on or consent site URL. At step 1203, the customer 701 may sign on to the biller's financial institution.

At step 1204, the customer 701 may consent to allow his own financial institution to access the account created in the sign-on financial institution. After signing on and providing the consent at the OAuth web site, the resource application of the biller's financial institution may generate a one-time authorization code at step 1205. The resource application may save the consent from the customer 701 for future reference at step 1206. The customer 701 is redirected and returned to the bill pay user interface with authorization code at step 1207. As such, both the client's bill-pay site and the biller's OAuth sign-on site may whitelist the URLs therebetween, allowing OAuth to redirect information flow between these two endpoints. In some embodiments, the redirecting URLs may be shared between the end points through new data attributes in the biller directory exchange systems as disclosed herein.

FIG. 7D is a block diagram illustrating an enrollment operation with server to server token retrieval for preparing the example data store of FIG. 5. As shown, a biller processor is not used, but one of skill will appreciate that some of the functions performed by the computing systems shown may be performed by a biller processor computing system and/or a biller processor's financial institution computing system. In this embodiment, a customer may be enrolled via the client application to associate with a biller using an OAuth authorization code at step 1221. For example, this may be achieved through both the client bill pay application and the biller resource application that are integrated via an enroll API at the biller exchange computing system as disclosed. The biller exchange computing system may abstract and mediate the OAuth Token Retrieval request from the Client Bill Pay Application to the Biller Resource Application end points. As such, the one-time integration (enrollment) with the biller exchange computing system provides the technical benefit of abrogating the need for each of the customer and biller's end point applications to implement multiple direct backend authorizations with each other every time a customer performs a presentment inquiry, schedules a transaction, etc. At step 1222, a second enrollment process, which includes swapping of a temporary authorization code for a token, can also be performed without including biller information in the API messages.

At steps 1223-1225, the resource application may be in connection with a public enroll API that allows the biller exchange computing system 210 to pass the token retrieval request to biller. In such a situation, the biller exchange computing system 210 may forward the OAuth token returned from this biller API to the client bill pay application. At step 1223, authorization code is validated by the resource application. At step 1224, the resource application may generate an OAuth token in response to a successful validation of the authorization code. At step 1225, the generated OAuth token may be tied to the biller for future transaction processes. At step 1226, the generated OAuth token is returned through the biller exchange computing system 210 to the next step. At step 1227, the OAuth token is returned, in a forwarding manner, to the client application. The client application then saves the OAuth token to note the customer enrollment with the biller at step 1228. In this manner, the biller exchange computing system may bridge the token requests and responses between the client application and resource application, facilitating real-time operations.

FIG. 7E is a block diagram illustrating an enrollment operation for integrating small financial institutions or billers or both for preparing the example data store of FIG. 5. As shown, a biller processor is not used, but one of skill will appreciate that some of the functions performed by the computing systems shown may be performed by a biller processor computing system and/or a biller processor's financial institution computing system.

As shown in the embodiment of FIG. 7E, the biller exchange computing system API 1263 performs some or all of the token generation functions that may ordinarily be performed by biller processor computing systems for larger billers (e.g., as shown in FIG. 7A). Often, small financial institutions or billers may not have adequate resources or technology setup to implement an OAuth API and/or tokenization infrastructure. FIG. 7E provides another embodiment of enrollment token generation supported by the biller exchange computing system for such situations. A customer may access the biller exchange computing system API 1263 via its bill pay API 1261 associated with the customer's financial institution. The biller exchange computing system API 1263 may handle the responsibilities of OAuth authorization code and token generation in place of a tokenization infrastructure of a biller processor computing system. For example, a customer device may initiate a small biller enrollment process. The customer's financial institution may send an electronic message that includes a customer signature payload. The customer signature may comprise information needed to identify the customer and/or the customer's financial institution to the biller. The message may be routed through the exchange computing system API 1263. The exchange computing system API 1263 may, in response to a validation request, validate a signature at 1269 (e.g., confirm that a customer is associated with the customer's financial institution), generate an authorization code at 1271, and sign the generated authorization code 1273. The authorization code may be forwarded to a biller computing system, where the authorization code may be authenticated at 1277 (automatically or by an operator) to confirm that the biller will accept electronic remittances initiated by the customer's financial institution. If these operations are performed automatically, the biller may use the biller API 1265 to perform authentication of the authorization code.

The biller may use the biller API 1265 to invoke an API exposed by the biller exchange computing system at step 1277. The biller exchange computing system may swap out the authorization code for an access token (e.g., one generated by a token generator) and send the access token back to the biller computing system, where the token may be stored in storage media relationally to the customer and/or biller account information. This allows for biller account selection at step 1279. The access token may be a numeric or alphanumeric entity (including special characters) and may include or be stored relationally to a biller identifier, a customer identifier, a biller's product identifier, payment information (e.g., a monthly amount due, a monthly auto-pay amount), custom security policy information required by the biller (e.g., customer challenge questions and answers, customer PIN code, etc.). In some embodiments, the token does not necessarily include the customer's login information for the biller's computing system, but may be used as a secondary authentication mechanism through the biller exchange computing system in the event the customer forgets the login credentials and is unable to reset them via the biller's computing system. For instance, the token may be decoded to provide challenge questions to the customer and request responses, to request a PIN code, etc. This provides the technical benefit of augmented system and data security.

The bill pay API 1261 also saves the token relationally to the customer and/or biller identifier for future processing at step 1287 and sends a confirmation notification to the customer 701 at step 1289.

FIGS. 8A-8C show the computing systems involved in the bill inquiry and presentment process, according to an example embodiment, and APIs therefor. FIG. 8A shows the computing systems involved in the bill inquiry and/or bill presentment process facilitated by the biller exchange computing system. Bill inquiry may be initiated by the consumer. Bill presentment may be initiated by the biller. FIG. 8B is a sequence flow diagram for bill inquiry and/or bill presentment using an example API, according to an example embodiment. FIG. 8C is a sequence flow diagram for the bill presentment process using an example API, according to an example embodiment.

In FIG. 8A, the infrastructure includes consumer 8001 operating a consumer computing device, consumer's financial institution 8021 operating a financial institution computing device, biller 8071 operating a biller computing device, biller processor 8081 operating a biller processor computing device, and biller financial institution 8061 operating a biller processor computing device. One of skill will appreciate that computing devices may be server devices, client devices, mobile devices, etc. as appropriate. The participants in the payments ecosystem share information and perform transactions enabled by the biller exchange computing system 8041. In an example embodiment, the biller exchange computing system 8041 may be operated by a consortium of financial institutions, and the consumer's financial institution 8021, biller's financial institution 8061, biller processor 8081, etc. may be members thereof.

The participants in the payments ecosystem exchange data and perform transactions via a set of APIs that support interoperability among the participant systems. More particularly, in an example embodiment, the consumer 8001 may use the consumer computing device to initiate the process obtaining the latest balance, latest bill, and other payment-related information from a particular biller 8071. Some aspects of an example API library and EDI messages related thereto are discussed in the table below:

TABLE 2A

Example EDI Messages and API Functionality
(Consumer-Initiated Bill Inquiry)

| API Identifier | Descriptor |
|---|---|
| 8010 | Consumer requests updated Biller info via their FI's computing system Bill Pay UI |
| 8020 | Bill Pay retrieves the OAuth Access Token tied to the Consumer and Biller |
| 8030 | Consumer's FI computing system executes an "Inquire" request against On-We Exchange computing system, passing the Biller ID and Access Token |
| 8040 | On-We Exchange computing system processes the "Inquire" request, internally maps the Biller ID received to the Biller's FI, and then invokes Biller's FI computing system's "Inquire" API, forwarding the Biller ID and Access Token |
| 8050 | Biller's FI computing system forwards the request to the Biller Processor computing system |
| 8060 | Biller Processor computing system validates the Access Token tied to the Biller and Consumer, and maps this to Consumer and Biller Account Number |
| 8070 | Biller Processor computing system retrieves the latest Biller info from the Biller computing system |
| 8080 | Biller's FI computing system returns the latest Biller info to On-We Exchange computing system |
| 8090 | On-We Exchange computing system returns the latest Biller info to Consumer's FI computing system |
| 8100 | Consumer's FI computing system Bill Pay displays the latest Biller info to Consumer via UI |

In another example embodiment, the consumer 8001 may receive, via the consumer computing device, electronic notifications and bills (e.g., as PDF documents, standardized electronic messages, etc.) from a particular biller 8071. Some aspects of an example API library and EDI messages related thereto are discussed in the table below:

TABLE 2B

Example EDI Messages and API Functionality (Biller-Initiated Bill Presentment)

| API Identifier | Descriptor |
|---|---|
| 8210 | Biller computing system pushes updated Biller info to their Biller Processor computing system |
| 8220 | Biller Processor computing system maps the Biller and Consumer to an Access Token |

TABLE 2B-continued

Example EDI Messages and API Functionality (Biller-Initiated Bill Presentment)

| API Identifier | Descriptor |
| --- | --- |
| 8230 | Biller Processor computing system forwards updated Biller info to Biller's FI computing system |
| 8240 | Biller's FI computing system invokes On-We Exchange to update Biller Info to Consumer, passing the Biller ID and Access Token |
| 8250 | On-We Exchange computing system passes the updated Biller info to the Consumer's FI computing system |
| 8260 | Consumer's FI computing system Bill Pay maps the Access Token and Biller ID to its specific Consumer |

In FIG. 8B, the customer 701 inquires about a bill from the biller 771. On the ODFI bill pay page 702, the customer 701 may send request to view bill details at step 802. The ODFI bill pay page 702 submits the request to view bill details to the ODFI 721 at step 804. In response, the ODFI 721 retrieves the customer-biller OAuth token saved from previous enrollment at step 806. The ODFI 721 may, in a continuing or a different session, send an inquiry to the exchange 741 at step 808. The biller exchange computing system 741 maps the biller-customer to RDFI 761 and forwards the inquiry to the biller 771 at step 812. The RDFI 761 validates the token at step 816 and maps the token to biller account at step 814. The RDFI 761 then sends the inquiry regarding the biller account to the biller 771 at step 818. The biller 771, in response to the inquiry, may automatically and/or instantly return a result to the RDFI 761 at step 820. The RDFI 761 ant the biller exchange computing system 741 may forward the result at steps 822 and 824 respectively, to the ODFI 721. The ODFI 721 then displays the bill details on the ODFI bill pay page 702 at step 826. The ODFI bill pay page 702 then displays the bill details to the customer 701 at step 828.

In FIG. 8C, a biller 771 may deliver an invoice or bill to the customer 701. The process or method includes step 1102 where the biller 771 issues a bill to an ODFI 721 for the customer 701 at an RDFI. The ODFI 721 looks up a corresponding customer-biller OAuth token and delivers the bill to the biller exchange computing system 741 at step 1104. The biller exchange computing system 741 maps the biller-customer relationship to RDFI and delivers the bill to RDFI 761 at step 1110. The RDFI 761 is operable to validate the token and process the received bill at step 1114. The RDFI 761 may then notify the customer 701 the billing request from the bill data at step 1116. The customer 701 may then pay the biller 771 in response to the notification received from the RDFI 761 at step 1118.

FIGS. 9A and 9B show the computing systems involved in a payment process, according to an example embodiment, and APIs therefor. FIG. 9A shows the computing systems involved in an example payment process facilitated by the biller exchange computing system. FIG. 9B is a sequence flow diagram for payment processing using an example API, according to an example embodiment.

In FIG. 9A, the infrastructure includes consumer 9001 operating a consumer computing device, consumer's financial institution 9021 operating a financial institution computing device, biller 9071 operating a biller computing device, biller processor 9081 operating a biller processor computing device, and biller financial institution 9061 operating a biller processor computing device. One of skill will appreciate that computing devices may be server devices, client devices, mobile devices, etc. as appropriate. The participants in the payments ecosystem share information and perform transactions enabled by the biller exchange computing system 9051. In an example embodiment, the biller exchange computing system 9051 may be operated by a consortium of financial institutions, and the consumer's financial institution 9021, biller's financial institution 9061, biller processor 9081, etc. may be members thereof.

The participants in the payments ecosystem exchange data and perform transactions via a set of APIs that support interoperability among the participant systems. More particularly, in an example embodiment, the consumer 9001 may use the consumer computing device to initiate or schedule a payment to particular biller 8071. In some embodiments, a payment transaction may be based at least in part on the billing information received from the biller 8071 via the exchange via the bill inquiry and/or bill presentment API functions. For example, certain fields of the payment transaction, such as a payment date, payment amount, memo line, reference account number, reference bill identifier, etc. may be pre-populated. In an example embodiment, the FI computing system of the consumer 9001 initiates a transmission of a remittance to the biller computing system through a payment rail, such as TCH RTP®. In some embodiments, a Credit Transfer message (PACS 008) is used to transmit remittance information. The PACS 008 message may be generated by the API according to a predetermined PACS format and further augmented with exchange-specific information indicating that the payment is enabled via the exchange. For example, the PACS 008 message may contain an indicator for financial institutions to recognize that the payment is made through the exchange, an exchange identifier, an encoded identifier of a computing resource where the biller exchange computing system 9051 stores the binding information for the corresponding enrollment mapping, a unique identifier assigned by the biller exchange computing system 9051 for a specific payment being made on a specific bill (to enable a technical benefit of the biller computing system automatically posting the payment received via the exchange to a particular bill, etc.). The Payment Rail computing system may route the real-time payment remittance to the Biller's FI computing system as part of the PACS 008 or similar message, passing the biller id and the OAuth token in addition to the remittance data. In some embodiments, the OAuth token is included in the message. In some embodiments, individual remittance messages contain records for a plurality of payments that may share, for example, the same biller, the same target account (e.g., where a biller posts all payments from different customers, received for a particular product/family of products, to a particular account), the same product or family of products (e.g., all credit card payments, all mortgage loan payments), etc.

Some aspects of an example API library and EDI messages related thereto are discussed in the table below:

TABLE 3

Example EDI Messages and API Functionality (Payments)

| API Identifier | Descriptor |
| --- | --- |
| 9010 | Consumer requests to pay their Biller via their FI computing system Bill Pay UI |
| 9020 | Consumer can select to pay their Biller manually or automatically when updated Biller info (e.g., updated bill) is received |
| 9030 | Bill Pay retrieves the OAuth Access Token tied to the Consumer and Biller |
| 9040 | Consumer's FI computing system executes real-time payment remittance to the Biller's FI computing system through a payment rail, passing the Payment Remittance data: Biller ID and Access Token |
| 9050 | Payment Rail computing system routes the real-time payment remittance to the Biller's computing system, passing the Payment Remittance data: Biller ID and Access Token |
| 9060 | Biller's computing system forwards the request to the Biller Processor computing system |
| 9070 | Biller Processor computing system validates the Access Token tied to the Biller and Consumer, and maps this to Consumer and Biller Account Number |
| 9080 | Biller Processor computing system remits the payment to the Biller, passing the payment data, the Consumer, and Biller Account Number |
| 9090 | Biller's FI computing system returns the status and result of the payment to On-We Exchange computing system and/or Payment Rail Computing system |
| 9100 | On-We Exchange computing system returns the payment status and result to Consumer's FI computing system |
| 9110 | Consumer's FI computing system Bill Pay UI displays the payment status and result to Consumer |

In FIG. 9B, the customer 701 initiates/makes a payment to the biller 771. The customer 701 may submit a payment to biller on the ODFI bill pay page 702 at step 902. The ODFI bill pay page 702 submits the payment for the biller 771 to ODFI 721 at step 804. The ODFI 721 confirms the on-we biller relationship at step 906 and retrieves the OAuth token tied to the customer 701 and the biller 771 at step 908. At step 910, the ODFI 721 sends the payment toward the biller exchange computing system 741 which maps the biller-customer relationship at step 912. The biller exchange computing system 741 then forwards the payment to RDFI 761 at step 914. The RDFI 761 validates the token at step 916 and deposits a payment to the biller 771's account at step 918.

At step 920, the payment is posted to the biller 771 or a system thereof. In response, the biller 771 may return a payment result at step 922. The RDFI 761 may send an inquiry for the bill details at step 924. The biller 771 returns the inquired bill details to the RDFI 761 at step 926. In some embodiments, the ODFI 721 and the RDFI 761 as shown in FIG. 9 may be the same financial institution. In such situation, the financial institution may post the payment and/or bill details internally or route roundtrip out to the biller exchange computing system 741. The RDFI 761 then returns the payment results and bill details to the biller exchange computing system 741 at step 928. The biller exchange computing system 741 forwards the payment result and bill details to the ODFI 721 at step 930. The ODFI 721 returns the results to the ODFI bill pay page 702 at step 932. The customer 701 may then view the payment results and bill details on the ODFI bill pay page 702 at step 934.

FIGS. 10A and 10B show the computing systems involved in biller directory replication and/or synchronization, and the APIs therefor. FIG. 10A shows the computing systems involved in the biller registration process facilitated by the biller exchange computing system. FIG. 10B is a sequence flow diagram for a biller directory replication and synchronization process using an example API, according to an example embodiment.

In FIG. 10A, the infrastructure includes biller 1071 operating a biller computing device, biller processor 1081 operating a biller processor computing device, biller and/or biller processor financial institution 1061 operating a computing device, and/or other financial institutions (such as other biller and/or biller processor financial institutions, consumer financial institutions, third party processors, payment rail operators, etc.) and their respective computing devices. One of skill will appreciate that computing devices may be server devices, client devices, mobile devices, etc. as appropriate.

The participants in the payments ecosystem share information and perform transactions enabled by the augmented biller directory 1010. In some embodiments, the augmented biller directory 1010 is hosted by a biller exchange computing system (not shown). In some embodiments, the augmented biller directory 1010 is distributed in whole or in part across various computing systems. The augmented biller directory 1010 is distributed to financial institutions via data replication, data synchronization, and the like. For instance, as shown at 1010, the exchange can support an aggregated and standardized biller directory comprising billers that belong to multiple different biller directory sources that may be used across the participant systems (e.g., EBIDS, Fiserv, FIS, MasterCard, etc.). Further, as shown at 1020, each participant can augment the aggregated biller directory by registering additional billers associated with the participant financial institution, their associated biller processors, relational mappings therebetween, etc. As shown at 1030, biller registration data can include an indicator denoting whether the biller will accept real-time or batch payments. The indicator may be used by the exchange when payments are scheduled or initiated to determine the appropriate payment rail, to build a credit transfer message, etc. As shown at 1040, biller registration and/or augmentation may be performed through a user interface of a biller registration web site (e.g., through data entry, batch biller data upload, etc.) and/or through an API hosted by the biller exchange computing system. As shown at 1050, the augmented biller directory is distributed, via synchronization (e.g., full download) and/or replication (e.g., partial download) to the participant computing system.

In FIG. 10B, the financial institution or biller 771a may establish secure relationships on the biller exchange computing system 741 with other financial institutions 771b. FIG. 10B further elaborates the communications 420 and 422 of FIG. 4. For one-time biller data load 420, the biller 771a may register with the biller exchange computing system 741 and allows the application to extract all biller data at step 1002. The extracted biller data is then sent to the biller exchange computing system 741 at step 1004. The biller exchange computing system 741 then saves the extracted biller data at step 1006. For recurring biller data synchronization 422, the biller 771a may provide a biller update or new biller registration by adding or updating biller data at step 1012. The application then sends the updated or new data to the biller exchange computing system 741 at step 1014. The biller exchange computing system 741 then saves the biller data at step 1016 and forward the saved updated data to other financial institutions 771b at step 1018. As such, the updated biller account information or customer data may be published at the biller exchange computing system 741 per agreement.

In some embodiments, the biller data may be periodically updated, for example, through receiving incremental update records from a computing system of the biller 771a. Examples of updated biller data may include remittance addresses, product names and/or identifiers, etc. The biller exchange computing system 741 may maintain a cross-reference directory, which may store the biller information relationally to an immutable biller identifier generated by the biller exchange computing system computing 741 and/or relationally to the access tokens generated for individual customers of the biller 771a. Advantageously, when biller information changes, the biller identifier and/or access tokens (or parts thereof related to biller identifying information) may remain immutable.

Figure 11:
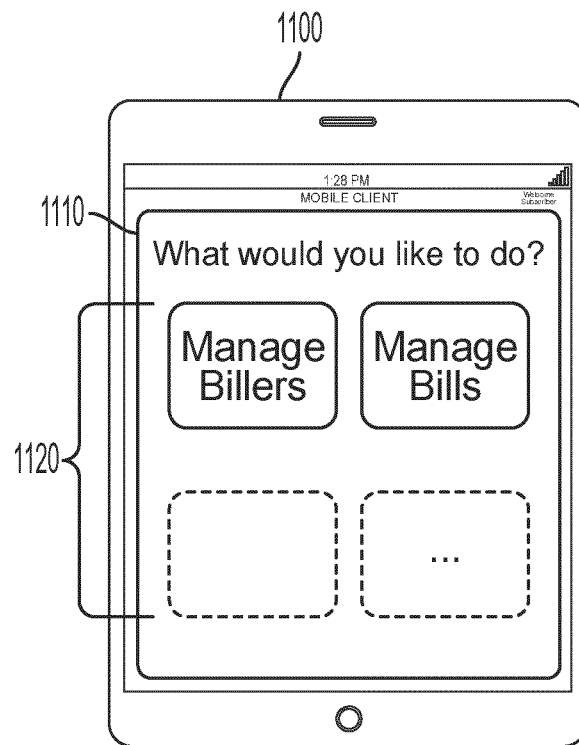
FIG. 11 shows a customer-side landing page for a computer application structured to allow a customer to interact with the biller exchange computing system using a computing device, according to an example embodiment.
Figure 12A:
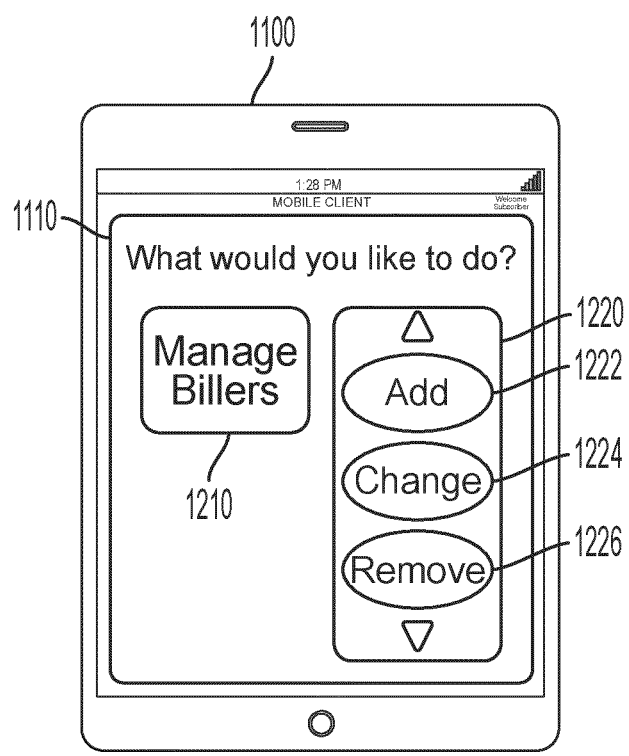
FIG. 12A-12D show customer-side aspects of an enrollment process, where a customer adds a biller using the biller exchange computing system using the computing device of FIG. 11, according to an example embodiment.
Figure 12B:
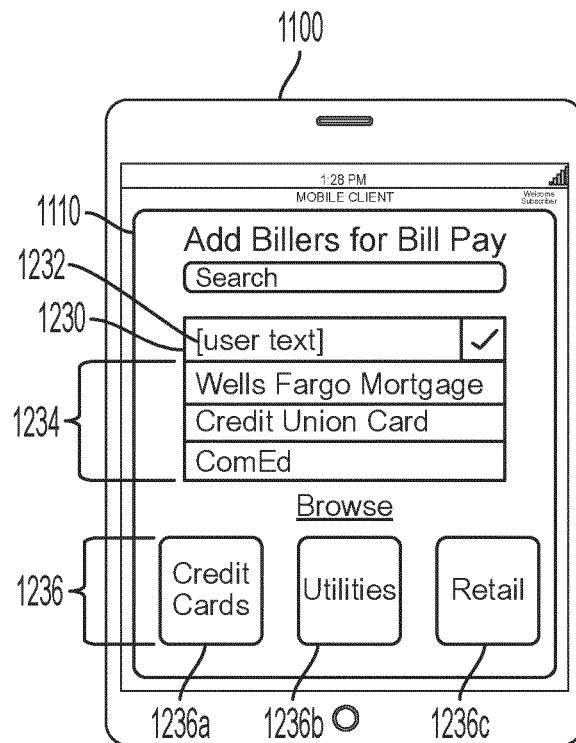
Figure 12C:
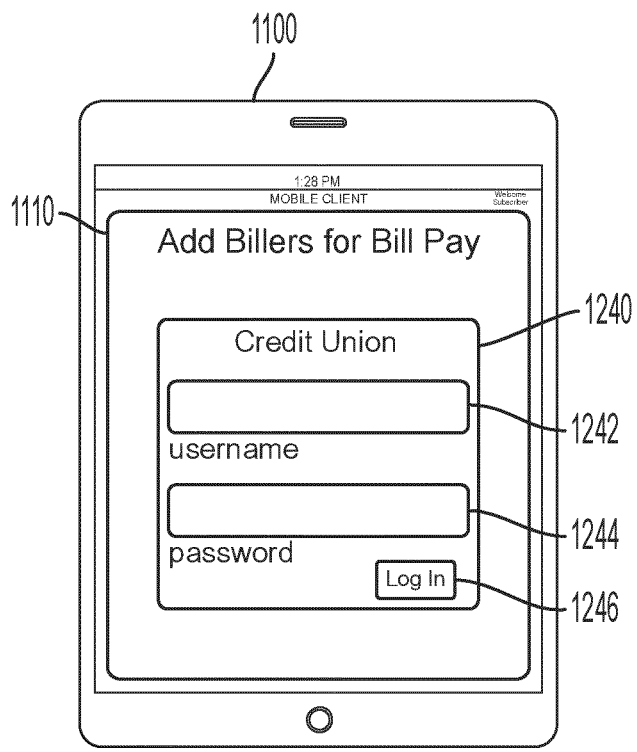
Figure 12D:
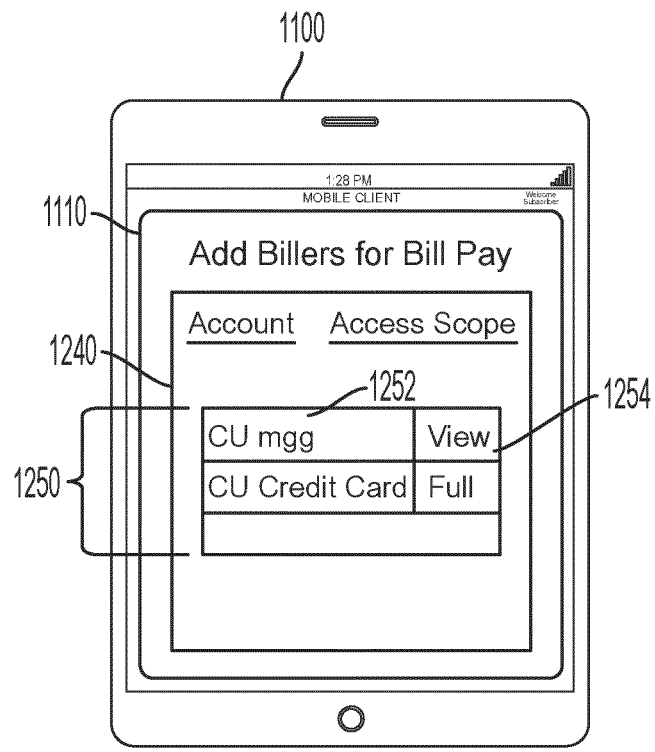
Figure 13A:
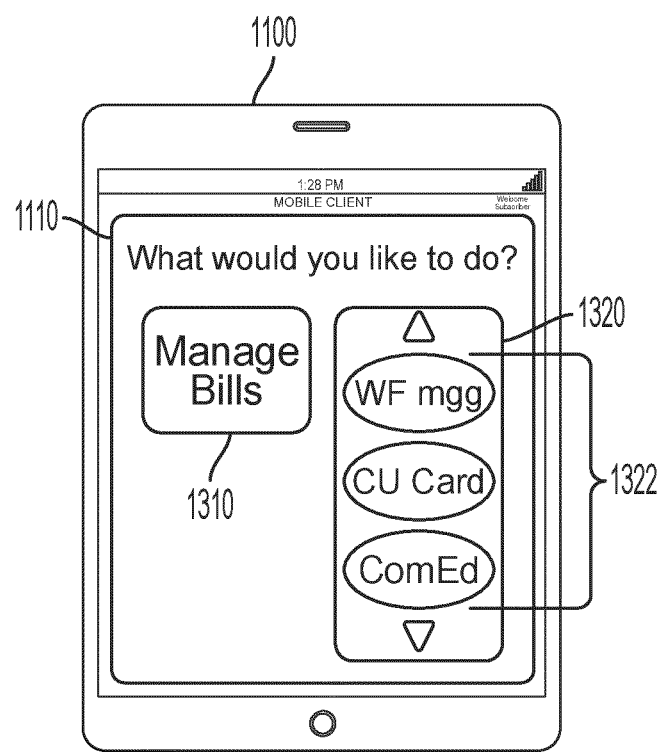
FIG. 13A-13C show customer-side aspects of a bill payment process via the biller exchange computing system using the computing device of FIG. 11, according to an example embodiment.
Figure 13B:
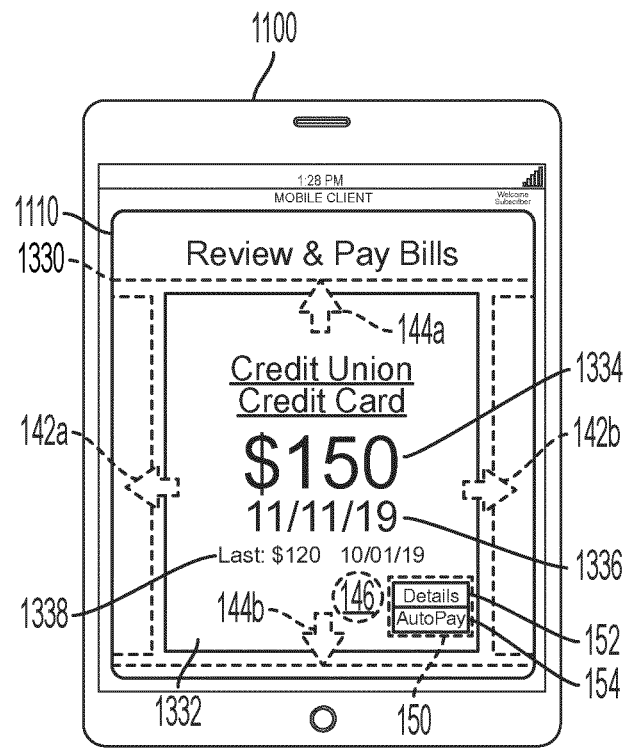
Figure 13C:
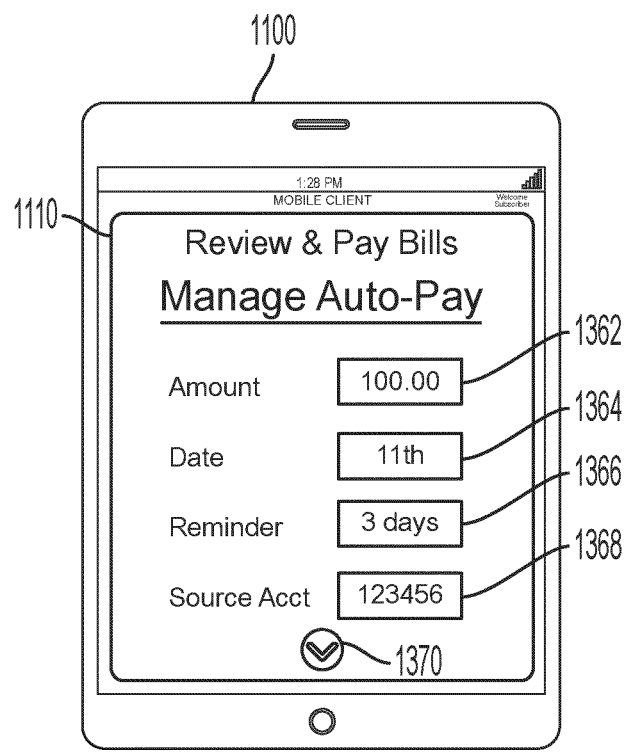

FIG. 11-13C show example customer-side user interfaces for interacting with a biller exchange computing system using a computing device, according to an example embodiment. More specifically, FIG. 11 shows a customer-side landing page for interacting with the biller exchange computing system using a computing device, according to an example embodiment. FIG. 12A-12D show customer-side aspects of an enrollment process using a computing device, where a customer adds a biller using the biller exchange computing system, according to an example embodiment. FIG. 13A-13C show customer-side aspects of a bill payment process through the biller exchange computing system using a computing device, according to an example embodiment.

FIG. 11 shows a customer-side landing page for a biller exchange bill pay application 1110. The biller exchange bill pay application 1110 is structured to allow a customer (user of a device 1100) to interact with a biller exchange computing system, according to an example embodiment. A user may interact with a biller exchange computing system, such as the biller exchange computing system 330 described in reference to FIG. 3 and FIG. 4, to add bill pay billers, review bills, pay bills, request current bills, etc. Advantageously, the bill pay billers added by the user may include any of on-us or off-us billers subscribed to the exchange. For example, the systems and methods described relative to FIG. 11-13C can enable a user to access mortgage loan bills, credit card bills, retail credit bills, utility bills, etc., and these bills may be generated by a number of billers who may or may not be affiliated with a financial institution at which the user holds the source account for paying the bills.

As shown, the biller exchange bill pay application 1110 is accessible via the device 1100. The device 1100 may be any suitable computing device, such as an information kiosk, an ATM, a desktop computer, a laptop, a tablet, an e-reader, a smart phone, a smart TV, and/or a wearable device (a smart watch, a smart bracelet, etc. as shown, for example, in FIG. 14-15C). As shown according to an example embodiment, the device 1100 is a mobile device, such as a smartphone, having a touchscreen. One of skill will appreciate that another type of a network-enabled computing device having a display which allows the user to interact with the computing device (for example, by touching areas on the screen) can be used to access the biller exchange bill pay application 1110.

In some embodiments, the biller exchange bill pay application 1110 is a web-based application accessible via a hyperlink. In some embodiments, the biller exchange bill pay application 1110 is an application installable or otherwise made available on the device 1100. The biller exchange bill pay application 1110 may be managed by the financial institution at which the user holds the source account, or the biller exchange bill pay application 1110 may be a separate (e.g., stand-alone and/or managed by another party) application made accessible to the user by redirecting the user from the financial institution's website or application to the exchange bill pay application 1110, or installable directly by the user to the device 1100.

As shown, a landing page of the exchange bill pay application 1110 includes a plurality of tiles 1120. Generally, to maximize user-interactive screen space, a tile-based interface is structured to place items in rows and columns with little white space between the tiles. However, according to various embodiments, the tiles 1120 can be implemented as icons, cards (e.g., tiles with additional functionality), menu items, navigable hyperlinks, etc. Each of the tiles 1120 are shown to allow the user to access various aspects of the exchange bill pay application 1110. For example, each of the tiles 1120, respectively, may be structured to allow the user to add a biller, pay a bill, request the latest bill, etc.

As shown according to an example embodiment, the exchange bill pay application 1110 may be structured for optimized performance on the device 1100. In some embodiments, performance optimization may include a shortened application loading time on the device 1100. In some embodiments, to shorten the initial loading time of the exchange bill pay application 1110, the tiles 1120 may be structured to provide information in a "progressive disclosure" fashion, such that a reduced amount of content is initially provided. For example, each tile 1120 may be structured, in response to detecting a user interaction with a particular tile 1120, to expand or generate an overlaid menu that provides additional information, navigation options, etc. as shown in reference to FIG. 12A.

In some embodiments, to shorten the initial loading time and improve response time of the exchange bill pay application 1110 where the exchange bill pay application 1110 is a web application delivered via a browser on the device 1100, the exchange bill pay application 1110 may comprise a loading optimization circuit. The loading optimization circuit may be client-side (e.g., JavaScript code embedded in the code that implements the landing page) and/or server-side. The loading optimization circuit may be structured to optimize the exchange bill pay application 1110 for fast loading and/or fast performance. For example, the loading optimization circuit may be structured to query the properties of the browser used on the device 1100 and/or to parse the user's HTTP request (e.g., the user agent part of the HPPT request submitted via a user's browser) to determine the device type, operating system, connection type (e.g., Wifi, LAN, cellular, etc.), connection speed, etc. If any of these properties are within a predetermined set or range of values, the loading optimization circuit may be structured to render a "light" or otherwise optimized version of the exchange bill pay application 1110. For example, the loading optimization circuit may be structured to parse an HTTP request to render the exchange bill pay application 1110, received from the device 1100. Based on the request, the loading optimization circuit may identify the browser version of the device 1100, the operating system version of the device 1100, whether the device 1100 is a touchscreen device, etc. and to render appropriate content from a particular library of code, resources, and executables based on the determination. Rendering appropriate content may include, for example, using a set of compressed (smaller sized) images for populating the tiles 1120, rendering particular touch-responsive user interface components, etc.

FIG. 12A-12D show customer-side aspects of a biller enrollment process, where a customer adds a biller using the biller exchange computing system, according to an example embodiment.

As shown in FIG. 12A, when the exchange bill pay application 1110 detects a user interaction with the manage billers touch-responsive tile 1210, the exchange bill pay application 1110 may display the menu 1220. The menu 1220 may be overlaid in whole or in part over the manage billers touch-responsive tile 1210. The menu 1220 may contain any suitable user interface components for selecting application functionality, such as icons, graphics, cards, hyperlink, etc. In some embodiments, the menu 1220 is part of the manage billers touch-responsive tile 1210, e.g., where the manage billers touch-responsive tile 1210 is implemented as an accordion control (e.g., as a graphical control element comprising a vertically stacked list of items). The manage billers touch-responsive tile 1210 may be structured to expand responsive to detecting a user interaction (a tap, a swipe, a mouse click, etc.) and to reveal the options shown on the menu 1220.

The menu 1220 contains a plurality of selectable entries. As shown, the menu 1220 may contain selectable entries to add 1222, change 1224, and remove 1226 billers. When adding a biller, a user establishes a new bill pay association for the respective biller such that the user can request, view and pay bills for the respective biller, for example, as described in reference to FIG. 12B-12D. When changing an aspect of a biller relationship, the user may request a replacement token (e.g., a new OAuth token) for a biller, change the OAuth scope of access for an existing token associated with a biller, set up auto-pay for a biller, etc. When removing a biller, a user may cause the exchange bill pay application 1110 to delete or deactivate a particular biller with respect to the user such that the user may no longer use the exchange bill pay application 1110 to request, view and pay bills for that particular biller.

In some embodiments, the exchange bill pay application 1110 is structured to personalize the menu 1220 relative to the user. For example, before the exchange bill pay application 1110 fully loads, the exchange bill pay application 1110 may be structured to query a data source to identify the biller accounts set up for the user. The items to change 1224 and/or remove 1226 billers may not be displayed to the user if the user has not added any billers. In another example, the most frequently used menu options are displayed first.

Upon detecting a user interaction with the selectable entry to add 1222 a biller, the exchange bill pay application 1110 is structured to display a user interface screen, such as that of FIG. 12B. As shown in FIG. 12B, the user is presented with options to search for a biller and/or to browse a biller directory.

To search for a biller, the user may use the input control 1230. In some embodiments, the input control 1230 is a text box. In some embodiments, the input control 1230 is combines the features of a text box and a drop-down box. For example, the user may enter a search string 1232 to search for a biller. Responsive to detecting a user entry of a search string, the exchange bill pay application 1110 is structured to search a biller directory (e.g., the biller directory 341 of FIG. 3, the biller directory 1010 of FIG. 10, etc.) and to return a data set comprising matching entries. In some embodiments, the data from the biller directory is filtered to include only data applicable to the user. For example, if the exchange bill pay application 1110 has the user's permission to access the user's credit report data, the exchange bill pay application 1110 may return a reduced data set 1234 comprising only entries for the billers from the biller directory with whom the user has accounts, as determined by querying the credit report data for the user.

To browse for a biller, the user may use the glider 1236. As shown, the glider 1236 is a scrollable list of entries. In some embodiments, the glider 1236 may be implemented as a user-interactive card carousel, where various cards corresponding to categories of billers are presented to a user in a scrollable loop. As defined herein, a card is an electronic user interface control (e.g., a flexible and extensible content container, which may include touch-responsive functionality).

As shown, the glider 1236 comprises a plurality of user-interactive cards including a credit card card 1236a, a utilities card 1236b, a retail card 1236c, etc. In some embodiments, the glider 1236 may include an auto-scroll and/or scroll lock features. In some embodiments, the glider 1236 may be structured to present the cards in the card carousel in perspective view, such that the center card (e.g., the utilities card 1236b) is shown to be larger than its adjacent cards in order to maximize the amount of user-interactive screen space corresponding to the center card.

In some embodiments, the selection of cards in the glider 1236 is personalized to the user. For example, when loading the exchange bill pay application 1110 or the page shown in FIG. 12B, if the exchange bill pay application 1110 has the user's permission to access the user's credit report data, the exchange bill pay application 1110 may return a reduced data set 1234 comprising entries for the billers from the biller directory with whom the user has accounts. The exchange bill pay application 1110 may be structured to cross-reference a classification table from the biller directory to determine the respective categories for each entry in the reduced data set 1234 such that, for example, a ComEd bill is classified as a utility bill. The exchange bill pay application may generate a separate card for each category such that only the relevant categories are displayed to the user via the glider 1236. For example, as shown, the user of the exchange bill pay application 1110 has one or more credit cards accessible via the credit card card 1236a, one or more utility providers accessible via the utilities card 1236b, and one or more retail cards accessible via the retail card 1236c. Upon detecting a user interaction with a particular card, the exchange bill pay application 1110 is structured to display (e.g., in a list, as a set of icons, as an accordion control, etc.) a data set comprising relevant entries for selectable particular billers. Upon detecting a user interaction with an item from the data set comprising relevant entries for selectable particular billers, the exchange bill pay application 1110 is structured to provide a user interface to facilitate the user's login to the particular biller's website, as shown in FIG. 12C.

As shown in FIG. 12C, the exchange bill pay application 1110 can be structured to redirect the user's browser to a URL associated with the login page for the selected biller. In some embodiments, the exchange bill pay application 1110 displays a sign-on page 1240 that allows the user to log into the selected biller's system. The sign-on page 1240 may be hosted by a biller processor computing system. When a user enters a user name 1242, a password 1244, and taps on (or otherwise interacts with) the log-in control 1246, the exchange bill pay application 1110 is structured to transmit the user name 1242 and the password 1244 to the biller computing system. Upon validating the user's credentials, the biller computing system may return a list of eligible accounts (e.g., an account data set) held by the user with the biller. An example list of eligible accounts is displayed on the screen of the device 1100, as shown in FIG. 12D.

As shown in FIG. 12D, the account data set includes an account access definition schema 1250. In an example embodiment, the authorization protocol to access biller-provided data via the exchange bill pay application 1110 is OAuth. The account access definition schema 1250 comprises an account identifier 1252 and an access scope directive 1254. As shown, the access scope directive 1254 is an OAuth scope variable that limits the access of the exchange bill pay application 1110 to client-facing functionality and/or APIs provided by the biller computing system. For example, the user may set the access scope directive 1254 such that only bills can be accessed by the exchange bill pay application 1110 and such that access to other functionality (e.g., money transfers, account inquiry, account information updates, etc.) is restricted. In some embodiments, the access scope directives 1254 are pre-set by an executable running in the background (for instance, contemporaneously or substantially contemporaneously with generating a new OAuth token) such that users are not able to change this setting.

After the user selects an account identifier 1252 and/or sets the access scope directive(s) 1254 to a particular access level, the exchange bill pay application 1110 is structured to cause the biller processor computing system to generate an authorization code. The authorization code is mapped to (e.g., associated with, the association being stored in a transitory or non-transitory memory) the access scope directive 1254. The exchange bill pay application 1110 navigates the user back to the bill pay screen (e.g., to the landing page shown in FIG. 11). The exchange bill pay application 1110 transmits the authorization code to the user's financial institution computing system, which completes the biller addition process and initiates the generation of a new OAuth token as described, for example, in relation to FIG. 7A. In some embodiments, the exchange bill pay application 1110 is structured to initiate the generation of a new OAuth token. At the completion of the biller addition process, a biller-to-customer enrollment record is created. The biller-to-customer enrollment record is accessible to the exchange bill pay application 1110 and is cross-referenceable by exchange bill pay application 1110 to the OAuth token, which can be used by the exchange bill pay application 1110 to access bills, request new bills, schedule payments, process payments, etc.

FIG. 13A-13C show customer-side aspects of a bill payment process using the biller exchange computing system, according to an example embodiment. As part of this process, a user may use the exchange bill pay application 1110, delivered to the user via the device 1100, to inquire about bills (e.g., to request current bills from enrolled billers) and/or to make payments on bills, including one-time payments and auto-pay payments.

As shown in FIG. 13A, in some embodiments, when the exchange bill pay application 1110 detects a user interaction with the manage bills touch-responsive tile 1310, the exchange bill pay application 1110 is structured to determine the length of the user interaction and cause the user interface to display the appropriate controls based on the determination. For instance, if the user taps on the manage bills touch-responsive tile 1310, the user may be redirected to a bill pay page as shown and discussed relative to FIG. 13B. If the user taps and holds the manage bills touch-responsive tile 1310 for an amount of time that exceeds a predetermined threshold (e.g., 500 milliseconds, 1,000 milliseconds, etc.), a menu 1320 may be displayed, presenting additional options to the user.

The menu 1320 may be overlaid in whole or in part over the manage bills touch-responsive tile 1310. The menu 1320 may contain any suitable user interface components for selecting application functionality, such as icons, graphics, cards, hyperlinks, etc. In some embodiments, the menu 1320 is part of the manage bills touch-responsive tile 1310, e.g., where the manage bills touch-responsive tile 1310 is implemented as an expandable accordion control. The menu 1320 contains a plurality of selectable entries. As shown, the menu 1320 may contain one or more selectable entries 1322 for the relevant billers.

The menu 1320 may be personalized to the user of the exchange bill pay application 1110. As an example of menu personalization, in some embodiments, the menu 1320 may be populated only with dynamically generated icons 1322 for billers that have been previously added by the user as described relative to FIG. 12A-12D. More specifically, the exchange bill pay application 1110 may be structured to query a data store to retrieve a set of active (unexpired) OAuth tokens associated with the user of the exchange bill pay application 1110. For each OAuth token, the exchange bill pay application 1110 may be structured to query a cross-reference data source to determine biller identifying information based on the token. For each unique biller determined based on biller identifying information, the exchange bill pay application 1110 may be structured to access a data store to retrieve an appropriate graphical (e.g., the biller's logo), textual (e.g., the biller's name) and formatting (e.g., font type, font size, etc.) information. For each unique biller, the exchange bill pay application 1110 may be structured to generate a dynamically generated icon 1322 by adding a generic icon to the menu 1320 and populating various properties of the dynamically generated icon 1322 control with biller-specific graphical, textual and formatting information. Each dynamically generated icon 1322 may be further structured (e.g., by generating a customized query string and linking the query string to the icon) to cause a retrieval and display of a set of bills corresponding to the biller identified by the icon.

In some embodiments, detecting a user interaction with a particular dynamically generated icon 1322 that corresponds to a previously added biller may cause the exchange bill pay application 1110 to perform a bill inquiry process in order to obtain the most recent bill from the corresponding biller (as described, for example, in reference to FIG. 8A). In some embodiments, detecting a user interaction with a particular dynamically generated icon 1322 that corresponds to a previously added biller may cause the exchange bill pay application 1110 to navigate the user to a bill pay page shown in FIG. 13B where the user can review and pay the bills associated with the selected biller. In some embodiments, detecting a user interaction with a particular dynamically generated icon 1322 that corresponds to a previously added biller may cause the exchange bill pay application 1110 to navigate the user to an auto-pay set up page shown in FIG. 13C where the user can manage auto-pay settings for the selected biller. In some embodiments, the determination to redirect the user to one of the bill pay page or the auto-pay page is based on detecting the length of user interaction with the corresponding dynamically generated icon 1322. For instance, if the user taps on the dynamically generated icon 1322, the user may be redirected to the bill pay page. If the user taps and holds the dynamically generated icon 1322 for an amount of time that exceeds a predetermined threshold (e.g., 500 milliseconds, 1,000 milliseconds, etc.), the user may be redirected to the auto-pay setup page.

As another example of menu personalization, in some embodiments, the menu 1320 may also be populated with dynamically generated icons 1322 for billers that have not been previously added by the user but that are relevant to the user as determined, for example, by querying the user's credit report or other relevant data to which the user has allowed access. When combined with the previously added billers, the dynamically generated icons 1322 for the billers not previously added may be configured to be visually different from the previously added billers. In some embodiments, the exchange bill pay application 1110 may be structured to set different opacity levels for the selectable entries 1322 for billers that have been previously added (e.g., 100%) and for billers that have not been previously added (e.g., 50%). The opacity level describes the transparency level, where 1 (or 100%) is not transparent at all, 0.5 (or 50%) is 50% see-through, and 0 (or 0%) is completely transparent. In some embodiments, the dynamically generated icons 1322 for the billers that have not been previously added may be displayed in grayscale and the dynamically generated icons 1322 for the billers that have been previously added may be displayed in color. To accomplish color conversion, for each unique currently unenrolled but potentially relevant biller, the exchange bill pay application 1110 may be structured to generate a dynamically generated icon 1322 by adding a generic icon to the menu 1320 and populating various properties of the dynamically generated icon 1322 control with biller-specific graphical, textual and formatting information. The dynamically generated icon 1322 may be saved or cached as a temporary RGB (red, green, and blue) image file (e.g., a PNG file). The exchange bill pay application 1110 may be structured to retrieve the temporary RGB image file from transitory or non-transitory memory and convert the temporary color image file to a grayscale image file. For example, the temporary RGB image file may have the width of M pixels and the height of N pixels. The temporary RGB image file may be stored as three M-by-N arrays, each defining red, green, and blue color components on a zero-to-one scale for each pixel. For each pixel in each of the three M-by-N arrays, the exchange bill pay application 1110 may be structured to use an appropriate scaling equation (e.g., by taking an average of three color values using a straight average method, by taking a weighted average of three color values using a weighted average or luminosity method, etc.) to determine a pixel color value for the grayscale image. The exchange bill pay application 1110 may be structured to construct an M-by-N array comprising the grayscale values for each pixel, and to generate a grayscale icon image (e.g., a PNG image) based on this data. The dynamically generated icon 1322 may be set to use the grayscale icon image instead of the original temporary RGB image.

As yet another example of menu personalization, in some embodiments, the menu 1320 may be populated only with selectable entries 1322 for billers with whom the user has a currently outstanding balance and/or currently outstanding unpaid bills. In some embodiments, the selectable entries 1322 where the user is behind on payments may be visually identified by an attention-generating graphic, such as an exclamation point positioned proximate to or overlaying the dynamically generated icon 1322. In some embodiments, the dynamically generated icons 1322 are ordered such billers with overdue bills are displayed first within the menu 1320, billers with currently outstanding but not yet due bills are displayed second (e.g., below the group of billers with overdue bills), and billers with already paid bills are displayed third (e.g., below the group of billers with currently outstanding bills).

Referring now to FIG. 13C, the exchange bill pay application 1110 is structured to display a bill review page. A user may review and/or pay bills by navigating to the bill review page. For example, the user may review and/or pay bills by tapping on the manage bills touch-responsive tile 1310 or by selecting individual billers from the menu 1320. The bill review page may comprise a glider 1330. The glider 1330 may be populated with one or more user-interactive bills 1332, each populated with data for a bill from a particular biller. When a user navigates to the bill review page from the manage bills touch-responsive tile 1310 (rather than by selecting individual billers), the glider 1330 may comprise a plurality of user-interactive bills 1332 inclusive of all currently due and/or past due bills for the user.

Generally, the glider 1330 is a scrollable list of entries. In some embodiments, the glider 1330 may be implemented as a user-interactive card carousel, where various cards corresponding to user-interactive bills 1332 are presented to the user in a scrollable loop. In some embodiments, the glider 1330 may include an auto-scroll and/or scroll lock features. In some embodiments, the glider 1330 may be structured to present the cards in the card carousel in perspective view, such that the center card (e.g., the user-interactive bill 1332) is shown to be larger than its adjacent cards in order to maximize the amount of user-interactive screen space corresponding to the center card.

As shown, the glider 1330 includes at least one user-interactive bill 1332. The user-interactive bill 1332 is populated by the exchange bill pay application 1110 with bill information for a particular biller. In some embodiments, prior to loading the glider 1330 and/or generating the user-interactive bill 1332, the exchange bill pay application 1110 is structured to initiate a bill inquiry process to retrieve a current bill from a biller computing system (as described, for example, relative for FIG. 8A). In some embodiments, the exchange bill pay application 1110 may be structured to compare a bill date from a previously stored copy to today's date and, if the age of the bill exceeds a predetermined threshold (e.g., 7 days, 30 days, 60 days, etc.), then cause a retrieval of a current bill. In some embodiments, the exchange bill pay application 1110 may be structured to retrieve a previously stored copy of the most recent bill for the biller rather that initiate a bill inquiry process. In some embodiments, the previously stored copy of the most recent bill is expected to be current (e.g., when bill information is periodically provided/pushed by a biller computing system to refresh the previously stored copy).

As shown, the user-interactive bill 1332 includes various billing information, such as the amount due 1332, the due date 1336, previous payment information 1338, etc.

As the user reviews each successive user-interactive bill 1332 displayed within the glider 1330, the exchange bill pay application 1110 may be structured to perform various programmatic operations in response to detecting particular single-gesture commands issued by the user via the device 1100. For instance, in one example embodiment, the glider 1330 or user-interactive bill 1332 may comprise computer-executable instructions embodied in a swipe-left detection circuit 142a, swipe-right detection circuit 142b, swipe-up detection circuit 144a, swipe-down detection circuit 144b, and tap-and-hold detection circuit 146.

In an example embodiment, the swipe-left detection circuit 142a may be structured to detect when a user swipes left within an area defined by the glider 1330. When the appropriate gesture is detected, the swipe-left detection circuit 142a may be structured to cause the glider 1330 to scroll to the left and populate the center card with information for a different user-interactive bill 1332 that precedes the currently displayed bill in an ordered data set comprising the user's bills. The swipe-right detection circuit 142b may be structured to detect when a user swipes right within an area defined by the glider 1330. When the appropriate gesture is detected, the swipe-right detection circuit 142b may be structured to scroll to the right and populate the center card with information for a different user-interactive bill 1332 that follows the currently displayed bill in an ordered data set comprising the user's bills. In some embodiments, the bills within the glider 1330 are ordered by the due date, with more immediate bills presented first. In some embodiments, the bills are ordered by category (e.g., utilities, retail cards, mortgages, etc.). In some embodiments, the bills are ordered by age (e.g., overdue bills preceding not-yet-due bills).

In an example embodiment, the swipe-up detection circuit 144a may be structured to detect when a user swipes up within an area defined by a currently displayed center card comprising a user-interactive bill 1332. When the appropriate gesture is detected, the swipe-up detection circuit 144a may be structured to allow for completion of a single-gesture payment instruction received from the user via the device 1100. In some embodiments, the user pre-sets a source payment account for all bills or for bills from particular billers. When a user reviews a particular user-interactive bill 1332 and agrees to pay the amount due 1334 on or by the due date 1336, the user may swipe up. In some embodiments, upon detecting this single-gesture command, the exchange bill pay application 1110 is structured to generate an electronic payment instruction (e.g., as describes relative to FIG. 9A) using least on the amount due 1334, due date 1336 and the user's stored source account information. In other embodiments, upon detecting the single-gesture command, the exchange bill pay application 1110 may display a modal message box to confirm the user's intent to make a payment and wait for the user to respond in the affirmative prior to proceeding to generate an electronic payment instruction. After a payment instruction is generated, the swipe-up detection circuit 144a may be structured to remove the corresponding user-interactive bill 1332 from the set of cards that populate the glider 1330 and/or to populate the central card with the next user-interactive bill 1332 from the ordered set of bills.

In an example embodiment, the swipe-down detection circuit 144b may be structured to detect when a user swipes down within an area defined by a currently displayed center card comprising a user-interactive bill 1332. When the appropriate gesture is detected, the swipe-down detection circuit 144b may be structured to skip the corresponding bill (e.g., queue the corresponding bill for a later review by the user, delete the corresponding bill, etc.). In some embodiments, when a user reviews a particular user-interactive bill 1332 and wants to defer the user's decision on payment and move on to the next user-interactive bill 1332 in the ordered set, the user may swipe down. In some embodiments, the corresponding user-interactive bill 1332 will not reappear in the glider 1330 during the same application, browser, or device log-in session (e.g., until the user closes the exchange bill pay application 1110 and/or until the user device 1100 is restarted). In some embodiments, the corresponding user-interactive bill 1332 will not reappear in the glider 1330 for a predetermined number of days pre-set by the user or dynamically specified by the user (e.g., using a modal message box displayed after detecting the swipe-down gesture).

In an example embodiment, the tap-and-hold detection circuit 146 may be structured to detect when a user taps and holds within an area defined by a currently displayed center card comprising a user-interactive bill 1332. For example, when a user taps and holds the center card for an amount of time that exceeds a predetermined threshold (e.g., 500 milliseconds, 1,000 milliseconds, etc.), a menu 150 may be displayed, presenting additional options to the user. The menu 150 may include a details item 152 structured to allow the user to view the details of transactions included in the user-interactive bill 1332. For example, upon detecting a user interaction with the details item 152, a modal form may be displayed and populated with detailed transaction information. The detailed transaction information may be received as part of the data set used to generate the user-interactive bill 1332 or may be retrieved on demand by generating an API message to query the biller computing system. In some embodiments, to improve performance and responsiveness of the exchange bill pay application 1110, the exchange bill pay application 1110 may be structured to execute a data retrieval query in the background such that the user's may continue to interact with the exchange bill pay application 1110 while the transaction data is being generated. In some embodiments, the exchange bill pay application 1110 may be structured to cause detailed transaction information to be generated in response to detecting a multi-touch user command, such as a pinch-to-zoom command.

In some embodiments, the menu 150 may include an auto-pay item 154 structured to allow the user to set, change or cancel auto-pay options for the biller associated with the user-interactive bill 1332. Upon detecting a user interaction with the auto-pay item 154, the exchange bill pay application 1110 may display a user interface similar to that shown in FIG. 13C. As shown, the user interface display may include various items needed to manage auto-pay settings for a biller, such as the amount 1362, the date 1364 (e.g., Nth day of the month), reminder settings 1366, source account settings 1368, etc.

Figure 14:
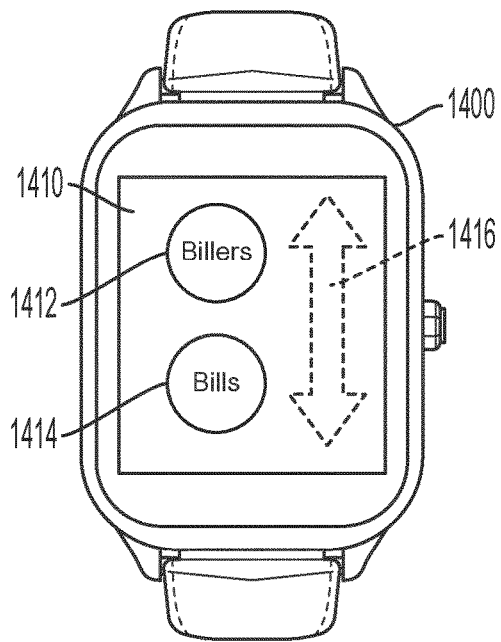
FIG. 14 shows a customer-side landing page for a computer application structured to allow a customer to interact with the biller exchange computing system using a wearable computing device, according to an example embodiment.
Figure 15A:
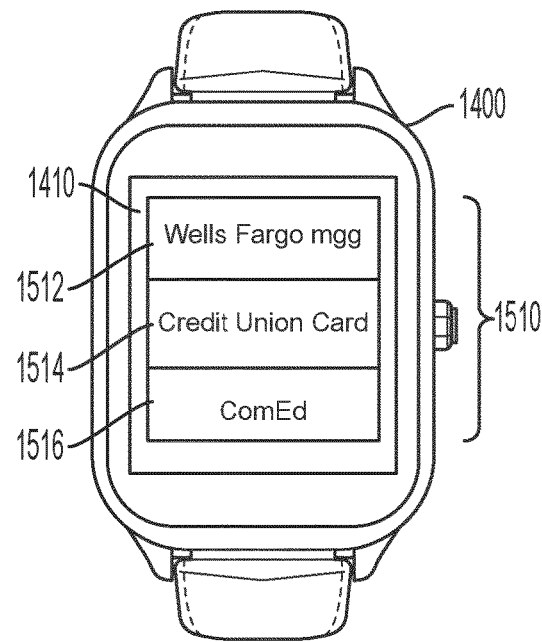
FIG. 15A-15C show customer-side aspects of a bill payment process via the biller exchange computing system using the wearable computing device of FIG. 14, according to an example embodiment.
Figure 15B:
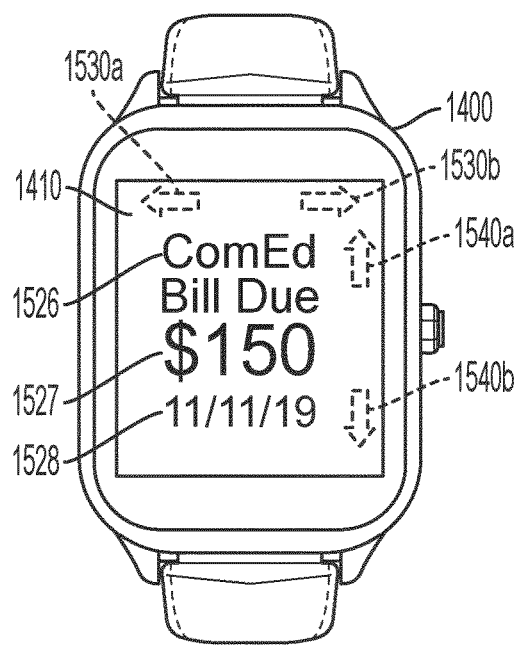
Figure 15C:
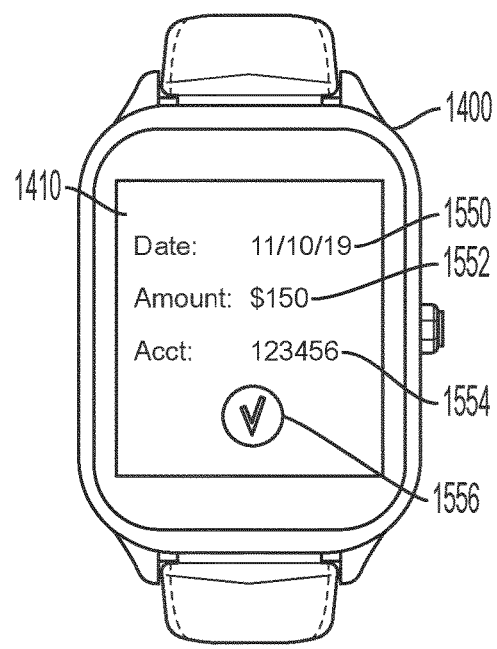

FIG. 14-15C show example customer-side user interfaces for interacting with a biller exchange computing system using a wearable computing device, according to an example embodiment. One of skill will appreciate that the teachings of the present disclosure applicable to the computing devices may likewise be applicable to wearable computing devices shown in FIG. 14-15C. Generally, a wearable computing device 1400 may be a smart watch, a smart bracelet, etc. and may comprise a touchscreen. The wearable computing device may include an exchange bill pay application 1410. In some embodiments, all or some modules, libraries, resources, etc. included in the exchange bill pay application 1410 are stand-alone items that do not require the wearable computing device 1400 to be paired to a smartphone in order for the exchange bill pay application 1410 to function. In some embodiments, some items included in the exchange bill pay application 1410 are made available or included to the exchange bill pay application 1110, discussed in reference to FIG. 11-13C and accessible via a device 1100, such as a smartphone. In operation, the wearable computing device 1400 may be paired to the device 1400 to make certain functionality accessible. For example, all or some aspects of biller enrollment and OAuth token generation described in reference to FIG. 12C may be completed by the user using the device 1100, such as a smartphone, as discussed further herein.

FIG. 14 shows a customer-side landing page for interacting with the biller exchange computing system using a wearable computing device, according to an example embodiment. As shown, the landing page of the exchange bill pay application 1410 presented to the user via a wearable computing device 1400 includes a plurality of user-interactive menu items, such as the billers menu item 1412, structured to allow the user to view and manage billers, and the bills menu item 1414, structured to allow the user to view and manage bills. Furthermore, additional functionality of the exchange bill pay application 1410 may be available to the user. In some embodiments, a scroll detection circuit 1416 may be structured to detect a user interaction with the touchscreen of the wearable computing device 1400 and present the additional menu items to the user. When a user interaction with the billers menu item 1412 is detected, the user may be presented with a display similar to that shown in FIG. 15A. When a user interaction with the bills menu item 1414 is detected, the user may be presented with a display similar to that shown in FIG. 15B.

FIG. 15A-15C show customer-side aspects of a biller enrollment and bill payment process through the biller exchange computing system using a wearable computing device, according to an example embodiment.

As shown according to an example embodiment of FIG. 15A, a user may be presented with a menu 1510 showing the user's added (enrolled) and/or relevant billers. Relevant billers may be determined as described, for example, in reference to FIG. 13A. In some embodiments, when a user selects a previously added biller from the menu 1510 (in the example shown, a previously added utility biller 1516), the user may be presented with a display similar to that shown in FIG. 15B. In some embodiments, when a user selects a relevant but not previously added biller, the exchange bill pay application 1410 can be structured to initiate and manage biller enrollment operations in conjunction with the exchange bill pay application 1110 accessible to the user via a device 1100 paired to the wearable computing device 1400. For example, when a user selects a relevant biller (e.g., by tapping on a menu item 1514), the exchange bill pay application 1410 executable on the wearable computing device 1400 may initiate a remote procedure call to the exchange bill pay application 1110 executable on the device 1100. The remote procedure call may include a parameter comprising a biller identifier extracted from the properties of the selected menu item 1514. The biller identifier may correspond to a unique identifier for the biller that previously joined the exchange (e.g., a unique biller identifier for a biller record in the biller directory 341 of FIG. 3, the biller directory 1010 of FIG. 10, etc.). Upon receiving the biller identifier, the exchange bill pay application 1110 may proceed to cause a new OAuth token to be generated such as described, for example, in reference to FIGS. 12C and 12D.

As shown according to an example embodiment of FIG. 15B, a user may be presented with a display structured to allow the user to review and pay bills received through the exchange as described, for example, relative to FIG. 13B. An example user-interactive bill delivered via the exchange bill pay application 1410 executable on the wearable computing device 1400 may include biller information 1526, amount due 1527 and due date 1528. The user may swipe left and/or right to view additional bills, may swipe down to defer a decision on a particular bill, and may swipe up to pay the bill. If the user initiates a bill pay command, the exchange bill pay application 1410 may be structured to present the user with a confirmation screen, as shown in FIG. 15C.

Referring generally to FIG. 11-15C, according to various embodiments, the exchange bill pay applications 1110 and/or 1400 may be structured to generate various reminders and/or notifications for the user of the devices 1100 and/or 1400. For example, in some embodiments, the exchange bill pay applications 1110 and/or 1400 may be structured to provide periodic bill review notifications via the devices 1100 and/or 1400. In some embodiments, notifications are provided in the form of a pop-up screen such as that shown in FIG. 13B and/or 15B. The notifications may be provided according to a pre-set schedule (e.g., every time a data push with new billing data is received from a biller, every week, every two weeks, every month, on the $1^{st}$ and $15^{th}$ of the month, N days before each bill is due, etc.). In some embodiments, the auto-pay reminder settings, such as those shown in FIG. 13C, can structured to allow a user to set notification preferences for auto-pay transactions.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method for coordinating billing requests and payments across different financial institutions and performed by a computing system, the method comprising:

receiving, by a biller exchange computing system from a customer computing device, an electronic enrollment request including identification information associated with a receiving financial institution holding a receiving financial account for a biller previously registered with the biller exchange computing system, wherein a customer holds an account with the biller;

displaying, on a user interface of the customer computing device, an interactive control configured to collect customer authentication data for the biller, wherein the customer authentication data comprises identification data of the biller including at least one of an Internet Protocol address, a Media Access Control address, an entity name, or an entity identifier;

in response to receiving the customer authentication data at the customer computing device, transmitting the customer authentication data to a remote computing system associated with the biller and separate from the biller exchange computing system, the remote computing system communicably coupled with the biller exchange computing system via a network;

causing the remote computing system associated with the biller to generate a customer-biller account authentication token after validating the customer authentication data, the customer-biller account authentication token including the customer authentication data wherein generating the customer-biller account authentication token comprises:

validating a customer signature from the customer authentication data to confirm the customer is associated with an originating financial institution, generating an authorization code in response to validating the customer signature, signing the generated authorization code, authenticating the signed authorization code to confirm the biller will accept electronic remittances initiated by the originating financial institution, and swapping the signed authorization code for the customer-biller account authentication token in response to authenticating the signed authorization code;

transmitting, by the remote computing system to the biller exchange computing system, the customer-biller account authentication token, wherein the customer-biller account authentication token authorizes the biller exchange computing system to perform financial transactions with the biller on behalf of the customer;

generating, by the biller exchange computing system, a biller enrollment record as part of a one-time enrollment with the biller exchange computing system, the biller enrollment record including the customer-biller account authentication token;

saving, by the biller exchange computing system in a storage media associated with the biller exchange computing system, the customer-biller account authentication token relationally to information regarding the customer and relationally to information regarding the biller; and authenticating, by the biller exchange computing system, a transaction request received from the customer computing device for a transaction between the customer and the biller without the customer computing device and the biller exchange computing system transmitting any additional customer authentication data to the remote computing system associated with the biller based on the one-time enrollment having been performed and based on performing a query function on the storage media to retrieve the customer-biller account authentication token.

2. The method of claim 1, further comprising:

causing the remote computing system to generate a one-time authorization code, wherein the one-time authorization code expires within a predetermined amount of time relative to a time the one-time authorization code was transmitted to the customer computing device, wherein the remote computing system transmits the one-time authorization code to the customer computing device;

displaying, on the user interface of the customer computing device, a second interactive control configured to obtain a copy of the one-time authorization code entered by the customer;

in response to receiving the copy of the one-time authorization code at the customer computing device, transmitting the one-time authorization code to the remote computing system; and causing the remote computing system to generate the customer-biller account authentication token in response to a confirmation that the one-time authorization code has been validated.

3. The method of claim 1, further comprising:

receiving an electronic bill associated with the biller;

extracting information regarding the biller and information regarding the customer from the electronic bill;

based on the information regarding the biller and the information regarding the customer, retrieving the customer-biller account authentication token and including the customer-biller account authentication token in the electronic bill; and transmitting the electronic bill to the customer computing device.

4. The method of claim 3, wherein the electronic bill is generated responsive to a customer request message received from the customer computing device, the method further comprising including the customer-biller account authentication token in the customer request message and transmitting the customer request message to the remote computing system.

5. The method of claim 4, further comprising:

extracting information regarding the biller and information regarding the customer from the customer request message;

based on the information regarding the biller and the information regarding the customer, retrieving the customer-biller account authentication token and including the customer-biller account authentication token in the customer request message; and transmitting the customer request message to the customer computing device.

6. The method of claim 3, further comprising:

receiving a payment transaction request from the customer computing device, wherein the payment transaction request is generated based on information included in the electronic bill upon receiving customer approval to pay the electronic bill, the customer approval received at the customer computing device;

based on the payment transaction request, determining information regarding the biller and information regarding the customer;

based on the information regarding the biller and the information regarding the customer, retrieving the customer-biller account authentication token and including the customer-biller account authentication token in the payment transaction request; and initiating a funds transfer transaction from a customer account associated with the originating financial institution to the receiving financial account.

7. The method of claim 6, further comprising causing a clearance and settlement process for the funds transfer transaction to be initiated.

8. The method of claim 7, further comprising transmitting payment information from the payment transaction request to a clearinghouse computing system.

9. The method of claim 1, wherein the customer computing device does not store a copy of the customer-biller account authentication token.

10. The method of claim 9, further comprising storing the customer-biller account authentication token in a token vault.

11. The method of claim 10, wherein the token vault is one of a plurality of token vaults; and wherein only one or more customer-biller account authentication tokens associated with the biller are accessible via the token vault such that customer-biller account authentication tokens are segregated by biller.

12. The method of claim 1, further comprising:
receiving a request to expire the customer-biller account authentication token; and
expiring the customer-biller account authentication token, comprising performing at least one of deactivating the customer-biller account authentication token and deleting the customer-biller account authentication token.

13. The method of claim 12, further comprising:
causing the remote computing system to generate a replacement customer-biller account authentication token; and
saving the replacement customer-biller account authentication token relationally to the information regarding the customer and relationally to the information regarding the biller.

14. The method of claim 12, wherein the request is received from the customer computing device.

15. The method of claim 12, wherein the request is received from the remote computing system.

16. The method of claim 1, further comprising:
receiving, from the remote computing system, updated biller information; and
storing the customer-biller account authentication token relationally to the updated biller information;
wherein updating biller information does not require replacing the customer-biller account authentication token.

17. The method of claim 16, wherein the updated biller information comprises an updated remittance address.

18. The method of claim 1, wherein the customer-biller account authentication token comprises an access scope definition for the remote computing system such that the customer-biller account authentication token is a limited-scope authentication token.

19. The method of claim 1, wherein the customer-biller account authentication token comprises information, decodable by the remote computing system, corresponding to a biller-specific authentication policy.

20. The method of claim 1, further comprising:
receiving a remittance file comprising at least one payment record;
based on information included in the at least one payment record, determining information regarding the biller;
adding the customer-biller account authentication token corresponding to the information regarding the biller to the at least one payment record; and
transmitting the at least one payment record to the remote computing system.

* * * * *